(12) United States Patent
Rieffanaugh, Jr.

(10) Patent No.: US 8,019,775 B2
(45) Date of Patent: *Sep. 13, 2011

(54) HUMAN RESOURCES NETWORKING SYSTEM AND METHOD THEREOF

(76) Inventor: Neal King Rieffanaugh, Jr., Los Angeles, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/655,567

(22) Filed: Dec. 30, 2009

(65) Prior Publication Data

US 2010/0185550 A1 Jul. 22, 2010

Related U.S. Application Data

(62) Division of application No. 10/355,343, filed on Jan. 31, 2003, now Pat. No. 7,647,330.

(51) Int. Cl.
*G06F 17/30* (2006.01)
(52) U.S. Cl. ......... 707/769; 707/802; 707/803; 705/320
(58) Field of Classification Search .................. 707/769, 707/802, 803; 705/320
See application file for complete search history.

(56) References Cited

U.S. PATENT DOCUMENTS

| | | | |
|---|---|---|---|
| 6,938,048 B1 * | 8/2005 | Jilk et al. ................ | 705/11 |
| 7,155,400 B1 * | 12/2006 | Jilk et al. ................ | 705/9 |
| 7,424,438 B2 * | 9/2008 | Vianello .................. | 705/9 |
| 2003/0093322 A1 * | 5/2003 | Sciuk ...................... | 705/26 |

* cited by examiner

*Primary Examiner* — Khanh B Pham
(74) *Attorney, Agent, or Firm* — Raymond Y. Chan; David and Raymond Patent Firm

(57) ABSTRACT

A human resource networking system, which is a novel method establishing a business system for locating, identifying, promoting and assisting in the employing of career project workers in the non-career workforce, includes a Relational Database comprising an Inductive Credit Matrix containing People Elements, Places Elements, Projects Elements, and Things Elements derived from People Information, Places Information, Project Elements, and Things Elements; a plurality of Credit Constructs each of which is formed by associating two or more of the People Elements, the Places Elements, the Projects Elements, and the Things Elements and stored in the Inductive Credit Matrix of the Relational Database; and a Display Device for outputting Credit Bytes generated by combining the Credit Constructs upon query.

10 Claims, 58 Drawing Sheets

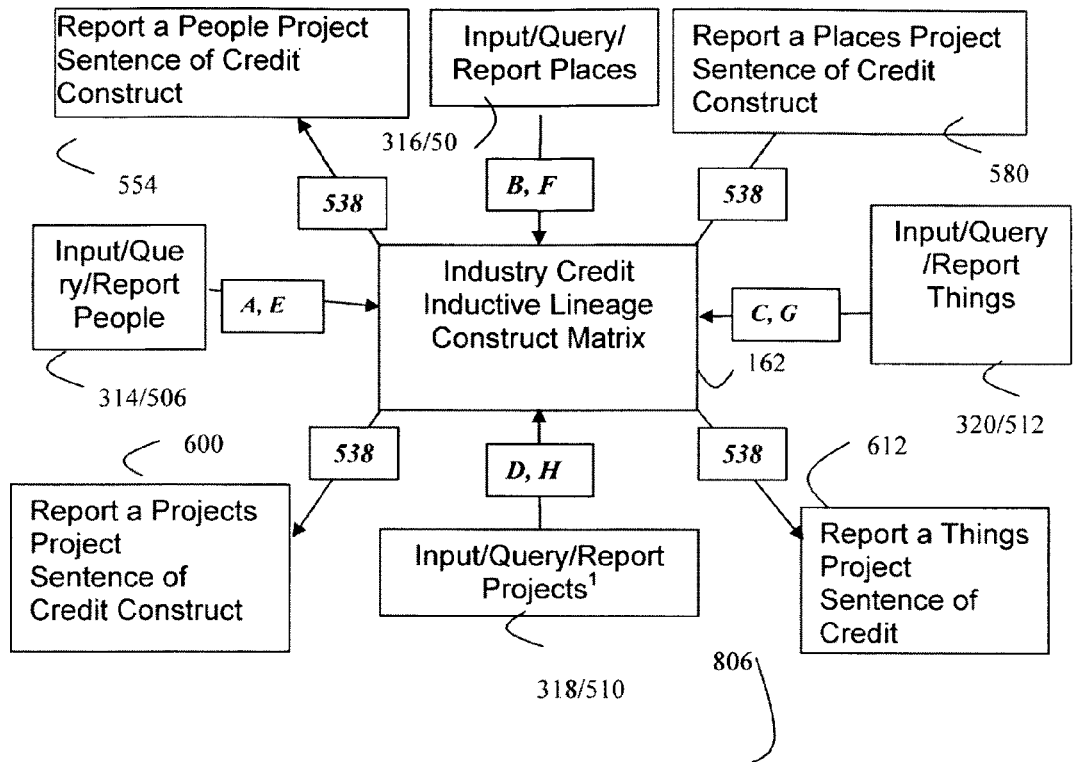

Input (314, 316, 318, 320):
A - People to Places (184), People to Projects (178), People to Things (186), People to People (196)
B - Places to People (184), Places to Projects (180), Places to Things (188), Places to Places (190)
C - Things to People (186), Things to Places (188), Things to Projects (182), Things to Things (192)
D - Projects to People (178), Projects to Places (180), Projects to Things (182), Projects to Projects (194)

Query (506, 508, 510, 512):
E - People to Places (184), People to Projects (178), People to Things (186), People to People (196)
F - Places to People (184), Places to Projects (180), Places to Things (188), Places to Places (190)
G - Things to People (186), Things to Places (188), Things to Projects (182), Things to Things (192)
H - Projects to People (178), Projects to Places (180), Projects to Things (182), Projects to Projects (194)

*Figure 2b*

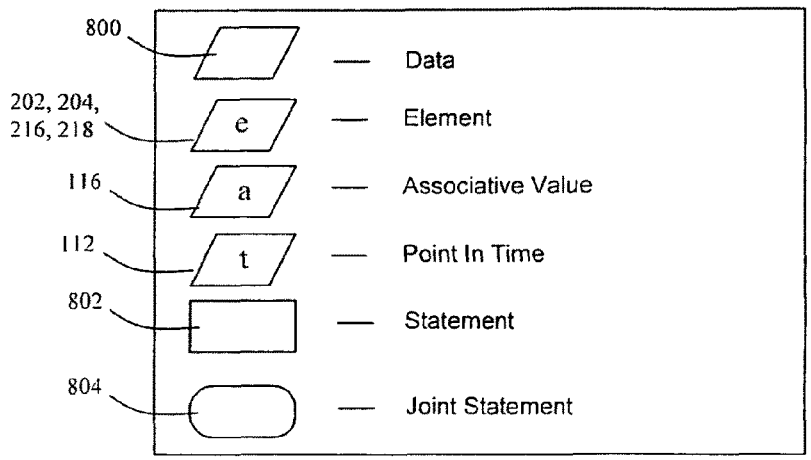

Credit Data (302) is data that is submitted. Credit bits (102) are elements (202, 204, 216, 218), associative values (116), and point in time (112). Credit instances (164) are four elements joined by three associative values, with a point in time. Credit bytes (164) are two, three, or four elements joined by one, two, or three associative values. Credit bytes are extracted (890) and inferred (864) from credit instances (200). The Project sentences of credit construct (554, 580, 600, 612) reports elements of People (202), Places (204), Projects (216), and Things (218) in a format predetermined by the query's perspective (624, 626, 628, 630) by using predetermined rules (548) to output People Credit Bytes (166), Places Credit Bytes (168), Projects Credit Bytes (170), and Things Credit Bytes (172). Hence each element in a Project Sentence of Credit Construct reflects the perspective of that Project Sentence of Credit Construct query. This perspective is a Project Sentence of Credit Construct's "Point Of View" [See fig.16a].

*Figure 9c*

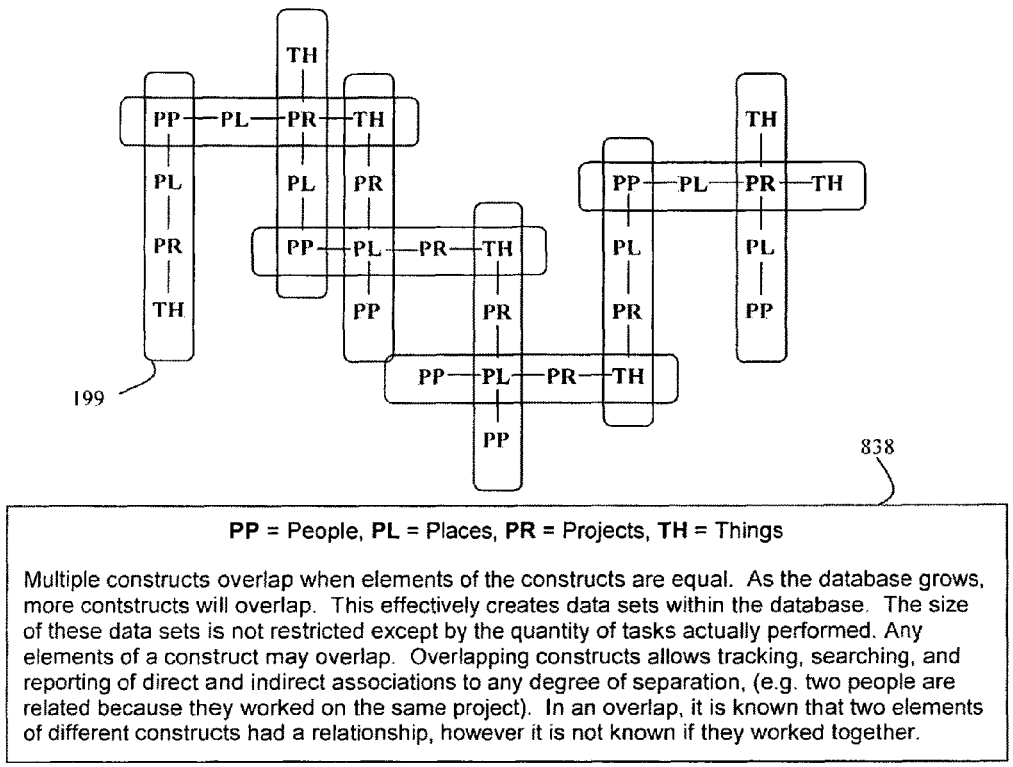

PP = People, PL = Places, PR = Projects, TH = Things

Multiple constructs overlap when elements of the constructs are equal. As the database grows, more contstructs will overlap. This effectively creates data sets within the database. The size of these data sets is not restricted except by the quantity of tasks actually performed. Any elements of a construct may overlap. Overlapping constructs allows tracking, searching, and reporting of direct and indirect associations to any degree of separation, (e.g. two people are related because they worked on the same project). In an overlap, it is known that two elements of different constructs had a relationship, however it is not known if they worked together.

*Figure 10b*

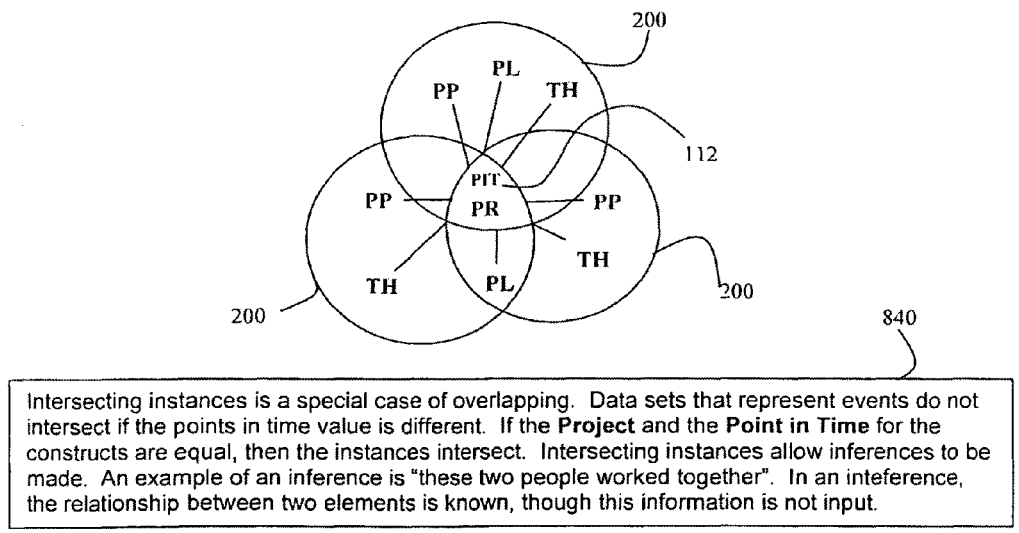

Intersecting instances is a special case of overlapping. Data sets that represent events do not intersect if the points in time value is different. If the Project and the Point in Time for the constructs are equal, then the instances intersect. Intersecting instances allow inferences to be made. An example of an inference is "these two people worked together". In an inteference, the relationship between two elements is known, though this information is not input.

*Figure 10c*

FEATURED CREDITS

[Media Category]

"Project Name" ([Project Type] : [Project Genre]) [Publication Date]: [Featured Individual] ([Owner])
  ○ [Role]: [Place Name] ([Thing Name])

Awards
- [Award] ([Status]) [Year] - [Award Category]: [Project Name]

Related Awards
- [Award] ([Status]) [Year]- [Award Category]: [Recipient] - [Project Name]

Affiliations
- [Org. Name] ([Org. Type]) – Years Active: [Years Active]
  [Position Held] [Year]

Education
- [Degree Type] [Degree] ([School]) – Minor: [Minor]
  [Degree Description]

- [School] - [Course of Study]
  [Course of Study Description]

Additional Contacts

[People Name]
[Street Address]
[City], [State/Province] [Zip/Postal Code] [Country]

[Contact name]:[contact value]
[Contact name]:[contact value]

For Professional Contact Information Click Here

Up to 350 character description Summary acts as a follow
Up letter. The Web press kit owner thanks them for visiting
The site and invites them to visit their other sites, whether
They are in Showtown, showtrade, showchat, whateverXxxxxxxxxxxxxxxxxxxxxxxxxxx

Click here for this month's Showchat Web Press Kit Poll

Physical Attributes – John Smith

Sex: Male
Ethnicity: Caucasian, Middle Eastern
Regional Preference: South West U.S., Asia
Age: 62
Eyes: Hazel
Hair Color: Blue
Hair Length: Medium, Shoulder
Hair Type: Straight
Height: 6'8
Physique: Slender
Languages: English, Japanese, Russian
Accent: Yiddish
Wardrobe: Casual, Upscale, Grunge, Gutter Punk
Shirt: Adult Small
Sleeve: 28
Neck: 14
Jacket: 38S
Bust: 38D
Dress: N/A
Hip: 8
Waist: 12
Inseam: 30
Shoe: 14
Special: Dance, Ballet, Modeling, Acting
Skills: Underwater Basket Weaving, Jogging, Rollerblading
Unique: Will color hair
Doubles: Robert Bleka, Rob Di Nero
Stunt Work: Experienced

| SHOWTOWN COMMUNITY RESOURCE LOCATOR | SEARCH SHOWCHAT |
|---|---|
| PEOPLE  PLACES  PROJECTS  THINGS | [_____] (GO) |

*SHOWTOWN'S*

SHOWCHAT   ⟨ ICON ⟩
*"INDUSTRY POLLS, BB'S AND ENTERTAINMENT RESEARCH!"*

| SIGN IN | | | | | | | | |
|---|---|---|---|---|---|---|---|---|
| RESEARCH LOCATOR | Music | Theater | Radio | Movies | Television | Multimedia | *The* Web | Other |

| | | |
|---|---|---|
| ▷ MINI EPK POLLS | ICON  MR. SHOWTOWN WELCOMES EVERYONE TO SHOWCHAT. IF THERE'S A SUBJECT YOU WOULD LIKE TO DISCUSS, RESEARCH OR PONDER, WHETHER IT'S A PRODUCT, A SCHOOL, AN ENTERTAINMENT TOPIC, OR STORY CONCEPT, AND WHETHER IT'S FOR FUN OR PROFIT, MR. SHOWTOWN INVITES YOU TO CONTACT ONE OF OUR RESEARCH BOARDS. WE INVITE YOU TO USE OUR SERVICES FOR FUN OR PROFIT. CAN WE CHAT...? THE EDITOR | WELCOME VISITOR WED 12-31-03 |
| SHOWCHAT OVERVIEW | | FEATURED STORY XXXXXXXXXX XXXXXXXXXX |
| SHOWCHAT WEB TOUR | | |
| SHOWCHAT EDITOR | | TODAYS BIG CHAT XXXXXXXXXX XXXXXXXXXX |
| SCIN NEWSLETTER | | |
| SHOWTOWN SITE MAP | SHOWCHAT EXAMINES THIS WEEKS' HOT TOPIC'S! | MESSAGE BOARDS XXXXXXXXXX XXXXXXXXXX |

| | THE SHOWCHAT RESEARCH CENTER | |
|---|---|---|
| SHOWTOWN COMMUNITY | WEB PRESS KIT | CONSUMERS |
| ▷SHOWTOWN | XXXXXXXXXX | XXXXXXXXXX |
| ▷SHOWSCAPE | XXXXXXXXXX PROFESSIONAL  STUDENTS | XXXXXXXXXX |
| ▷MEDIAWALK | XXXXXXXXXX XXXXXXXXXX XXXXXXXXXX | XXXXXXXXXX |
| ▷SHOWCHAT | XXXXXXXXX XXXXXXXXXX XXXXXXXXXX | XXXXXXXXX |
| ▷ SHOWIRE | | |
| ▷ SHOWTRADE | | |
| ▷ PEOPLEADS | BANNER AD | |
| ▷ SHOWLINKS | | |

Tour Showtown World Wide Communities >>

Copyright 2003, Showtown Is Patent Pending And A Registered Trademark Of Buddy King Inc. All Rights Reserved. Use Of This Website Constitues Your Acceptance Of Showtown Privacy Policy And Terms & Conditions.

| SHOWTOWN COMMUNITY RESOURCE LOCATOR | | | | SEARCH SHOWIRE |
|---|---|---|---|---|
| PEOPLE | PLACES | PROJECTS | THINGS | [_____] GO |

| | SHOWTOWN'S | |
|---|---|---|
| SIGN IN | SHOWIRE | ICON |
| | ENTERTAINMENT INDUSTRY NEWS...AS IT HAPPENS! | |

MEDIA NEWS LOCATOR

| Music | Theater | Radio | Movies | Television | Multimedia | *The* Web | Other |

▷ MINI EPK NEWS
▷ SUBMIT A PRESS RELEASE

SHOWIRE OVERVIEW

SHOWIRE WEB TOUR

SHOWIRE EDITOR

SCIN NEWSLETTER

SHOWTOWN SITE MAP

SHOWTOWN COMMUNITY
▷ SHOWTOWN
▷ SHOWSCAPE
▷ MEDIAWALK
▷ SHOWCHAT
▷ SHOWIRE
▷ SHOWTRADE
▷ PEOPLEADS
▷ SHOWLINKS

SHOWiRE NEWS SERVICES
✓ ALL ENTERTAINMENT NEWS EMANATE DIRECTLY FROM OUR WEB PRESS RELEASE NEWS SERVICE! AN INTERACTIVE SERVICE ALLOWING INDUSTRY NEWS TO BE PUBLISHED IN MINUTES HERE FIRST!

✓ NEWS IS CATEGORIZED, AND IN THE FUTURE WILL BE DISTRIBUTED TO QUALIFIED JOURNALISTS, ANALYSTS, AND CONSUMER ORGANIZATIONS VIA RELEVANT ENTERTAINMENT INTEREST AND NEWS WORTHINESS!

TODAY'S TOP NEWS HEADLINES:

XXXXXXXXXXXXXXXXXX
XXXXXXXXXXXXXXXXXXXXXXXXX
XXXXXXXXXXXXXXXXXX
XXXXXXXXXXXXX

MORE

WELCOME VISITOR
WED 12-31-03

COMMUNITY HIGHLIGHTS
XXXXXXXXXX
xxxxxxxxxx

NETWORK HIGHLIGHTS
XXXXXXXXXX
xxxxxxxxxx

PRESS RELEASES
XXXXXXXXXX
xxxxxxxxxx

SCIN NEWSLETTER
XXXXXXXXXX
XXXXXXXXXX
XXXXXXXXXX
XXXXXXXXXX
XXXXXXXXXX
XXXXXXXXXX
xxxxxxxxxx Banner Ad Tour Showtown World Wide Communities >>
Copyright 2003, Showtown Is Patent Pending And A Registered Trademark Of Buddy King Inc. All Rights Reserved. Use Of This Website Constitues Your Acceptance Of Showtown Privacy Policy And Terms & Conditions.

FIG. 21f

| SHOWTOWN COMMUNITY RESOURCE LOCATOR | | | | SEARCH PEOPLEADS | |
|---|---|---|---|---|---|
| PEOPLE PLACES PROJECTS THINGS | | | | [        ] (GO) | |

| SIGN IN | SHOWTOWN'S PEOPLEADS THE ENTERTAINMENT AND IT SKILLS CLASSIFIEDS! | ICON |
|---|---|---|

| EMPLOYMENT LOCATOR | Music | Theater | Radio | Movies | Television | Multimedia | *The* Web | Other |
|---|---|---|---|---|---|---|---|---|

▷ SEARCH JOBS
▷ MY PRESSUME
▷ EMPLOYERS
▷ ROBOCRUITER

PEOPLEADS OVERVIEW

PEOPLEADS WEB TOUR

PEOPLEADS EDITOR

SCIN NEWSLETTER

SHOWTOWN SITE MAP

SHOWTOWN COMMUNITY
▷ SHOWTOWN
▷ SHOWSCAPE
▷ MEDIAWALK
▷ SHOWCHAT
▷ SHOWIRE
▷ SHOWTRADE
▷ PEOPLEADS
▷ SHOWLINKS

PROMOTING YOUR SKILLS AND TALENTS IN PEOPLEADS...

Pressume

NETWORKING YOUR INDUSTRY CREDITS WITH INDUSTRY CREDITS!

YOUR INDUSTRY WORKFORCE FULFILLMENT HOUSE!

FOR OUR RESEARCH, WE SHOULD CHECK ON THE AMOUNT OF SCHOOLS WITH ENTERTAINMENT STUDIES. OUR MISSION: TO START WITH SCHOOLS THEN BRANCH INTO A FULL JOB SERVICE FOR RELATED ENTERTAINMENT AND IT INDUSTRIES.

IN THE BEGINNING, OUR SOLE SOURCE OF INCOME WILL BE DERIVED FROM BANNER ADVERTISING! THEN WE BEGIN CHARGING 1) COMPANIES FOR REGISTERING, 2) PEOPLE WILL PAY FOR PRESSUMES/OPTIONS, AND FOR BANNER ADVERTISING. THESE PRESSUME ADS HAVE LINKS TO REELS ON MEDIAWALK!

WELCOME VISITOR
WED 12-31-03

PEOPLEADS HIGHLIGHTS
XXXXXXXXXX
XXXXXXXXXX

PEOPLEADS WORKFORCE
XXXXXXXXXX
XXXXXXXXXX

PRESSUMES
XXXXXXXXXX
XXXXXXXXXX
XXXXXXXXXX

SHOWBYTES
XXXXXXXXXX
XXXXXXXXXX
XXXXXXXXXX
XXXXXXXXXX
XXXXXXXXXX
XXXXXXXXXX
XXXXXXXXXX

Tour Showtown World Wide Communities >>

Copyright 2003, Showtown Is Patent Pending And A Registered Trademark Of Buddy King Inc. All Rights Reserved. Use Of This Website Constitues Your Acceptance Of Showtown Privacy Policy And Terms & Conditions.

Figure 21A:
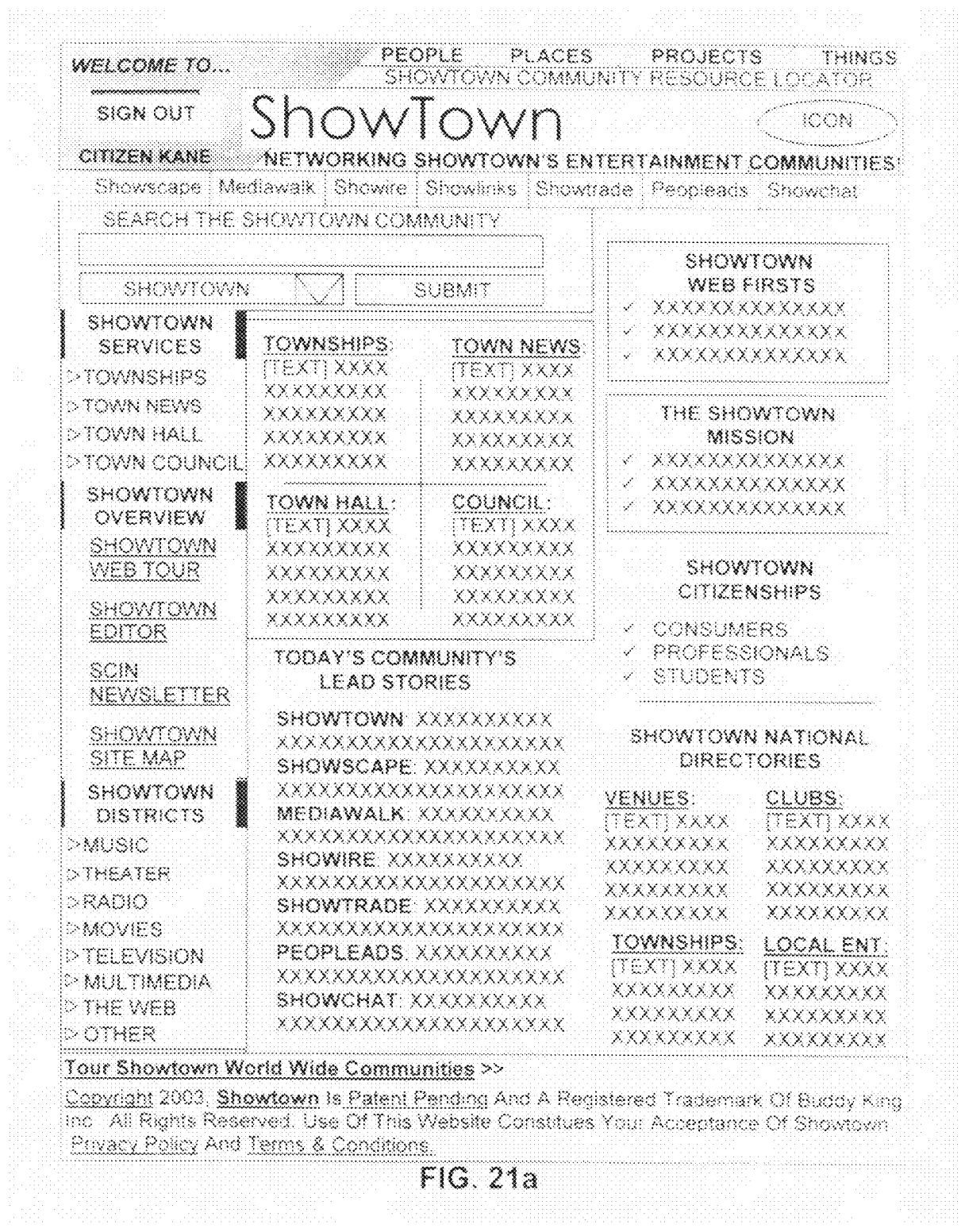
Figure 21C:
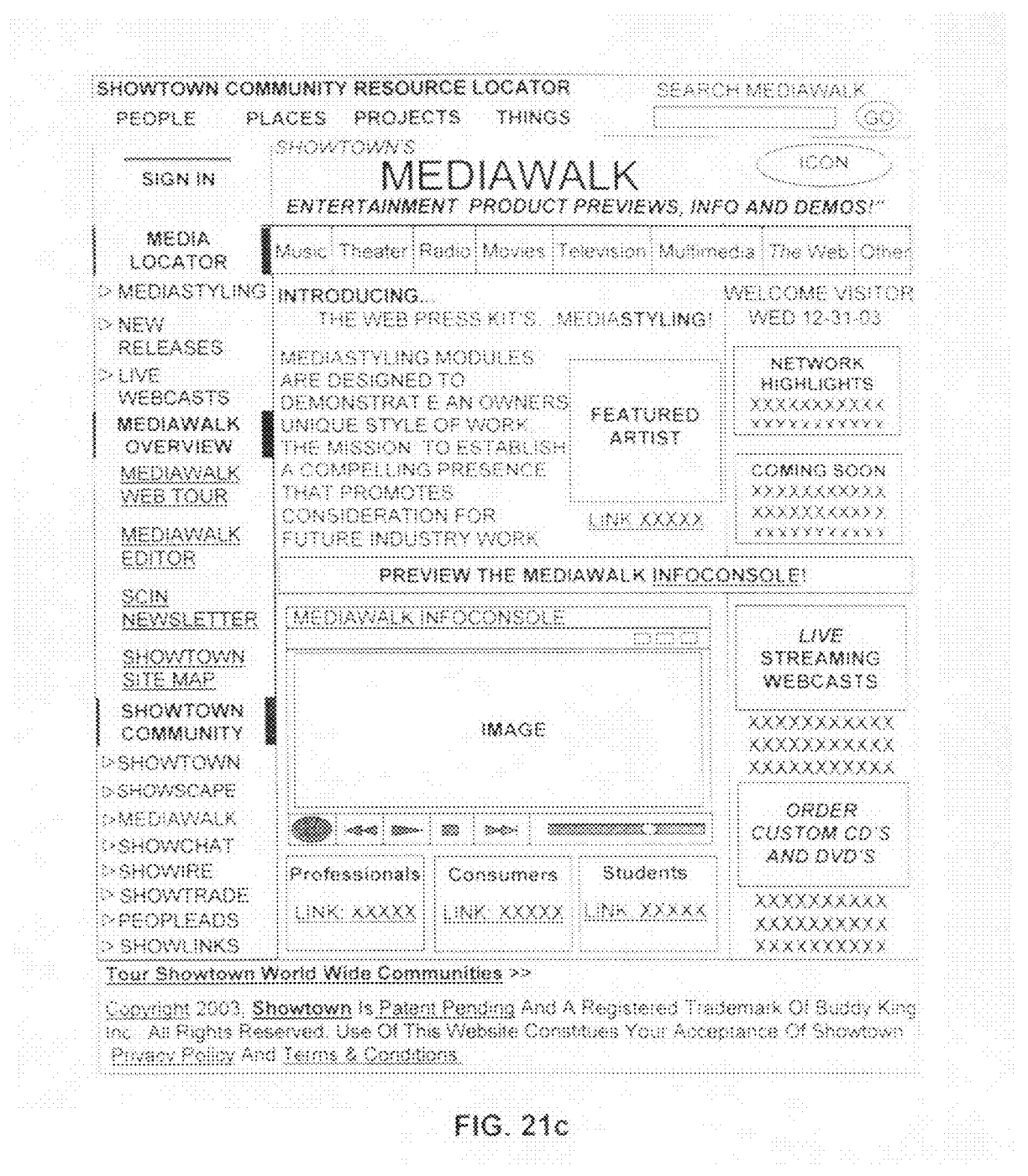
Figure 21E:
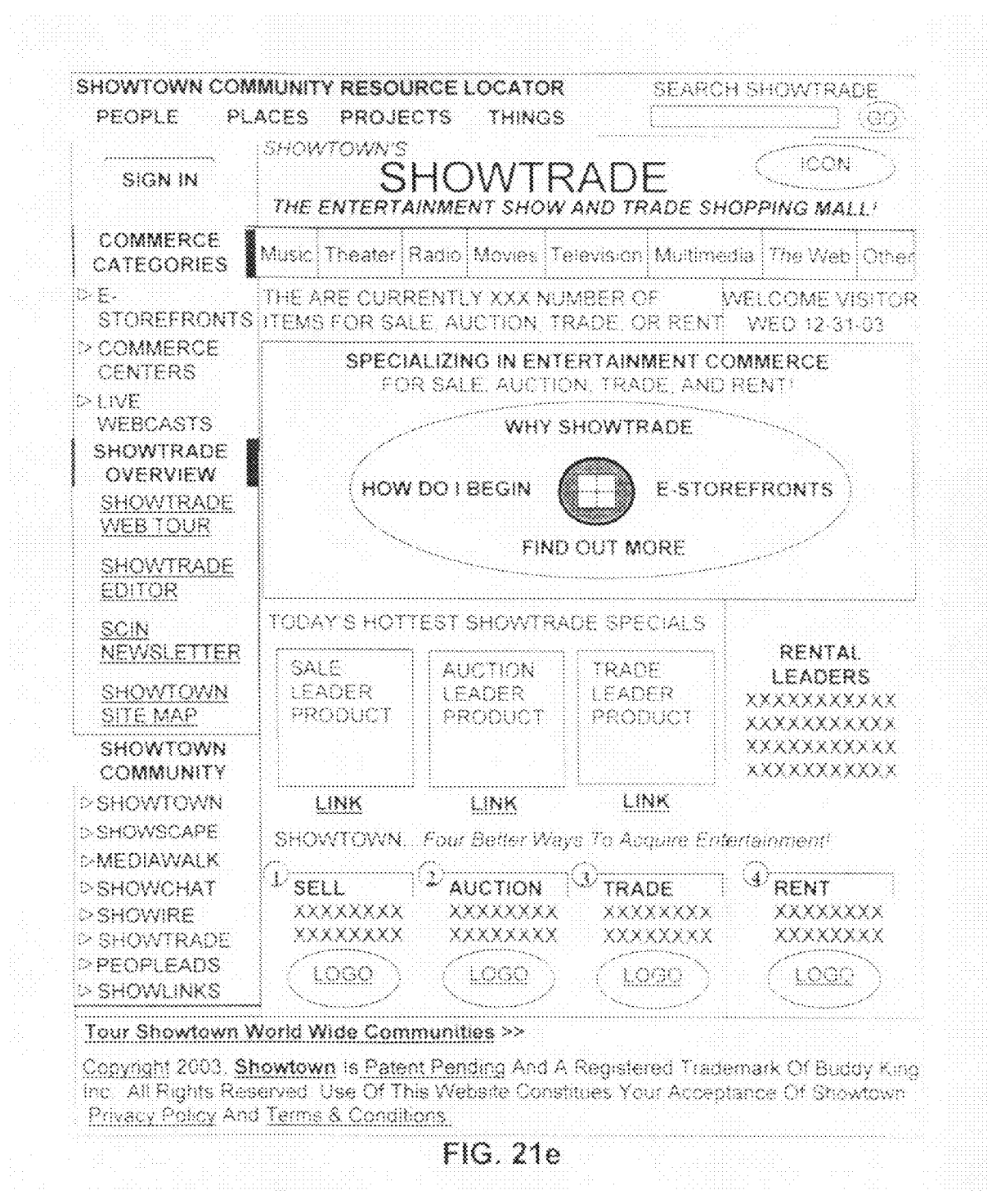

FIG. 21g

HUMAN RESOURCES NETWORKING SYSTEM AND METHOD THEREOF

CROSS REFERENCE OF RELATED APPLICATION

This is a divisional application of a non-provisional application having an application Ser. No. 10/355,343 and a filing date of Jan. 31, 2003 now U.S. Pat. No. 7,647,330.

BACKGROUND OF THE PRESENT INVENTION

1. Field of Invention

This invention relates in general to a computer-based database system, and more particularly to a human resource networking system and method thereof, which is a computer-based data integration and management processing system and a method for project workforce locating/identifying, and occupational reports generating conjunctive sentences of industry credits.

2. Description of Related Arts

A few years back, government officials stunned the entertainment industry with the pronouncement that those working in entertainment could experience a life expectancy shorter than those mining for coal! While investigative actuaries may point to a professionals life style, some entertainment professionals point to the industry's work cycle; a project orientated industry where one's employment services are generally terminated when the project's developing work cycle is completed. This style of career working is no doubt the genesis to the industry axiom, which states "You're only as good as your last job!"

The industry of entertainment is a career whose full time occupation is working temporarily on developing projects. Whether its ten days, ten months or ten years, tenure depends generally on consumer acceptance, the politics of working in a closed system, and the luck of the draw. Staying employed in the industry does require a mode of continuous work readjustment. The amount of time one devotes to networking, looking for leads, addresses, phone numbers, checking out the possibilities for future work, is usually reflected in the amount of time one spends networking for that next gig! Perhaps this is one of the underlying reasons which contribute to the early death of an industry professional.

Besides the entertainment industry, most of the professional or other human resource industries have the above unsolved problems. Interestingly enough, there is no one system currently available for this networking chore of locating work for industry talent, and no one system used for identifying such talent; keeping records of address, phone numbers and points of contact for the industry talent. And of the various systems that do exist, they do so at the exclusion of others.

In reality, the present workforce system is a closed system. For example, www.thelink.com is an existing closed entertainment workforce system for union members only is not relational and doe not track industry places and things used in industry projects. Also their credits are not automatically generated with relational qualities as are the credits of this invention.

Additionally in times like these, with a society being mobilized, we see talent moving around as never before, changing addresses and phone numbers, a location that's constantly changing as they move around looking and working for that next gig.

Presently, production sources for work are beginning to move about also! Going to areas previously thought too remote www.universalstudios.com. Additionally we are now seeing new production areas popping up outside these United States, a work-source sophisticated with the latest modes of technology working with a workforce doing business the old fashioned way of personal networking. The reason, present sources in the industry desire to keep the present system closed, may soon become invalid.

Also the world economy now seems unbalanced making it possible for one part of the world to experience recession while another part prospers. This phenomenon does give rise for a need to market ones skills and talents abroad in a cost effective manner. Unfortunately, at this time no human resource system exits with a mission to solve this workforce problem.

Therefore the present system in place for monitoring addresses phones numbers and point of contact for industry talent is orientated towards the old fashioned manual way of doing networking by personal searching using the existing systems of using printed directories like the LA 411 published by LA 411 publishing company.

A system performing an incomplete fractionalized inadequate job and a system that does not service the many industries of entertainment. While a few entertainment methods that accommodate these new technologies are beginning to spring up www.proaudio.com, they are only available for a particular industry, as is the case with Pro audio which list two of our inventions elements. These services basically specialize in one form of media and do not offer a system designed to serve all of the entertainment industries, and are not designed to serve the entire entertainment industry as a human resource service as in castnet, which services only actors. The www.castnet.com does not track projects and is non-relational and uses paper style format for their resumes using typical credits that are not conjunctive as illustrated in our invention.

They tend to be for autograph seekers and seem to be methods for the marketing of product www.imdb.com provides information on films and is not a human resource system. And of the existing systems for industries other than entertainment www.allmusic.com, they too seem to be focused with purposes of missions not like or mentioned in this specification. U.S. Pat. No. 5,197,004 is not designed to work with a relational database and therefore does not have any rules as we use in our invention for updating etc. Therefore the data is not updateable with the system lacking the ability to learn. Additionally the information on the resumes cannot be saved to build a human resource database, U.S. Pat. No. 5,416,694, this human resource system is not applicable in that the elements are not similar. Additionally U.S. Pat. No. 5,671,409 is not applicable for a bunch of reasons, the least being the elements, is not updateable etc.

In summary, there does not exist today in the industry of entertainment a human resource tool for project workers, this is to say in the locating, identifying for the purpose of obtaining project work. And until such tool is available, the time consuming and expensive art of personal networking continues.

Therefore, a longstanding need still exists. And that need now becomes more acute in the information age of today's technology, the need for a talent location and identification system which can readily provide an economic and convenient location with world wide capabilities for people possessing such specific skills in the human resource industry.

SUMMARY OF THE PRESENT INVENTION

The main objective of the present invention is to provide a human resource networking system and method thereof which is a novel method establishing a business system for locating, identifying, promoting and assisting in the employing of career project workers in the non-career workforce.

Another objective of the present invention is to the usage of modern technology by using Internet technologies, which allows accessibility by any employer and any person of talent anywhere which also includes their business subsidiaries and or managers located throughout the world.

Another objective of the present invention is to provide a human resource networking system and method thereof which is a single industry system for industries of entertainment the least of which is: music, theater, motion picture, radio, television, multimedia, the web, and other.

Another objective of the present invention is to provide a human resource networking system and method thereof which is a system addressing all industry employment types which include; free lance, independent, contract and employee.

Another objective of the present invention is to provide a human resource networking system and method thereof which is a system useful in the entertainment industry for establishing specific skills practiced by people which can be matched with project developing requirements in the production of music, theater, motion picture, radio, television, multimedia, the web, and other.

Another objective of the present invention is to provide a human resource networking system and method thereof which is a system for all human resource industries with a secure mode of transmission, the least of which is a private e-mail and channel for networking negotiations.

Another objective of the present invention is to provide a human resource networking system and method thereof which is a system open to those having union and non-union relationships. The present invention is a tool for all the industry's personnel including those in front of and behind the camera, microphone, stage, cage, phone or desk, in entertainment. With our invention everyone is related and everyone is located and identified by their industry credits.

Another objective of the present invention is to provide a human resource networking system and method thereof which is a system possessing the ability to be operated by professionals with little or no experience. However for those HR specialists in the head hunting business, this system offers a search system for the advanced, and an ultimate search screen for talent that are computer geeks asking that most complicated of compound questions. This makes it possible to search for industry personnel possessing the most remote of talents from the most remote places.

Another objective of the present invention is to provide a human resource networking system and method thereof which is a system open to those having management and to those not having representation. The present invention addresses the industry need for a one-source talent point of contact consisting of addresses, phone numbers with a listing of managers and agents. A listing that can be accessed by the talent enabling said talent to uplift their points of contact when needed.

Another objective of the present invention is to provide the industry a Pressume web kit system, a novel multimedia report which combines the purpose of press kits with the function of a resume. This is automatically linked with other Pressume web kits as well as the press kits for Places, Projects and Things, as used in the development of other industry projects of entertainment.

Another objective of the present invention is to the industry with automatically generated conjunctive credits of industry sentences. These sentences may be automatically uplifted with the implementation of associated credits when inputted by another member's credits. The automatically generated web kit contains conjunctive sentences of industry credits extracted from the methods aforementioned elements, which in general report "Who (People type) did What (People function) for Whom (Company owning or producing product project), Where (places, When (Point In Time), Why (Projects) and How (Things used)."

Another objective of the present invention is to provide a human resource networking system and method thereof, which locates, promotes and assists professionals obtain project developing world wide work with promotional costs competitively averaging a few dollars a month. This coverage is 24 hours day, 7 days a week and 52 weeks a year. This price also includes the automatically uplifting of industry credits, which contain the conjunctive sentence of industry credits.

Another objective of the present invention is to provide a human resource networking system and method thereof which is a system of flexibility that allows future growth for those career minded project developing personnel that use the methods core system of People, Places, Projects and Things core to be expanded for future project workforce managing like when an employer desires to automatically monitor the projects work cycle productivity of an employee in another state or country connected only by the technologies of the internet.

These and other objectives, features, and advantages of the present invention will become apparent from the following detailed description, the accompanying drawings, and the appended claims.

These and other objectives, features, and advantages of the present invention will become apparent from the following detailed description, the accompanying drawings, and the appended claims.

BRIEF DESCRIPTION OF THE DRAWINGS

FIG. 2b is a flow chart illustrating the inputting and reporting of a Project Sentence of Credit Construct via the Industry Credit Inductive Lineage Construct Matrix according to the above preferred embodiment of the present invention.

FIG. 9c is a diagrammatic legend display of the data life cycle template with appropriate text according to the above preferred embodiment of the present invention.

FIG. 10b is a diagram illustrating the overlapping of credit instances developed from the Industry Credit Inductive Lineage Construct Matrix with appropriate text according to the above preferred embodiment of the present invention.

FIG. 10c is a diagram illustrating the intersecting of credit instances developed from the Industry Credit Inductive Lineage Construct Matrix with appropriate text according to the above preferred embodiment of the present invention.

FIGS. 17a, 17b and 17c are diagrams showing the reporting modules of the Web Press Kit, including the Project Sentence of Credit Construct within a Featured Credits reporting module, according to the above preferred embodiment of the present invention.

FIG. 17f is a diagram illustrating an Additional Credit Page in the Press Kit Report according to the above preferred embodiment of the present invention.

FIG. 17g is a diagram illustrating an Automatic Credit Report according to the above preferred embodiment of the present invention.

FIGS. 21a to 21i are schematic diagrams illustrating the homepages of various application, including ShowTown, Showscape, Mediawalk, Showchat, Showtrade, Showire, Peopleads, Showlinks, and Showtown World Wide, according to the above preferred embodiment of the present invention.

DETAILED DESCRIPTION OF THE PREFERRED EMBODIMENT

Figure 1:
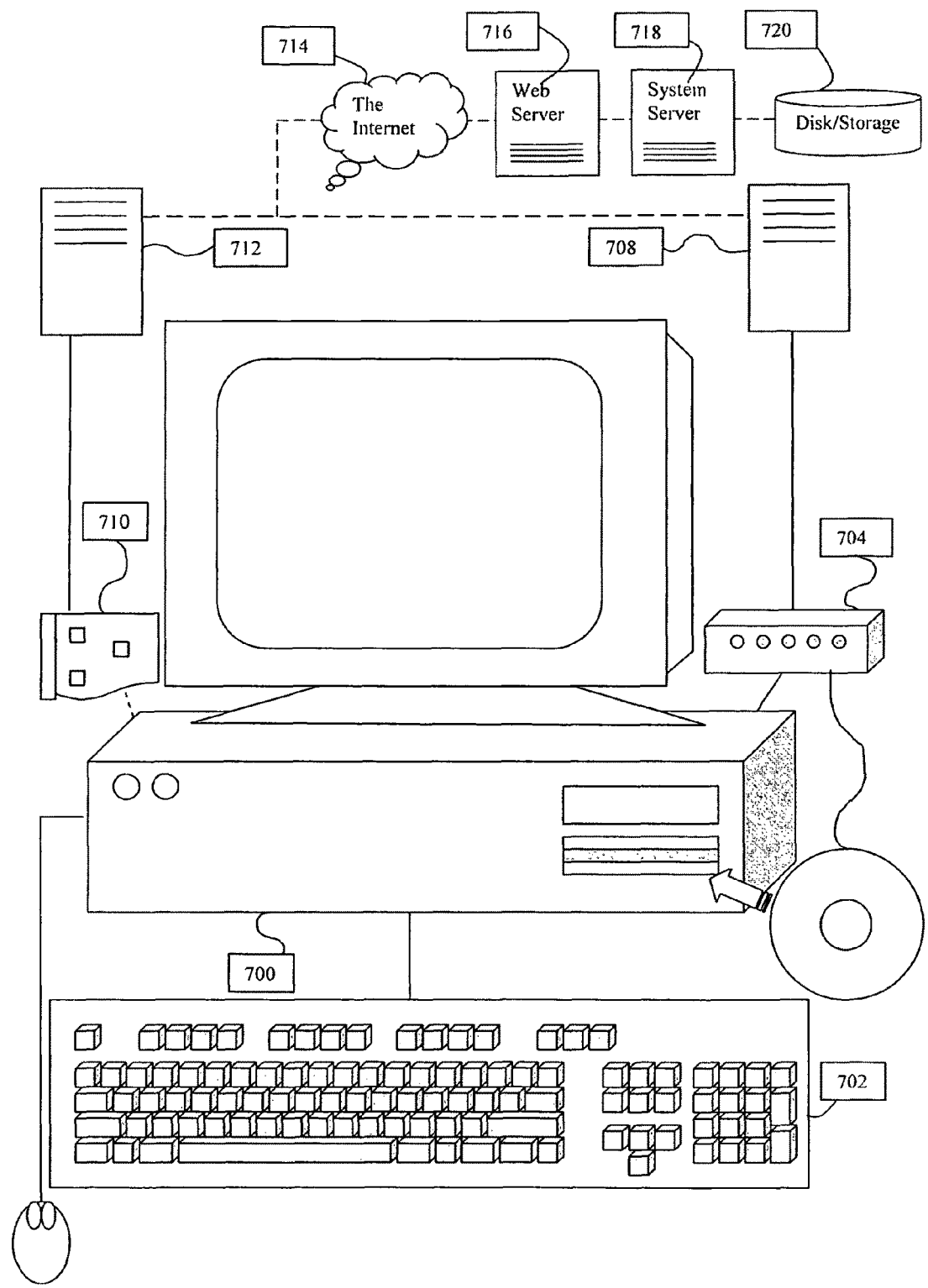
FIG. 1 is a diagram illustrating a client computer system of a user connecting to a server computer system via the Internet.

Referring to the drawings of the invention, a human resource networking system and method thereof are illustrated. It is also understood that the components could be designed, arranged and developed in a myriad of configurations not displayed. It is also understood that the following detailed description of the present invention as referenced in the drawings are not intended to limit the scope of the present invention as claimed, but is only for illustration of the preferred embodiment of the present invention.

The present preferred embodiments of the invention will best be understood by reference to the drawings, wherein like parts are designated by like numerals throughout Referring to FIG. 1, a Client Computer System 700, comprising a Keyboard 702, a device that establishes a two-way communication through a network such as a Modem 704 and/or a Network Interface Card 710 may connect to a Web Server 716 for retrieving web pages via a communication network used for a client-server setup, such as the Internet, an Intranet, an Extranet Internet or a Local Area Network 714. The Web Server 716 is connected to a System Server 718 which is connected to a Storage Device 720 and delivers the information in Relational Databases 100 contacts the System Server 718, wherein the Web Server 716 contacts the System Server 718 to retrieve the information from a Disk/Storage. The Storage Device 720 can be a hard drive or a networked storage device, in which the data in the Relational Databases 100 resides in the disk/storage Referring to FIG. 2a, a People Input Module 314, a Places Input Module 316, a Projects Input Module 318, and a Things Input Module 320 are used by the Client Computer System 700 to perform Data Input 300 into the Relational Databases 100.

All the information is stored in the Relational Database 100 which contains a Relational Information 120 and an Industry Credit Inductive Lineage Construct Matrix 162 for data storage and retrieval.

The Data 800 is located in the Storage Device 700, and is accessed by the System Server 718. The Relational Databases 100 are divided into the Industry Credit Inductive Lineage Construct Matrix 162, which is located on the System Server 718, and a Relational Information 120.

The People Input Module 314, which is used by a data entry person to input the Associative Information from the People, is a programmed module that is used to edit and update the Industry Credit Inductive Lineage Construct Matrix 162 with Associative Information received from the People.

The Places Input Module 316, which is used by a data entry person to input the Associative Information from the Places, is a programmed module used to Edit and Update the Industry Credit Inductive Lineage Construct Matrix 162 with Associative Informative received from the Places.

The Project Input Module 318, which is used by a data entry person to input the Associative Information from the Projects, is a programmed module used to Edit and Update the Industry Credit Inductive Lineage Construct Matrix 162 with Associative Information Received from the Projects.

The Things Input Module 320, which is used by a data entry person to input the Associative Information from the Things, is a programmed module that is used to Edit and Update the Industry Credit Inductive Lineage Construct Matrix 162 with Associative Information received from the Things.

A People Query Module 506, a Places Query Module 508, a Projects Query Module 510, and a Things Query Module 512 are used by the Client Computer System 700 to query the Relational Databases 100, through a People Search Engine 518, a Places Search Engine 520, a Projects Search Engine 522, and a Things Search Engine 524 respectively.

The People Search Engine 518 queries the database and returns People Credit Bytes which are associations of People to Places, People to Projects, and People to Things extracted for a People Report that is a list of People that meet a Query Matrix criteria 514 which is a combination of credit bytes 164 on the reporting function, or a combination of search arguments on the search function, wherein the credit bytes 164 are information that is output from the Industry Credit Inductive Lineage Construct Matrix 162, comprising elements and associative values. The credit bytes 164 are output from the Industry Credit Inductive Lineage Construct Matrix 162 and are used in the Conjunctive Project Sentences of Credit Construct. The process occurs in a Report Writer 502, which is a module that creates reports from the database receives information from the Relational Databases 100 and produces Press Kit Reports and Search Returns 528 in response to queries.

The query matrix 514 shows how the credit bytes work and it shows how the search arguments work in performing the systems' functions. This is the format of the information going in as a search or coming out from credit bytes 164. The query matrix 514 is constructed in the Report Writer 502.

The Places Search Engine 520 queries the database and returns Places Credit Bytes which are associations of Places to People, Places to Projects, and Places to Things extracted for a Places Report. The Projects Search Engine 522 queries the database and returns Projects Credit Bytes which are associations of Projects to People, Projects to Places, and Projects to Things extracted for a Projects Report. The Things Search Engine 524 queries the database and returns Things Credit Bytes which are associations of Things to People, Things to Places, and Things to Projects extracted for a Things Report. In which, associations are Elements which are joined by Associative Values to specify how two Elements relate to each other.

The People Query Module 506, which is a module that allows user Queries to find People, accepts user search criteria and passes the information to the People Search Engine 518. The Places Query Module 508, which is module that allows user Queries to find Places, accepts user search criteria and passes the information to the Places Search Engine 520. The Projects Query Module 510, module that allows user Queries to find Projects, accepts user search criteria and passes the information to the Projects Search Engine 522. The Things Query Module 512, which is allows user Queries to find Thing, accepts user search criteria and passes the information to the Things Search Engine 524.

A People List Module 530, a Places List Module 532, a Projects List Module 522, and a Things List Module 524 generate a Search Return 528 which is a formatted list of Elements along with the Relational Information 120 which is all information that does not relate to the associations of elements. Relational information 120 that helps describe a single element. All relational information 120 is stored in the Relational Database 100.

The Elements displayed are only those that meet the Search Criteria. Elements in the Search Return 528 are hyperlinked if the element contains an active Press Kit Report. The Search Returns 528 are generated by the People, Places, Projects and Things Search Engines 518, 520, 522, 524. An element in the search return 528 may link to a Press Kit Report.

A People List Module 530 is a programmed module that outputs the search returns 528 featuring a list of People with hyperlinks to People Press Kits if those Press Kits are active and receives a list of People from the People Search and formats the Search Return 528.

A Places List Module 532 is a programmed module that outputs search returns 528 featuring a list of Places with hyperlinks to Places Press Kits if those Press Kits are active Receives a list of Places from the Places Search and formats the Search Return 528.

A Projects List Module 534 is a programmed module that outputs search returns 528 featuring a list of Projects with hyperlinks to Projects Press Kits if those Press Kits are active and receives a list of Projects from the Projects Search and formats the Search Return 528.

A Things List Module 536 is a programmed module that outputs search returns 528 featuring a list of Things with hyperlinks to Things Press Kits if those Press Kits are active and receives a list of Things from the Things Search and formats the Search Return 528.

In which, the People, Places, Projects, and Things Press Kits are respectively generated in a People Press Kit Generator Module 540, a Places Press Kit Generator Module 542, a Projects Press Kit Generator Module 544, and a Things Press Kit Generator Module 546 which are used in the Report Writer 502. In other words, the Press Kit Generator Modules 540, 542, 544, 54, which return records that meet the selection criteria in a document, are modules that creates the Press Kit Reports in response to Press Kit Requests, using Press Kit Parameters 160, Relational Information 120, and the Industry Credit Inductive Lineage Construct Matrix 162 for its information. In which, the Press Kit Parameters 160 is a table of information that instructs the Press Kit Generator modules 540, 542, 544, 546 on how to format and what information to display in a particular Element's Press Kit Report. Parameters include: relational include, relational exclude, personal include, personal exclude, links active/inactive, employee active/inactive/suspend.

Figure 2A:
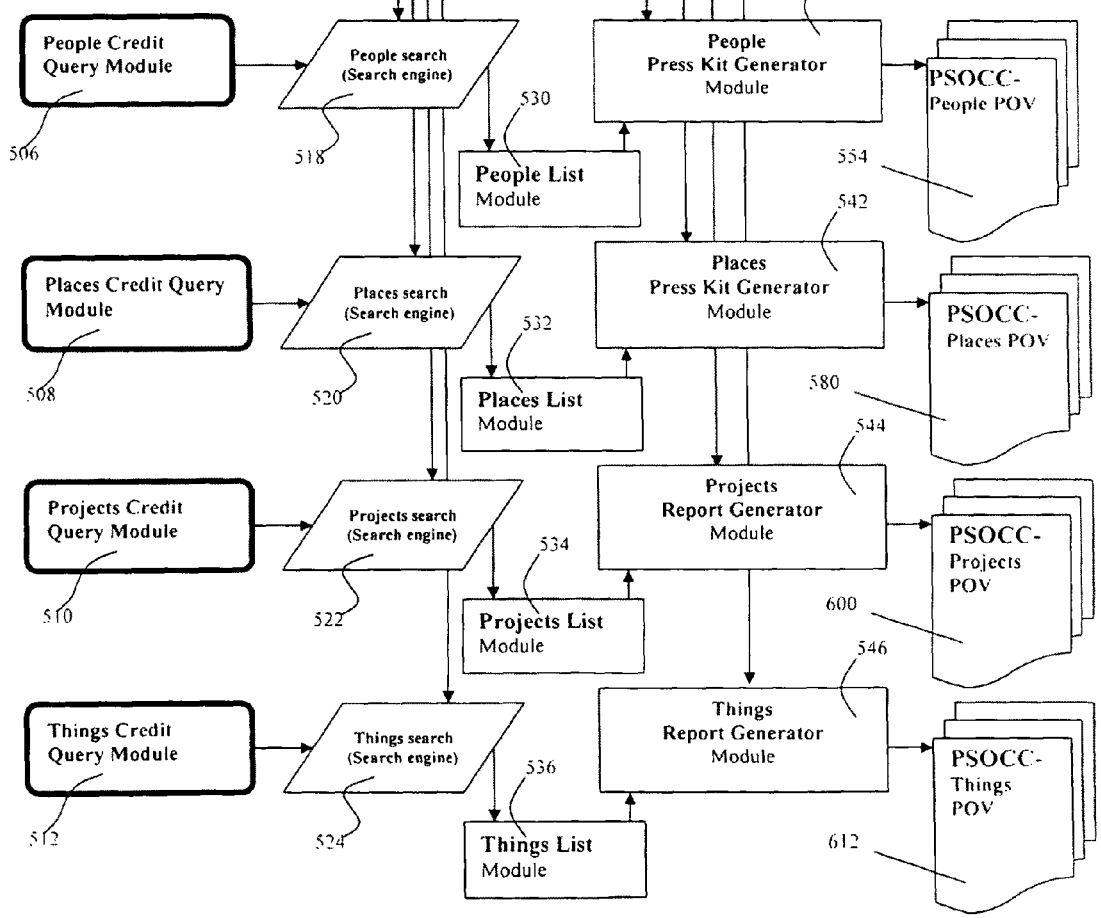
FIG. 2a is a block diagram illustrating schematic input modules of the four main elements and the output modules of the web press kit reports according to a preferred embodiment of the present invention, which contain at least the Conjunctive Sentence of Credit Construct with appropriate text.

As shown in FIG. 2a, Project Sentences of Credit Construct from a People Point of View 554, Project Sentences of Credit Construct from a Places Point of View 580, Project Sentences of Credit Construct from a Projects Point of View 600, and Project Sentences of Credit Construct from a Things Point of View 612 are reported on the Client Computer System 700, and are generated by the People Press Kit Generator Module 540, the Places Press Kit Generator Modules 542, the Projects Press Kit Generator Modules 544, and the Things Press Kit Generator Modules 546 respectively. Future Modules and Processes 334 may input and report the Data 800 in different fashions and for different intended use.

The Project Sentence of Credit Construct for People reports information from the Credit Bytes 164 and from the Relational Information 120 from the People Point of View 554 and displays in the credits module with hyperlinks to the Press Kit Reports of Elements within the sentence. The Project Sentence of Credit Construct for Places reports information from the Credit Bytes 164 and from the Relational Information 120 from the Places Point of View 580 and displays in the Credits Module with hyperlinks to the Press Kit Reports of Elements within the sentence. The Project Sentence of Credit Construct for Projects reports information from the Credit Bytes 164 and from the Relational Information 120 from the Projects Point of View 600 and displays in the Credits Module with hyperlinks to the Press Kit Reports of Elements within the sentence. The Project Sentence of Credit Construct for Things reports information from the Credit Bytes 164 and from the Relational Information 120 from the Things Point of View 612 and displays in the Credits Module with hyperlinks to the Press Kit Reports of Elements within the sentence.

The People Search Engine 518 accepts criteria from the People Query Module 506 and passes the results to the People List Module 530. The Places Search Engine 520 accepts criteria from the Places Query Module 508 and passes the results to the Places List Module 532. The Projects Search Engine 522 accepts criteria from the Projects Query Module 510 and passes the results to the Projects List Module 534. The Things Search Engine 524 accepts criteria from the Things Query Module 512 and passes the results to the Things List Module 536.

Referring now to FIG. 2b, the People Input Module 314, the Places Input Module 316, the Projects Input Module 318, and the Things Input Module 320 will input into the Industry Credit Inductive Lineage Construct Matrix 162. The People Query Module 506, the Places Query Module 508, the Projects Query Module 510, and the Things Query Module 512 will enter queries that result in the reporting of Project Sentences of Credit Construct from the People Point of View 554, Project Sentences of Credit Construct from the Places Point of View 580, Project Sentences of Credit Construct from the Projects Point of View 600, and Project Sentences of Credit Construct from the Things Point of View 612.

Figure 2C:
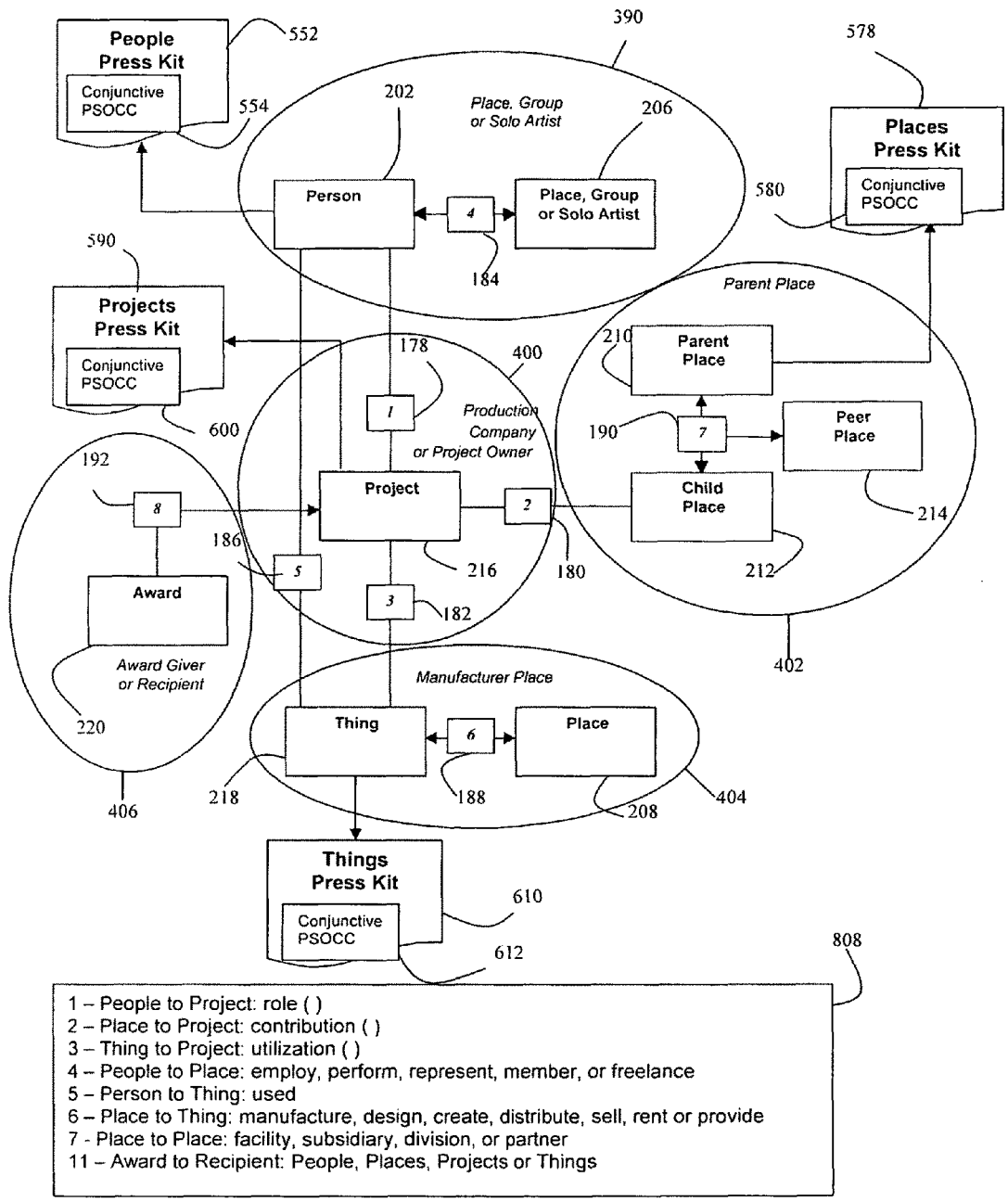
FIG. 2c is a flow chart overview the above preferred embodiment of the present invention.

Referring now to FIG. 2c, a People Press Kit 552, containing Conjunctive Project Sentences of Credit Construct from the People Point of View 554, is outputted from the People Press Kit Generator Module 540 in the Report Writer 502 in response to a Press Kit Request for the People 202, where People 202 are associated to a Place, Group, or Solo Artist 206 by a People to Places Associative Value 184, whose Association Validation Rules 420 are delegated to the Place, Group, or Solo Artist Ring of Authority 390. It is readily understood that a Ring of Authority is necessary to delineate control of information to facilitate validated and verified information as reported.

A Places Press Kit 578, containing Conjunctive Project Sentences of Credit Construct from the Places Point of View 580, is outputted from the Places Kit Generator Module 542 in the Report Writer 502 in response to a Press Kit Request and reports for a given Parent Place 210. A Child Place 212 and a Peer Place 214 are associated to the Parent Place 210 by a Places to Places Associative Value 190, whose Association Validation Rules 420 are delegated to the Parent Place Ring of Authority 402.

A Projects Press Kit 590, containing Conjunctive Project Sentences of Credit Construct from the Projects Point of View 600, is outputted from the Projects Kit Generator Module 544 in the Report Writer 502 in response to a Press Kit Request for Projects and reports for a given Project 216. A Project 216 is associated to People 202 by a People, to Projects Associative Value (Role Value) 178. Projects 216 are associated to a Child Place 212 by a Places to Projects Associative Value (Contribution Value) 180. A Project 216 is associated to a Thing 218 by a Things to Projects Associative Value (Utilization Value) 182, whose Association Validation Rules 420 are delegated to the Production Company or Project Owner Ring of Authority 400.

A Things Press Kit 610, containing Conjunctive Project Sentences of Credit Construct from the Things Point of View 612, is outputted from the Things Kit Generator Module 546 in the Report Writer 502 in response to a Press Kit Request and reports for Things 218. Things 218 are associated to Places 208 by a Thing to Places Associative Value 188, whose Association Validation Rules 420 are delegated to the Manufacturer Place Ring of Authority 404. People 202 are associated to Things 218 by a People to Things Associative Value 186, whose Association Validation Rules 420 are delegated to the Production Company or Project Owner Ring of Authority 400.

Industry Awards 220 are associated to a Credit Construct 199 which is an Association between the four elements People 202, Places 204, Projects 216, and Things 218 joined by the Associative Values of People to Projects Associative Value (Role Value) 178, Places to Projects Associative Value (Contribution Value) 180, and Things to Projects Associative Value 182 (Utilization Value).

These Awards 220 are taken from the Awards Table 114. Awards 220 are associated to the credit construct. The Awards 220 to recipient associative value determines who is the recipient of the Award, either the People 202, Places 204, Projects 216, or Things 218. In other words, Awards 220 are associated to Projects 216, People 202, or a Child Place 212, or Things 218, by the Awards to Recipient Associative Value 198, whose Association Validation Rules 420 are delegated to the Award Giver or Recipient Ring of Authority 406.

The People 202, Places 204, Projects 216, and Things 218 are four Elements identified by an ID number within the Relational Database 100. People 202 perform a Service or Function that contributed to the development or production of a Product or Project, wherein People Elements are used in the Credit Construct 199. They are also defined in a People Information Table 104 and a People Relational Information Table 124.

A People Information Table 104 is a database table for storing the basic information about the People 202. People Information Table 104 stores the People ID, First Name, Last Name, Nick Name (AKA), Professional Title, and Description. The Validate Associations 418 process uses this information to help identify the element. Some or all of this information may be reported in the Press Kit Report.

A People Relational Information Table 124 is a database table that holds and stores the People Relational Information 122 which is Relational information about the People 202. The Validate Associations 418 process uses this information to help identify the People. Some or all of this information may be reported in the Press Kit Report.

The Places 204 is one of the four Elements, identified by an ID number within the Relational Database 100. The Places 204 are where a Service or Function was performed that contributed to the development or production of a Projects, Product or Service. Places Elements 206 are used in the Credit Construct 199. They are also defined in the Places Information Table 106 and Places Relational Information Table 130.

The Place Elements 206, where the Place is either a Place, a Group, or a Solo Artist, as defined by the Place Kind Field in a Places Information Table 106 which is a database table that contains the information about Places 204, may be associated as Parent elements to a Child People element with associative values "employ", "perform", "represent", "member", and "freelance".

Places 204 are the physical locations where work was done. Places Information Table 106 is used for storing the basic information about the places 204 such as the Places ID, Places Name, Places Type, Places Kind (e.g. Entertainment Company, Facility, Manufacturer, Services, Group Artist, or Solo Artist), Places Description, and Places Positions. The Validate Associations 418 process uses this information to help identify the element. Some or all of this information may be reported in the Press Kit Report.

The Places Information Table 106 contains a manufacturer place, a parent place, a child place, and a peer place. The manufacturer place is a Place Element where the Place Kind field is set with a value, may be associated to a thing using a Places to Things Associative Value within a table in the Industry Credit Inductive Lineage Construct Matrix 162.

The Parent Place is a Place that is in the Parent position in an Association between two Places. The Parent Position is determined by the selected Value for a Places to Places Associative Value. A Parent Place is associated to a Child Place using the Places to Places Associative Value within the table in the Industry Credit Inductive Lineage Construct Matrix 162.

The Child Place is a Place that is in the Child position in an Association between two Places. The Child Position is determined by the selected Value for the Places to Places Associative Value. The Parent Place is Associated to a Child Place using the Places to Places Associative Value within the table in the Industry Credit Inductive Lineage Construct Matrix 162.

The Peer Place is a Place that has a Peer Association with another Place. Two Places have a Peer Association when they are both Associated as Childs to the same Parent Place. The Peer Place may appear in the Press Kit Reports.

A Places Relational Information Table 130 is database table that holds and stores the Places Relational Information 126 which is Relational information about the Places 204. The Validate Associations 418 process uses this information to help identify the Places 204. Some or all of this information may be reported in the Press Kit Report.

The Projects 216 is one of the four Elements and Projects Elements are used in the Credit Construct 199 and defined in a Projects Information Table 108 and a Projects Relational Information Table 134. The projects Information table 108 is a database table that contains the information about the Projects. Projects are the result of the work that was done.

The Projects Information Table 108 stores the Projects ID, Projects Name, Projects Type, Projects Release Date, and Projects Description It is for storing the basic information about the Projects 216. The Validate Associations 418 process uses this information to help identify the element. Some or all of this information may be reported in the Press Kit Report.

The Projects Relational Information Table 134 is a database table that holds and stores Projects Relational Information 132 which is a relational information about the Projects. The Validate Associations 418 process uses this information to help identify the Projects. Some or all of this information may be reported in the Press Kit Report.

The Things 218 is one of the four Elements and Things Elements are used in the Credit Construct 199 and defined in a Things Information Table 110 and a Things Relational Information Table 138.

The Things Information Table 110 is a database table that contains the information about the Things. Things are tools used in production. Things Information Table 110 stores the Thing Name, Thing Type, and Thing Description Storing the basic information about the Things. The Validate Associations 418 process uses this information to help identify the element. Some or all of this information may be reported in the Press Kit Report.

The Things Relational Information Table 138 is a database table that holds and stores the Things Relational Information 136 which is relational information about the Things 218. The Validate Associations 418 process uses this information to help identify the Things 218. Some or all of this information may be reported in the Press Kit Report.

Figure 2D:
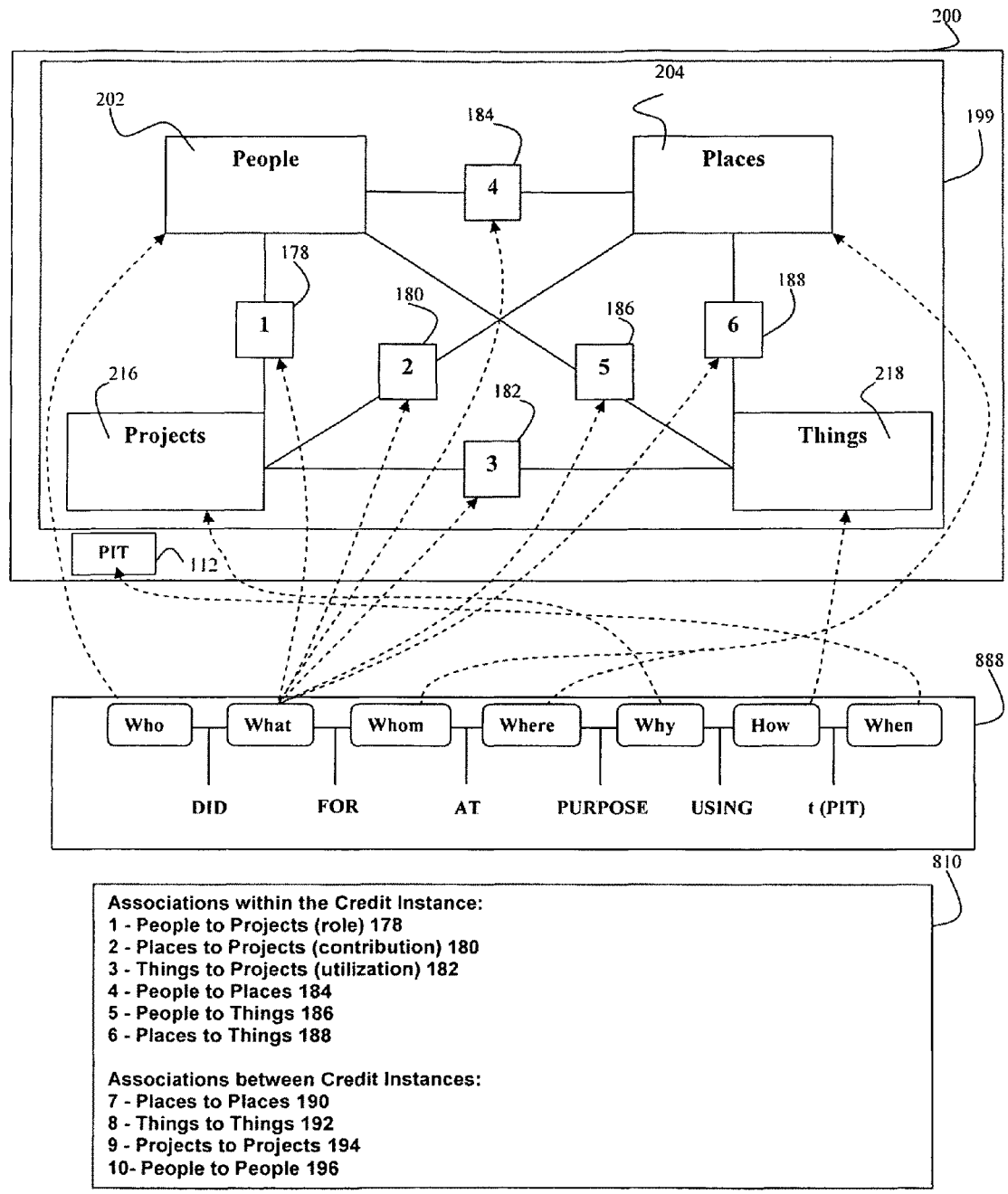
FIG. 2d is a diagram illustrating the Credit Instance and Credit Construct of the Industry Credit Inductive Lineage Construct Matrix according to the above preferred embodiment of the present invention.

Referring to FIG. 2d, a Credit Instance 200 may comprise the People 202, Places 204, Projects 216 and Things 218 associated by different Associative Values 116 including the People to Projects Associative Value (Role Value) 178, the Places to Projects Associative Value (Contribution Value) 180, and the Things to Projects Associative Value (Utilization Value) 182 in relation to a Point In Time 112. Credit Instance to Credit Instance associations include People to Places Associative Value 184, People to Things 186 Associative Value, and Places to Things Associative Value 188. Lineage Associations 866, achieved through the Association 176 of a Credit Instance 200 to another Credit Instance 200, comprising Places to Places Associative Value 190, Things to Things Associative Value 192, Projects to Projects Associative Value 194, and People to People Associative Value 196.

The Credit Instance 200 is a Credit Construct 119 with the Point In Time (PIT) 112. The Credit Instance 200 delineates when a Credit Construct 199 occurs. This allows inferences to be made when credit constructs 199 overlap at the same point in time (intersect). The Point In Time 112 that is used is dependent on the embodiment's rules defining a Point In Time 112. In other words, a credit bit 102 that associates a Credit Construct 199 to a Point In Time (PIT) 112 thus creates a Credit Instance 200. The Point In Time 112 defines when the effort happened Determines when constructs intersect so that inferences can be made. The Credit Bits 102, which are Elements, Association Values, and Point Time, are components that go into making Conjunctive Project Sentences of Credit Construct. The Credit Bits 102 are composed of the values extracted from the credit data.

The Associates Values 116 are database fields that describe the association between two Elements (People, Places, Projects, Things). In other words, the Associates Values 116 are associative values used to join People to Projects (Role Value), Places to Projects (Contribution Value), and Things to Projects (Utilization Value) in the Credit Construct 199. Construct-to-construct associations use associative values for People to People, People to Places, People to Things. Places to Things, Things to Things, Places to Places, and Projects to Projects.

The People to Projects Associative Value (Role Value) 178 is an associative value that joins People 202 to Projects 216. The Role Value 178 is what the People 202 did on the Project 216. The Role Value 178 is used in the association of People to Projects within the Credit Construct 199. It uses a list of updateable values from the Associative Value Table. The existence of this Association between two elements may cause a hyperlink in the Conjunctive Project Sentences of Credit Construct to appear in the elements' Press Kit Reports.

The Places to Projects Associative Value (Contribution Value) 180 is an associative value that joins Places 204 to Projects 216. The Contribution Value 180 is what the Places 204 did on the Projects 216. The Contribution Value 180 is used in the association of Places to Projects within the Credit Construct 199. It also uses a list of updateable values from the Associative Value Table. The existence of this Association between two elements may cause a hyperlink in the Conjunctive Project Sentences of Credit Construct to appear in the elements' Press Kit Reports.

The Things to Projects Associative Value (Utilization Value) 182 is an associative value that joins Things 218 to Projects 216. The Utilization Value 182 is used in the association of Things to Projects within the Credit Construct 199. It also uses a list of updateable values from the Associative Value Table. Again, the existence of this Association between two elements may cause a hyperlink in the Conjunctive Project Sentences of Credit Construct to appear in the elements' Press Kit Reports.

A People to Places Associative Value 184 is an associative value that joins People 202 to Places 204. It uses a fixed list of values, which may include "employ", "perform", "represent", "member," and "freelance". This is used in the association of People to Places between Credit Constructs 199. It uses a list of updateable values from the Associative Value Table. Again, the existence of this Association between two elements may cause a hyperlink in the Conjunctive Project Sentences of Credit Construct to appear in the elements' Press Kit Reports.

A People to Things Associative Value 186 is an associative value that joins People 202 to Things 218. It uses a fixed list of values, which may include "Used". This is used in the association of People to Things between Credit Constructs 199. It also uses a list of updateable values from the Associative Value Table. Again, the existence of this Association between two elements may cause a hyperlink in the Conjunctive Project Sentences of Credit Construct to appear in the elements' Press Kit Reports.

A Places to Things Associative Value 188 is an associative value that joins Places 204 to Things 218. It uses a fixed list of values, which may include "manufacture", "design", "create", "distribute", "sell", "rent" and "provide". This is used in the association of Places to Things between Credit Constructs 199. Also, It uses a list of updateable values from the Associative Value Table and the existence of this Association between two elements may cause a hyperlink in the Conjunctive Project Sentences of Credit Construct to appear in the elements' Press Kit Reports.

A Places to Places Associative Value (Structure Value) 190 is an associative value that joins Places 204 to Places 204. It uses a fixed list of values, which may include "facility", "subsidiary", "division", or "partner". The Structure Value 190 is used in the association of Places to Places between Credit Constructs 199. Also, It uses a list of updateable values from the Associative Value Table and the existence of this Association between two elements may cause a hyperlink in the Conjunctive Project Sentences of Credit Construct to appear in the elements' Press Kit Reports.

A Things to Things Associative Value (Integration Value) 192 is an associative value that joins Things 218 to Things 218. The Integration Value 192 uses a fixed list of values, which may include "component". This is used in the association of Things to Things between Credit Constructs 199. Again, it uses a list of updateable values from the Associative Value Table and the existence of this Association between two elements may cause a hyperlink in the Conjunctive Project Sentences of Credit Construct to appear in the elements' Press Kit Reports.

A Projects to Projects Associative Value (Usage Value) 194 is an associative value that joins Projects 216 to Projects 216. The Usage Value 194 uses a fixed list of values, which may include "component". This is used in the association of Projects to Projects between Credit Constructs 199. Also, it uses a list of updateable values from the Associative Value Table and the existence of this Association between two elements may cause a hyperlink in the Conjunctive Project Sentences of Credit Construct to appear in the elements' Press Kit Reports.

A People to People Associative Value (Organization Value) 196 is an associative value that joins People 202 to People 202. The Organization Value 196 uses a fixed list of values, which may include "colleague". This is used in the association of People to People between Credit Instances 199. This Association may also cause a hyperlink in the Conjunctive Project Sentences of Credit Construct to appear.

An Awards to Recipient Associative Value 198 is an associative value that specifies People 202, Places 204, Projects 216, or Things 218 as an Award Recipient. This is used in the association of Awards to the Credit Construct 199 in order to define which element in the Credit Construct 199 received the Award 220.

Figure 2E:
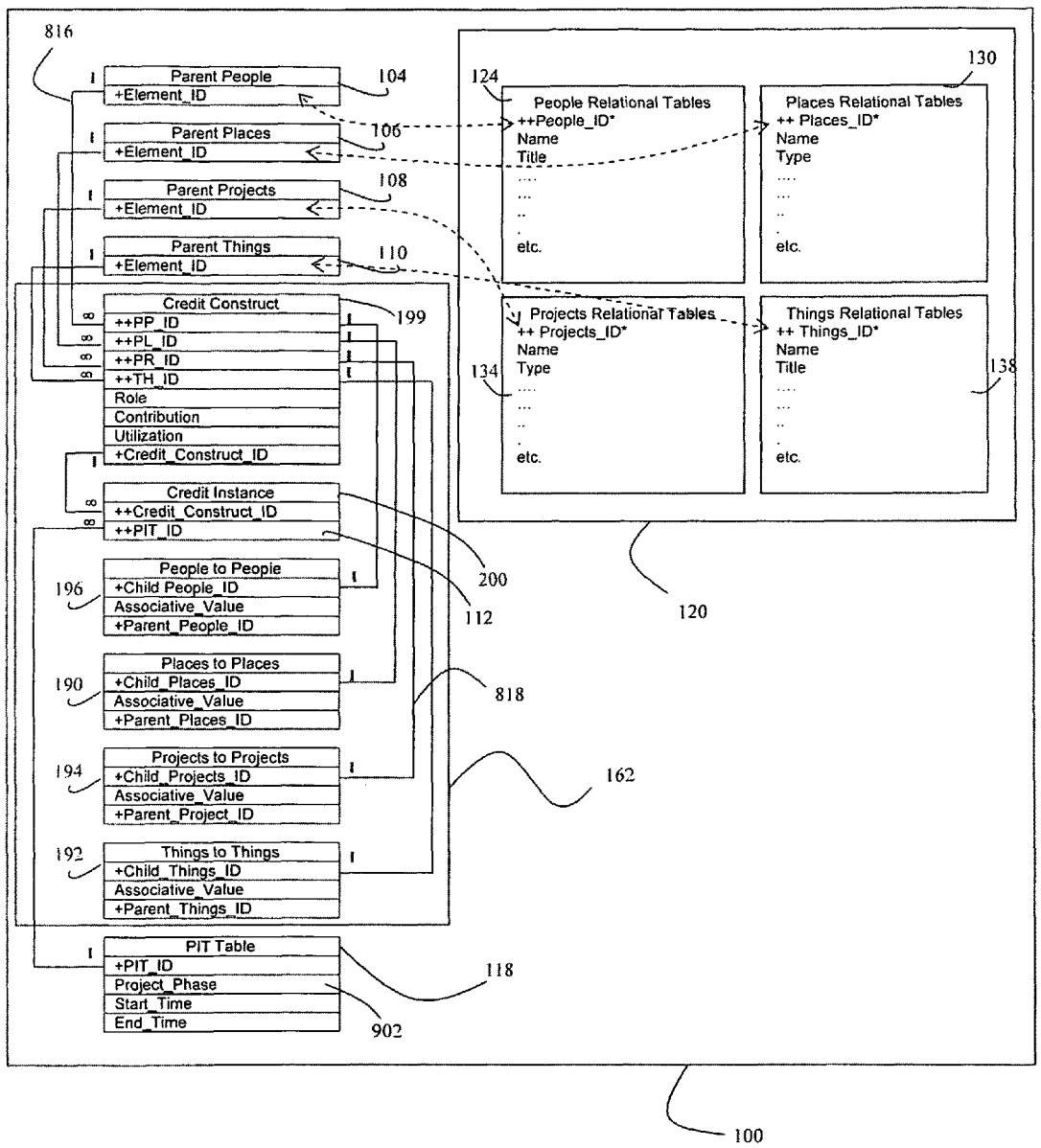
FIG. 2e is a diagram showing the element and Industry Credit Inductive Lineage Construct Matrix tables for the Conjunctive Project Sentence of Credit Construct according to the above preferred embodiment of the present invention.

Referring to FIG. 2e, The People Information Table 104, the Places Information Table 106, the Projects Information Table 108, and the Things Information Table 110 are related to the Credit Construct 199 via a One to Many Relationship 816 which is used in the Industry Credit Inductive Lineage Construct Matrix 162. The People to People Associative Value 196, the Places to Places Associative Value 190, The Projects to Projects Associative Value 194, and the Things to Things Associative Value 192 have a One to One Relationship 818 used in the Industry Credit Inductive Lineage Construct Matrix 162 with the Credit Construct 199. The Places Information Table 106, the Projects Information Table 108, and the Things Information Table 110 are linked to the People Relational Information Table 124, the Places Relational Information Table 130, the Projects Relational Information Table 134, and the Things Relational Information Table 138, respectively. The Credit Construct 199 is related to the Credit Instance 200 by the One to Many Relationship 816. The Point in Time 112 within the Credit Instance 200 comes from the Point in Time Table 118 which is a table that stores the points in time 112 (e.g. concept development, pre-production, production, post-production, manufacturing/distribution/promotion), and phase start and end times An ID in the Point in Time Table 118 is tied to the Credit Construct 199 which hence forms the Credit Instance 200.

Figure 3A:
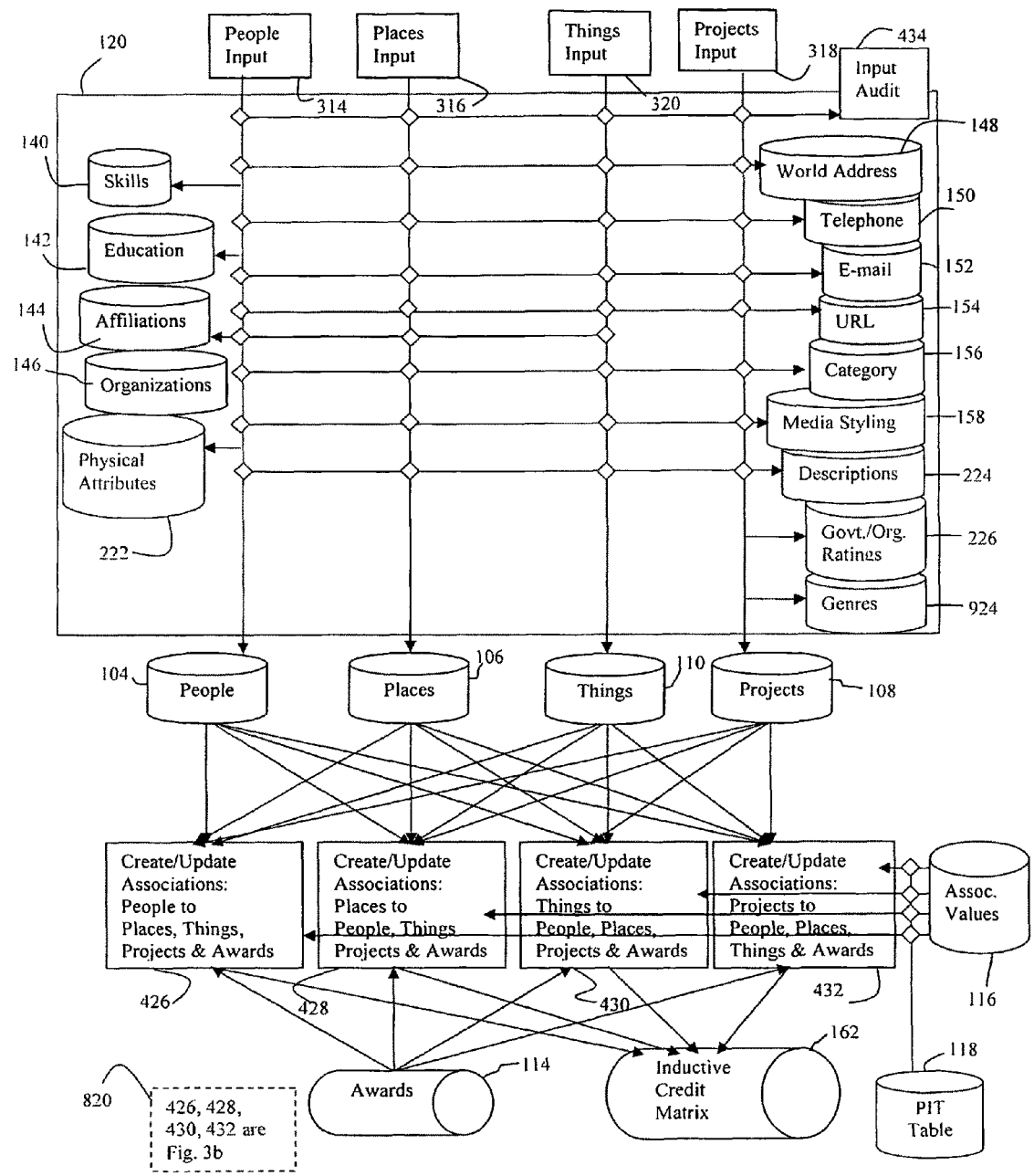
FIG. 3a is a diagram of the four main elements' relational and associative input overview with appropriate text according to the above preferred embodiment of the present invention.

Referring to FIG. 3a, the Relational Information 120 is input by the People Input Module 314, the Places Input Module 316, the Things Input Module 320, and the Projects Input Module 318. The Relational Information 120 may include Address 148, Telephone 150, E-mail 152, URL 154, Category 156, MediaStyling 158, Skills 140, Education 142, Physical Attributes 222, Descriptions 224, Government/Organizational Ratings 226, and Affiliations 144 which are related to Organizations 146.

The Skills 140, which is a table of information about skills and talents, including a skill/talent field and a skill/talent description field, may be related to People 202 to describe what tasks they are capable of performing, to the extent that it will help them be chosen for upcoming Projects 216.

The Education 14, which is a table of information about Education and Training, including degrees and certifications including the fields institution name, degree/certification name, education description, and year received, may be related to People 202 to describe what their educational and training background is, to the extent that it will help them be chosen for upcoming Projects 216.

The Affiliations 144 is a table containing information that relates People and Places to Organizations. It's for showing what Organizations People 202 and Places 204 are members of. This information may be reported in Press Kit Reports for People 202 and Places 204. This information is helpful in promoting the People 202 and the Places 204 for use in upcoming Projects because of the organizations that they are a member of may help them get work.

The Organizations 146, which is a table containing information about Organization, relates to the People 202 and the Places 204 through the Affiliations 144 in order to show what Organizations they are a member of.

The Addresses 148, which is a table of information containing addresses, is related to People 202, Places 204, Projects 216 and Things 218 to report where a Person, Place, Project, or Thing resides at or may be contacted in the Press Kit Reports via postal mail.

The Telephone 150, which is a table of information containing telephone numbers, is related to People 202, Places 204, Projects 216 and/or Things 218, to show how somebody may contact them by using a telephone. This information is reported in Press Kit Reports.

The Email 152, which is a Table of information containing Email Addresses, is related to People 202, Places 204, Projects 216 and/or Things 218, to show how somebody may contact them by using Email. This information is reported in Press Kit Reports.

The URL 154 is a table of information containing URLs which are Universal Resource Locator Addresses. The URLs 154 are used for retrieving Web Pages through the Internet, as well as FTP sites and Gopher Sites URL is related to People 202, Places 204, Projects 216 and Things 218 to display in Press Kit Reports the address of their web site, or other sites.

The Category 156 is a table of information containing the Seven Media Categories Music, Theater, Radio, Television, Video, Multimedia. The table also contains the IDs of the elements that are related to each category. It shows what media category an element belongs to, to the extent that it helps define the type of industry work they have done and will be doing. This information may be reported in the Press Kit Reports.

The MediaStyling 158 is the information reported in the Press Kit Report' Media Styling Module to describe how a person likes to perform their work. This information is helpful in promotion.

The Physical Attributes 222, which is data store that holds the physical attributes (e.g. eye color, hair color, height, etc.), are related to elements, often People 202. Physical attributes are used in the practice of casting.

The Description Fields 224 are blocks of text that give the Press Kit Owner additional creative space to present themselves. It is used in various modules of the Press Kit Report. May also be searched by the search engine.

The Ratings 226 is an independent system applied to a project that provides information about the content and/or appropriateness of the content to a prospective consumer. The Ratings 226 are related to Projects and appear in the Conjunctive Project Sentences of Credit Construct 199 in a pop-up display.

The People Information Table 104, the Places Information Table 106, the Things Information Table 110, and the Projects Information Table 108 are associated to the Awards 114, and the People 202, Places 204, Projects 216, and Things 218 are used in the Industry Credit Inductive Lineage Construct Matrix 162, joined by Associative Values 328. All input goes to the Input Audit Process 434 which tracks all changes to the Relational Databases 100. Data 800 for Category 156 may be Music 954, Theater 956, Radio 958, Movies 960, Television 962, Multimedia 964, the Web 966, and Other 968.

In which, the Input Audit Process 434 is a process for recording input and maintenance actions by the input and maintenance process. An Audit Table 228 is a table that holds information that tracks the input and maintenance actions that have occurred throughout the life of the system. It is used by the Input Audit Process.

Figure 3B:
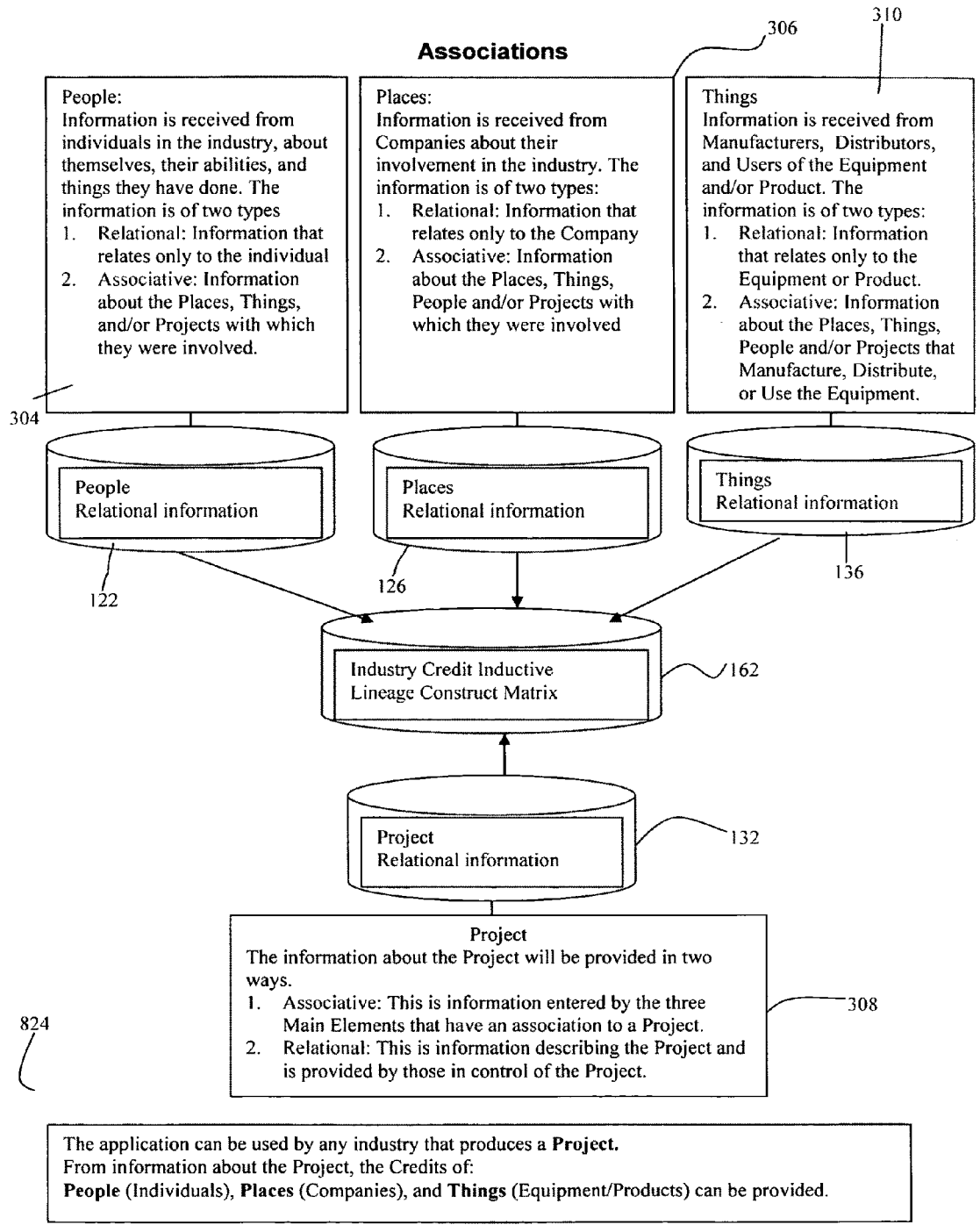
FIG. 3b is a schematic diagram illustrating the relational and associative information inputting process of the method's four main elements which consist of People, Places, Projects and Things with appropriate text according to the above preferred embodiment of the present invention.

Referring to FIG. 3b, the information is provided for input in either of two ways: a People Relational or Associative Information Process 304, a Places Relational or Associative Information Process 306, a Projects Relational or Associative Information Process 308, and a Things Relational or Associative Information Process 310. If the information is relational, it is input into the People Relational Information Tables 122, the Places Relational Information Tables 126, the Projects Relational Information Tables 132, and the Things Relational Information Tables 136. If the information is Associative, it is input into the Industry Credit Inductive Lineage Construct Matrix 162.

The People Relational or Associative Information Process is a Process that receives Associative (Credit Data) and People Relational Information 122 from the People 202. This process receives information from People outside the system and passes it to the input process where the information is input as Relational Information or Associations of People, Places, Projects, and Things.

The Places Relational or Associative Information Process 306 is a process that receives Associative (Credit Data) and Places Relational Information 124 from the Places 204. This process receives information from People outside the system and passes it to the input process where the information is input as Relational Information or Associations of People, Places, Projects, and Things.

The Projects Relational or Associative Information Process 308 is a process that receives Associative (Credit Data) and Projects Relational Information 126 from the Projects 216. This process receives information from People outside the system and passes it to the input process where the information is input as Relational Information or Associations of People, Places, Projects, and Things.

The Things Relational or Associative Information Process 310 is a process that receives Associative (Credit Data) and Places Relational Information 128 from the Things 218. This process receives information from Things outside the system and passes it to the input process where the information is input as Relational Information or Associations of People, Places, Projects, and Things.

Figure 3C:
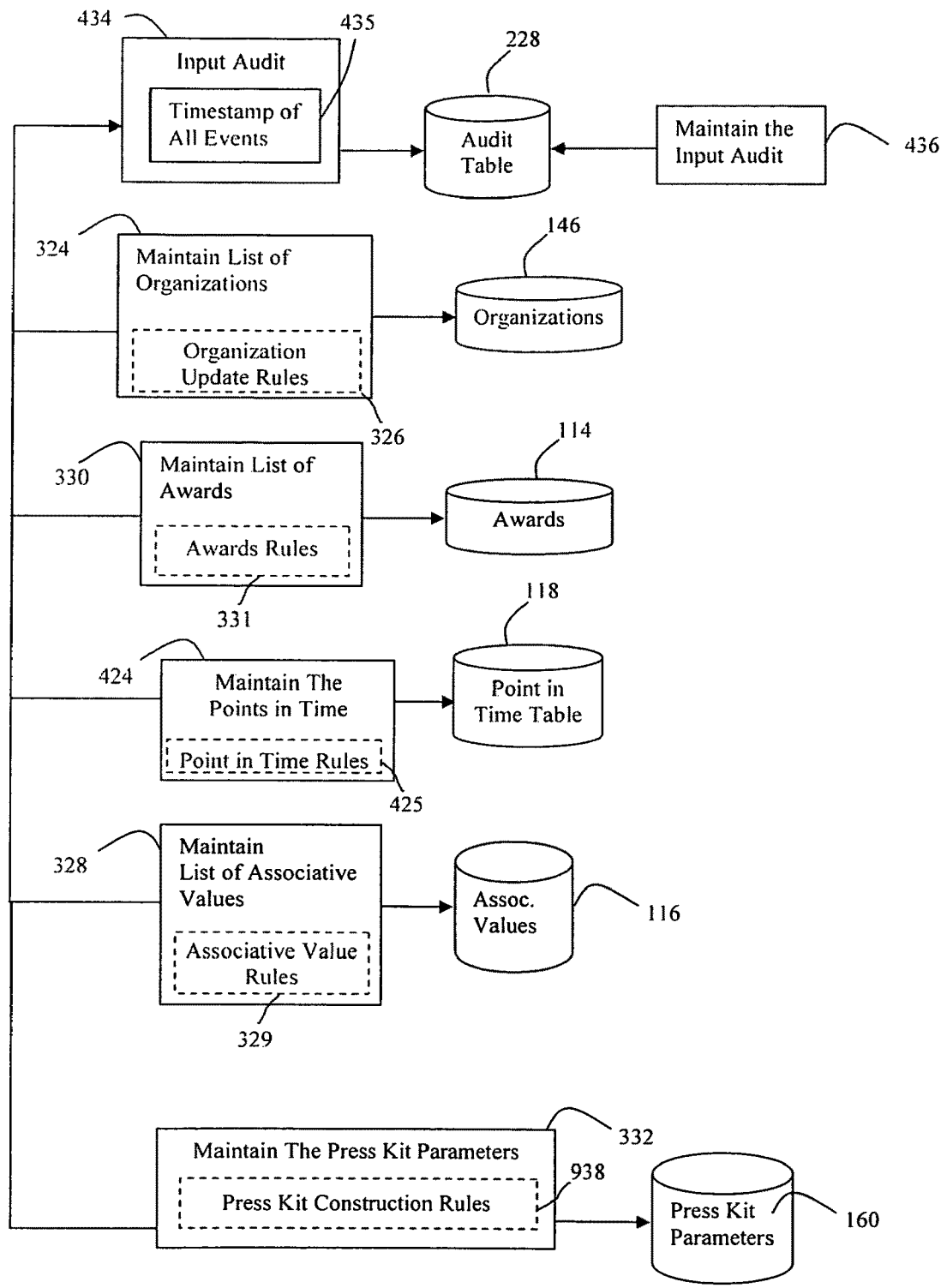
FIG. 3c is a diagram illustrating the Maintain the Input Audit Process, the Maintain List of Organizations Process, the Maintain Awards Process, the Maintain the Points In Time Process, the Maintain List of Associative Values Process, and the Maintain the Press Kit Parameters Process according to the above preferred embodiment of the present invention.

Referring to FIG. 3c, the Maintain List of Organizations 324 process maintains the Organizations 146 according to the Organization Update Rules 326, the Maintain List of Associative Values 328 process maintains the Associative Values 116 according to the Associative Value Rules 329, and the Maintain List of Awards 330 process maintains the list of Awards 114 according to the Awards Rules 331.

The Maintain The Points in Time Process 424 maintains the Point in Time Table 118 by updating Point In Time Table 118 whenever there is a change to the Pont In Time Table 118 according to the Point in Time Rules 425. The Input Audit Process 434 is a process for recording input and maintenance actions by means of the Input and Maintenance Process so as to keep track of all changes to the Relational Databases 100 and performs a Timestamp of All Events 435, that is to attach the current time for any input or maintenance action where time is retrieved from the server by the Input Audit 434. The Input Audit 434 updates the Input Audit Table 228. The Maintain the Input Audit 436 process maintains the Input Audit Table 228.

The Maintain the Press Kit Parameters Process 332, which maintains the Press Kit Parameters 160 according to Press Kit Construction Rules 938, is a process for changing the Press Kit Parameters 160 for a particular Element's Press Kit Report in order to implement users' preferences for the display of information in their Press Kit Reports. This is used to change the Press Kit Parameters 160 for a particular Element's Press Kit Report, as part of the data entry process or in response to user request. Any aspect of a Press Kit Report 550 can be customized using said Press Kit Parameters 332, wherein the Press Kit Report 550 is Press Kit/Resume/Fact Sheet created dynamically. It will display all information that is a direct relation to the main element (People 202, Places 204, Things 218 or Projects 216). All associated elements are also reported with their relational information 120 in the respective Project Sentence of Credit Construct. The Press Kit Report is outputted from the Press Kit Generator in the Report Writer 502 in response to Press Kit Requests.

Figure 3D:
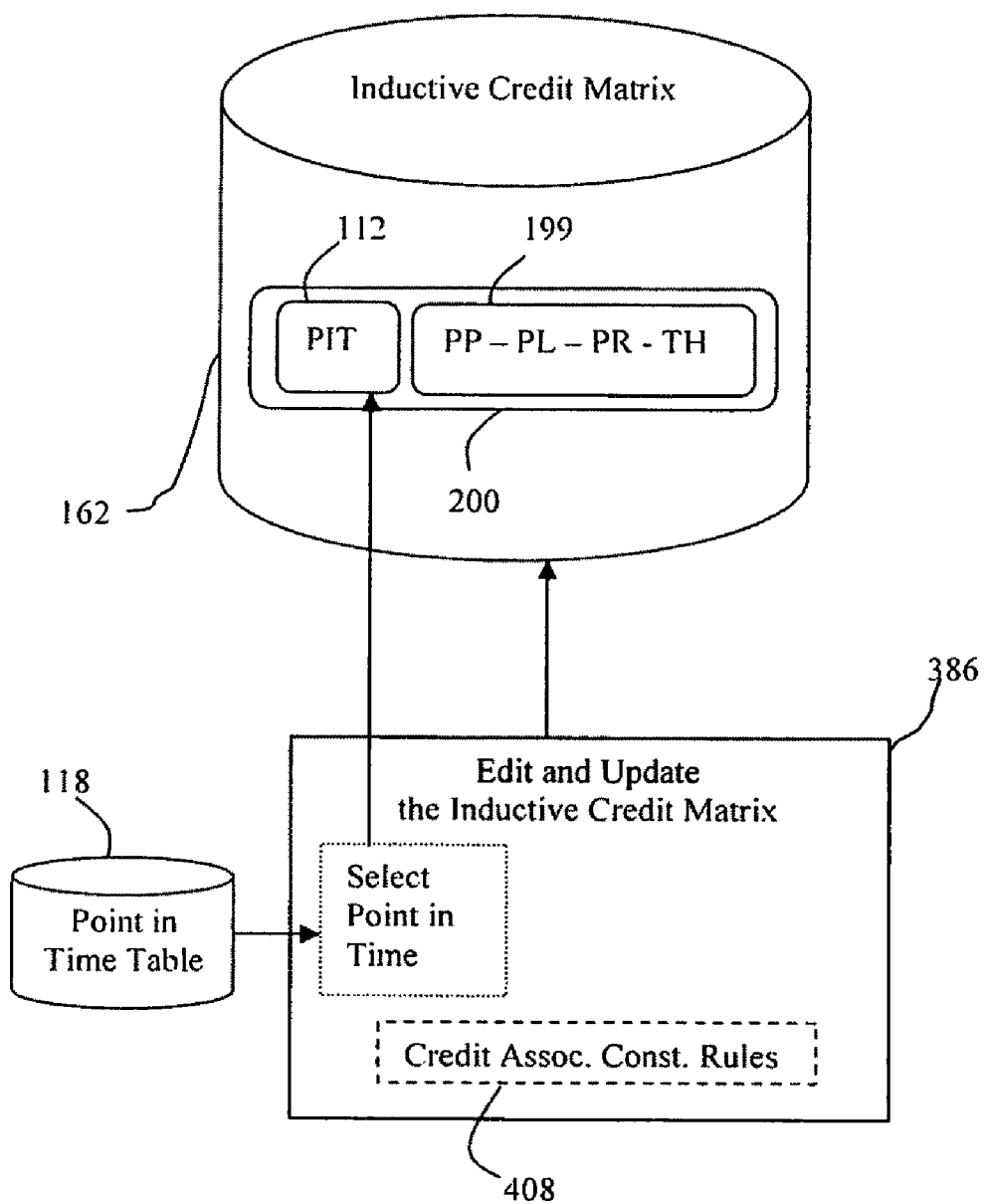
FIG. 3d is a diagram illustrating the Edit and Update the Industry Credit Inductive Lineage Construct Matrix Process with a Point In Time Value from the Point In Time Table according to the above preferred embodiment of the present invention.

Referring to FIG. 3d, the Edit and Update the Inductive Credit Matrix Process 386, which is a process for editing and updating the information in the Industry Credit Inductive Lineage Construct Matrix 162, selects the Point In Time 112 from the Point In 15 Time Table 118. This process accepts the Associations from the Input Association Info Process and writes to the Inductive Credit Matrix as well as using the Validate Associations Process. The Point in Time 112 is tied to the Credit Construct 199 which forms a Credit Instance 200 in the Industry Credit Inductive Lineage Construct Matrix 162.

Referring to FIG. 4a, FIG. 5a, FIG. 6a, and FIG. 7a, the Associative Values 116 and the People to People Associative Value 196, the Places to Places Associative Value 190, the Projects to Projects Associative Value 194, and the Things to Things Associative Value 192 are implemented using a Specific Program 910 for creating Lineage Association 866 in the input process. Said tables are not part of the normal Data Input 300 procedure, but are used to create Associations 176 between the People 202, Places 204, Projects 216, and Things 218 by the Construct to Construct Association Method 862.

Tracking the Affiliations 144 that are related to an element is accomplished through the Organization Table 146. Maintaining a List of Valid Values is accomplished through the Associative Value Table 116 and the Awards Table 114. The Data 800 in the Associative Value Table 116 is used in the Industry Credit Inductive Lineage Construct Matrix 162. Predefining Data 800 that can be used to classify People 202, Places 204, Projects 216, and Things 218 is also accomplished through the Associative Value Table 116. Predefining what Awards 220 can be related to the People 202, Places 204, Projects 216, and Things 218 is accomplished through the Awards Table 220.

The Tables for Lineage Association 866 are for the People to People Associative Value 196, Places to Places Associative Value 190, Projects to Projects Associative Value 194, and Things to Things Associative Value 192. Inputting the ID of two People 202, Places 204, Projects 216, or Things 218 and the Associative Values 116 sets the Lineage Association 866 which describes the hierarchy of how the two elements are associated.

A Validate Association Process 418, which is used with the Association Validation Rules 420 for determining how the Associations are to be validated, changes to the credit matrix are validated for correctness relative to the industry's view of how the information should report and any changes to the credit matrix are validated using the rules for validation and the rings of authority.

An Edit and Update People Relational Information Process 344, an Edit and Update Places Relational Information Process 354, an Edit and Update Projects Relational Information Process 364, and an Edit and Update Things Relational Information Process 374 use the Relation Rules 422 when updating the Relational Information 120, wherein the Relation Rules 422 are adapted for inputting Relational Information and used in the People Input Process, Places Input Process, Projects Input Process, and Things Input Process to determine what values of information will be allowed in the database.

The Edit and Update the Inductive Credit Matrix Process 386 uses the Credit Association Construction Rules 408 for inputting the Associations that are involved in creating the Credit Construct 199 which ends up as the respective Conjunctive Project Sentences of Credit Construct. The Edit and Update People Relational Information Process 344 converts the People Relational Information 122 into the People Information Table 104 and the People Relational Information Tables 124. The information is stored in individual tables defined for each type of information (i.e. skills, education, affiliations, etc.) This process accepts the People Name, People Description, and People Relations and writes to the People Information table 104 and the People Relational Information Table 124.

The Edit and Update Places Relational Information Process 354 converts the Places Relational Information 126 into the Places Information Table 106 and the Places Relational Information Tables 130. The information is stored in individual tables defined for each type of information (i.e. affiliations, etc.) This process accepts the Place Name, Place Type, Place Kind, Place Description, and Place Relations and writes to the Places Information table 106 and the Places Relational Information Table 130.

The Edit and Update Projects Relational Information Process 364 converts the Projects Relational Information 132 into the Projects Information Table 108 and the Projects Relational Information Tables 134. The information is stored in individual tables defined for each type of information (i.e. affiliations, etc.). This process accepts the Project Name, Project Type, Project Kind, Project Description, and Project Relations and writes to the Project Information table 108 and the Project Relational Information Table 134.

The Edit and Update Things Relational Information Process 374 converts the Things Relational Information 136 into the Things Information Table 110 and the Things Relational Information Tables 136. The information is stored in individual tables defined for each type of information (i.e. affiliations, etc.) This process accepts the Project Name, Project Type, Project Kind, Project Description, and Project Relations and writes to the Project Information table 110 and the Project Relational Information Table 136.

The People Input Module 314 first requires the Edit and Update of the People Relational Information 344 which takes the People Name 338, People Description 340, and People Relations 342, and updates the People Table 104, the People Relational Information Table 124, the Affiliation Table 144 and the Organization Table 146. The People Input Module 314 then performs the Update People Associations Process 378 which is used with the People Association Input Rules 410, wherein the People Associations Process updates People to Places, People to Things, People to Projects, and Awards Associations using Associative Values 184, 186, 178, 198 to create Credit Constructs 199. This process follows the inputting of relational information 120 and inputs into the Industry Credit Inductive Lineage Construct Matrix 162. The People Association Input Rules 410, for inputting Associations that involves People to People Associations and People to Places Associations which are achieved by Construct to Construct Association, are part of the Input Process (tentative: input People associated info). Places may also include Solo Artists and Group Artists.

The Places Input Module 316 first requires the Edit and Update of the Places Relational Information Process 354 which takes the Places Name, Type and Kind 348, Places Description 350, and Places Relations 352, and updates the Table of Places/Positions Information 128, Places Table 106, Places Relational Information Table 130, Affiliation Table 144 and Organization Table 146. The Places Input Module 316 then performs the Update the Places Associations Process 380 which is used with the Places Association Input Rules 412, wherein the Update Places Associations Process 380 updates Places to People, Projects, Things, Awards Associations using Associative Values 184, 180, 188, 198 to create the respective Credit Constructs 199. This process follows the inputting of relational information 120 and inputs into the Industry Credit Inductive Lineage Construct Matrix 162. The Places Association Input Rules are adapted for inputting Associations that involves Places to Places Associations which are achieved by Construct to Construct Association. Places may also include Joint Ventures. These rules are part of the Input Process.

The Projects Input Module 318 first requires the Edit and Update of the Projects Relational Information Process 364 which takes the Projects Name and Type 358, Publication Date 930, Description 360, and Project Relations 362, and updates the Projects Table 108, Projects Relational Information Table 134, Affiliation Table 144 and Organization Table 146. If a WIP 950 is input for the Publication Date 930, which is the date that a project 216 has been published and a field within the Conjunctive Project Sentence of Credit Construct, then the Project 216 is a Not Yet Released Project 952. The Projects Input Module 318 then performs the Update Projects Associations Process 382 which is used with the Projects Association Input Rules 414, wherein the Projects Associations Process 382 updates Projects to People, Places, Things, Awards Associations using Associative Values 178, 180, 182, 198 to create the respective Credit Constructs 199. This process follows the inputting of relational information 120 and inputs into the Industry Credit Inductive Lineage Construct Matrix 162. The Projects Association Input Rules 414 are used for inputting Associations that involves Places to Projects Associations and Projects to Projects Associations which are achieved by Construct to Construct Association. Places may also include Themes and these rules are part of the Input Process (tentative: input Projects associated info).

The Things Input Module 320 first requires the Edit and Update of the Things Relational Information Process 374 which takes the Things Name and Type 368, Things Description 370, and Things Relations 372, and updates the Things Table 110, Things Relational Information Table 138, Affiliation Table 144 and Organization Table 146. The Things Input Module 320 then performs the Update Things Associations Process 384 which is used with the Things Association Input Rules 416, wherein the Things Associations Process 384 updates Things to People, Places, Projects, Awards using Associative Values 186, 188, 182, 198 to create the respective Credit Constructs 199. This process follows the inputting of relational information 120 and inputs into the Industry Credit Inductive Lineage Construct Matrix 162. The Things Association Input Rules 416, which are part of the Input Process (tentative: input Things associated information), are used for inputting Associations that involves Places to Things Associations and Things to Things Associations which are achieved by Construct to Construct Association.

The Update People Association Process 378 uses the People Table 104; the Update Places Associations Process 380 uses the Places Table 106; the Update Projects Associations Process 382 uses the Projects Table 108; the Update Things Associations Process 384 uses the Things Table 110. The Associations 176 to the Awards 114 are made by the Edit and Update Inductive Credit Matrix Process 386 which updates the Industry Credit Inductive Lineage Construct Matrix 162. The Edit and Update Inductive Credit Matrix Process 386 builds the Associations 176 for the Credit Construct 199 by using Associative Values 116. The Edit and Update Inductive Credit Matrix Process 386 also selects the Point In Time 112 from the Point in Time Table 118 to build the Credit Instances 200 in the Industry Credit Inductive Lineage Construct Matrix 162. The Update People Associations Process 378, the Update Places Associations Process 380, the Update Projects Associations Process 382, and the Update Things Associations Process 384 are Validated 418 according to the Association Validation Rules 420. The Association Validation Rules 420 which determine how the Associations are to be Validated are part of the Validate Associations Process to determine what values of information will be allowed in the database.

Figure 4A:
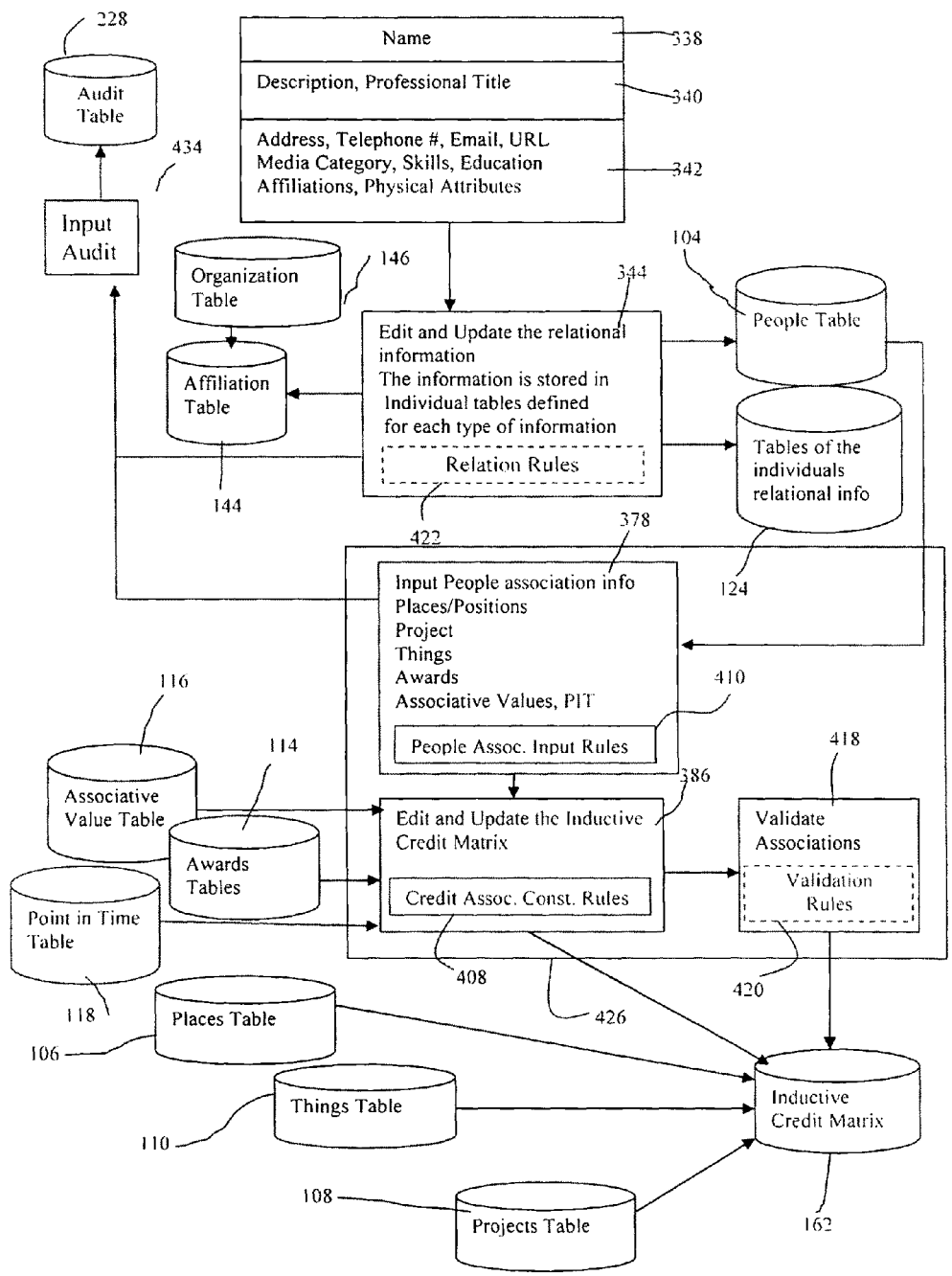
FIG. 4a is a diagram of the People information input process according to the above preferred embodiment of the present invention.
Figure 4B:
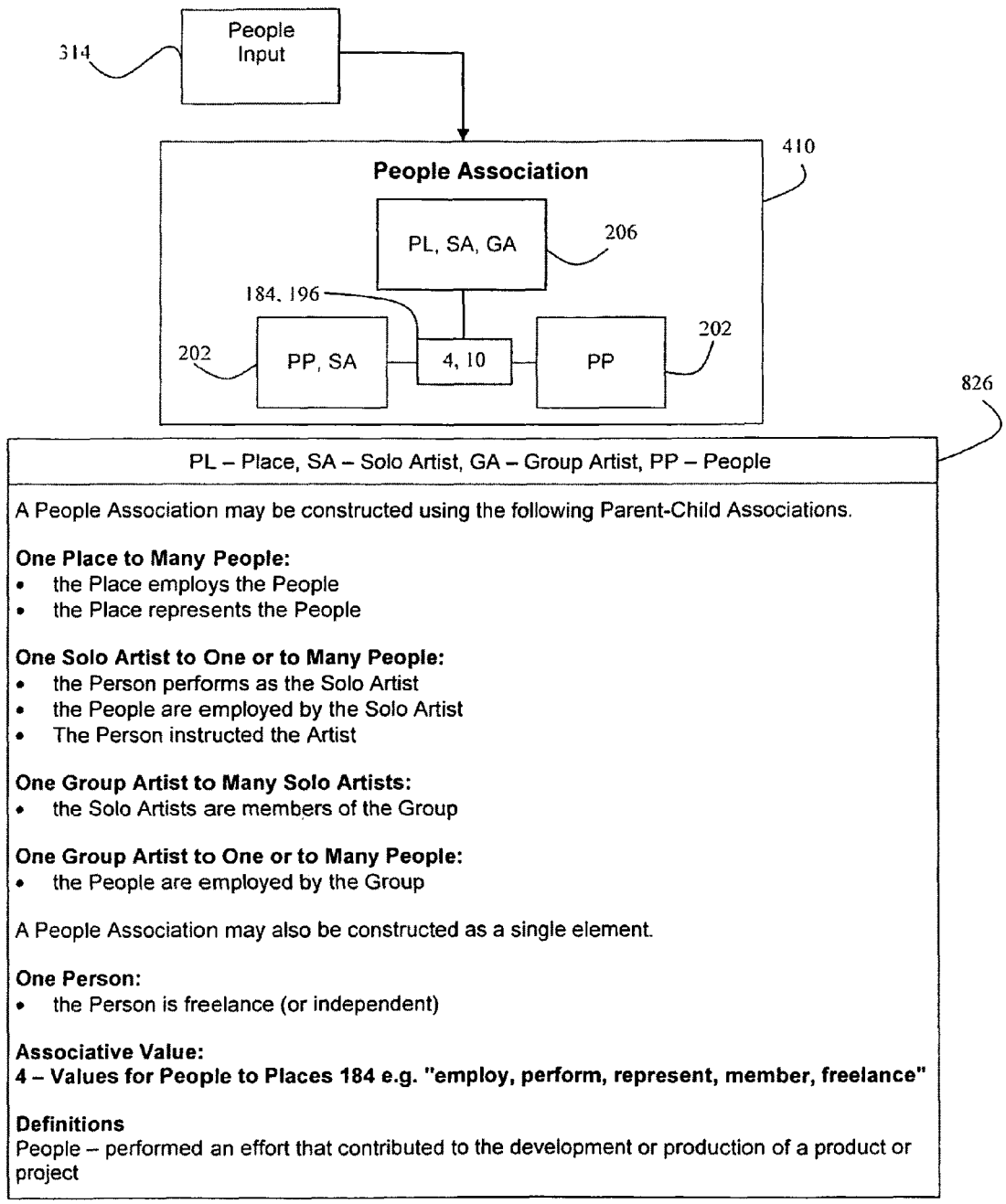
FIG. 4b is a flow chart of the People association input rules with appropriate text according to the above preferred embodiment of the present invention.

As shown in FIG. 4b, the People Association Input Rules 410 are composed of the Place, Group, or Solo Artist 206 as the Parent, associated to one or many People 202 as the child, by the People to Places Associative Value 184, or the People to People Associative Value 196. People Association input scenarios 824 describe how the People Association Input Rules 410 are able to build useful Credit Constructs 199 and how the People 202 are accepted into the system.

Figure 5A:
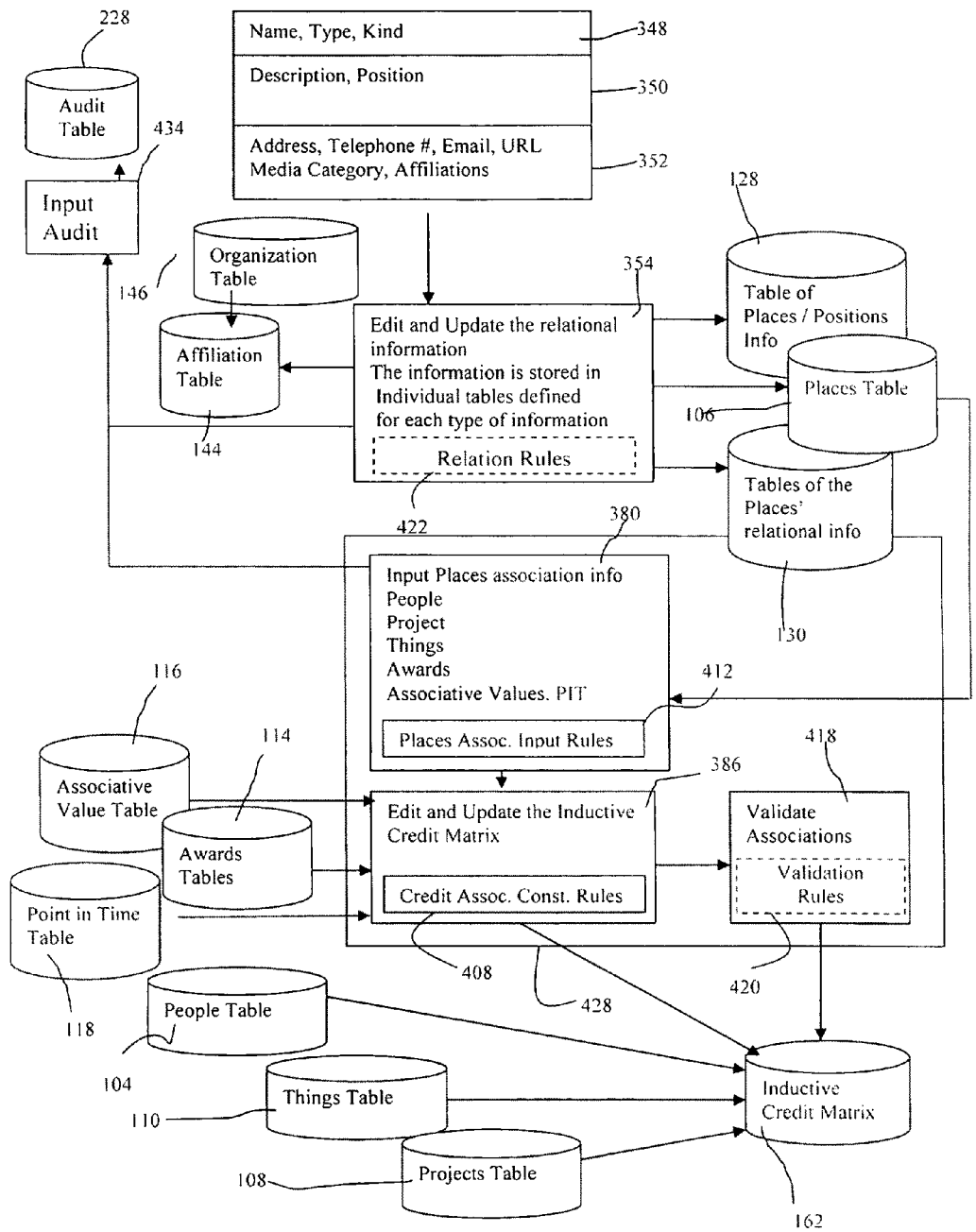
FIG. 5a is a diagram of the Places information input process according to the above preferred embodiment of the present invention.
Figure 5B:
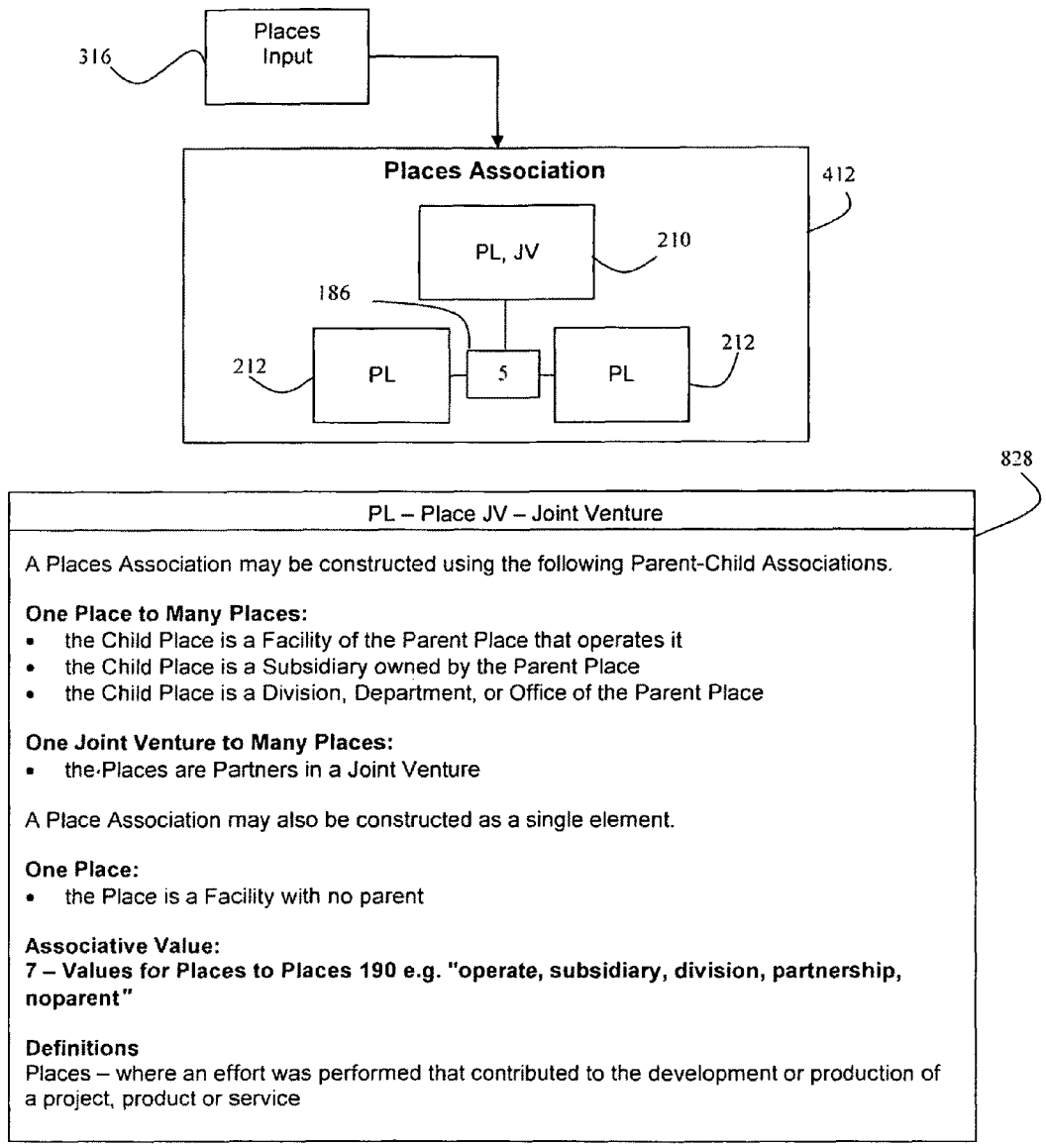
FIG. 5b is a flow chart of the Places association input rules with appropriate text according to the above preferred embodiment of the present invention.

As shown in FIG. 5b, the Places Association Input Rules 412 are composed of the Place or a Joint Venture 210, associated to one or many Child Places 212, by the Places to Places Associative Value 186. Places Association Input Scenarios 826 describe how the Places Association Input Rules 412 are able to build useful Credit Constructs 199 and how the Places 204 are accepted into the system.

Figure 6A:
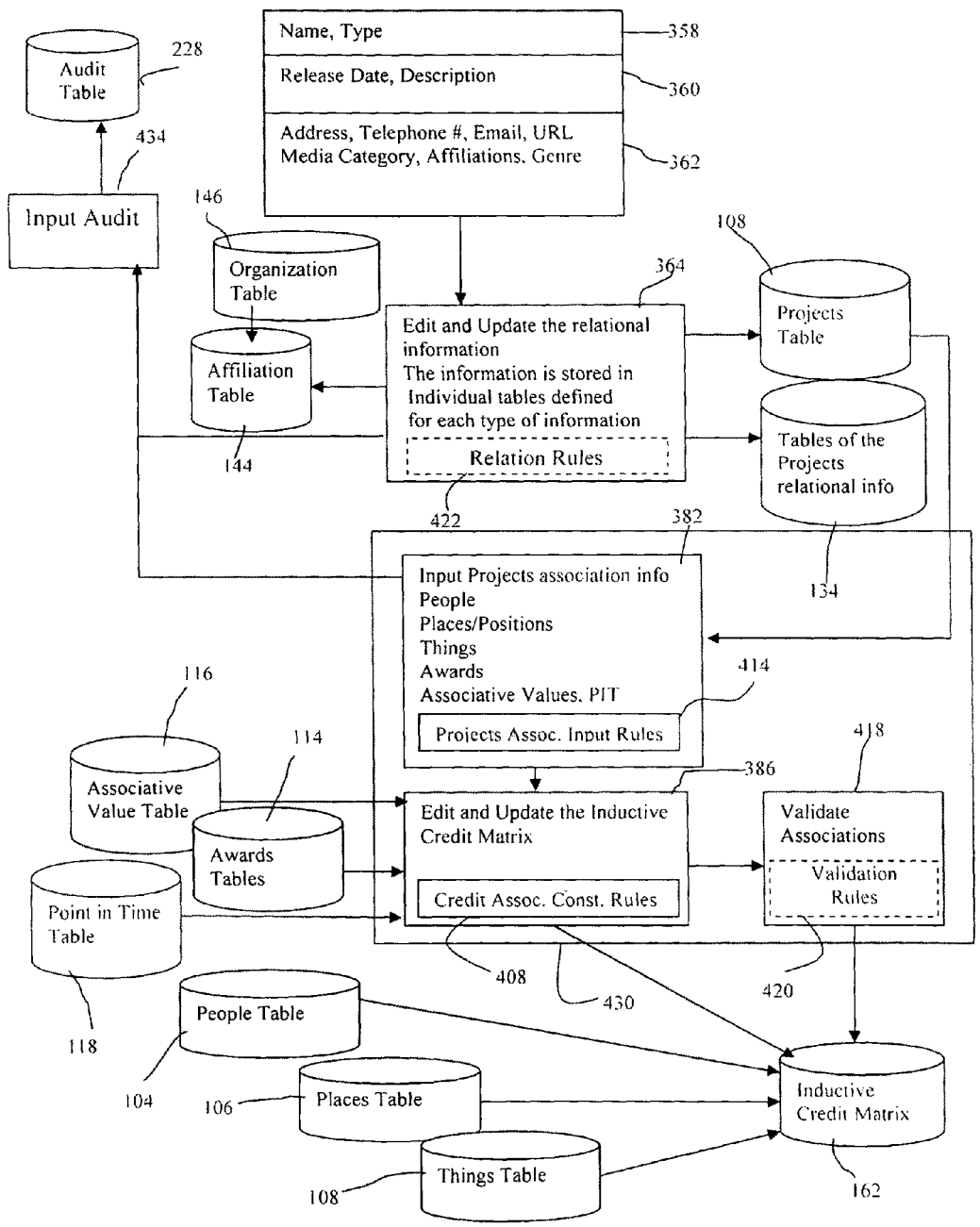
FIG. 6a is a diagram of the Projects information input process according to the above preferred embodiment of the present invention.
Figure 6B:
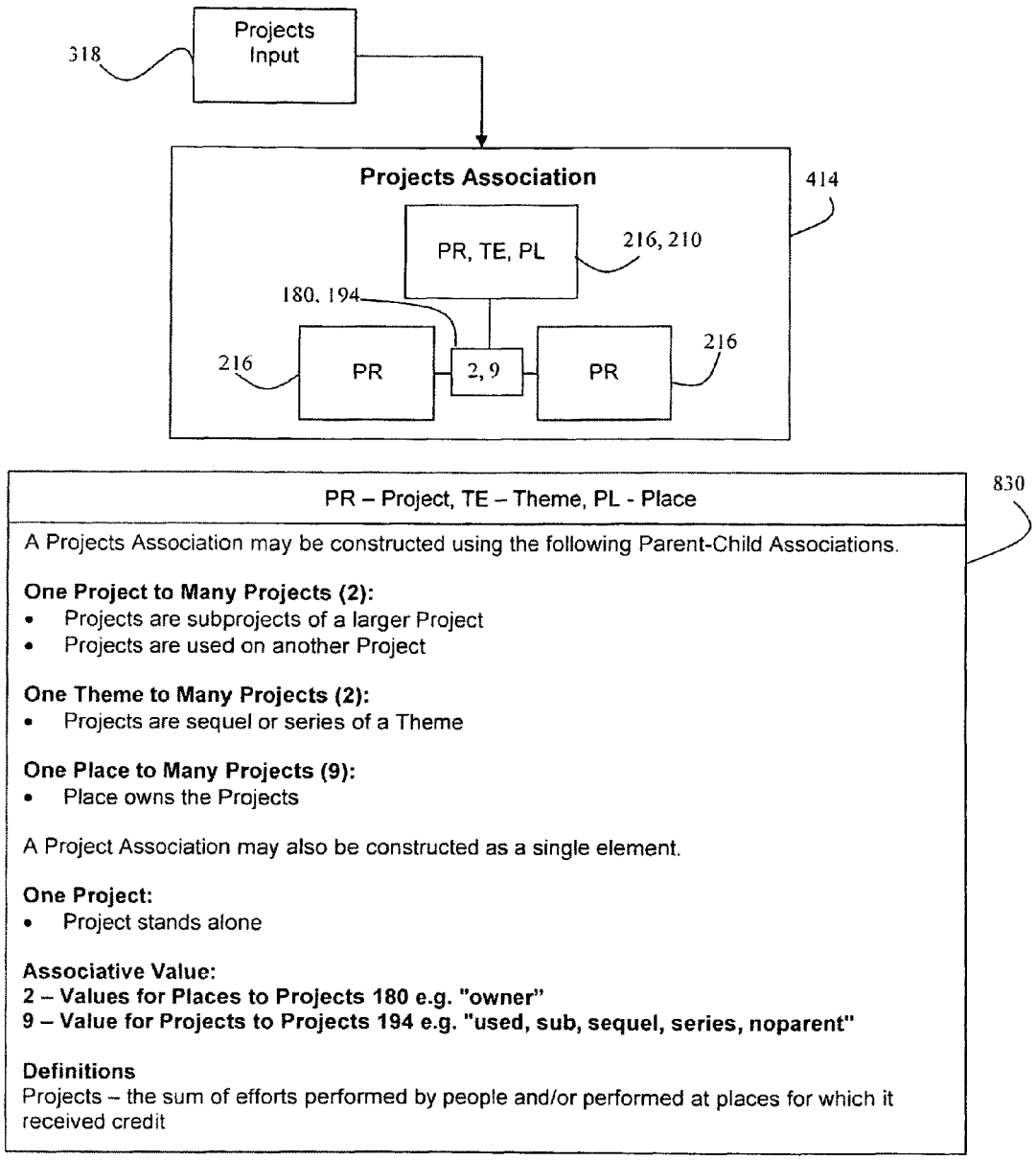
FIG. 6b is a flow chart of the Projects association input rules with appropriate text.

As shown in FIG. 6b, the Projects Association Input Rules 414 are composed of the Projects or Project Theme 216, or the Parent Place 210, associated to one or many child Projects 216, by the Projects to Projects Associative Value 194 or the Places to Projects Associative Value 180. Projects Association input scenarios 828 describe how the Projects Association Input Rules 414 are able to build useful Credit Constructs 199 and how the Projects 216 are accepted into the system.

Figure 7A:
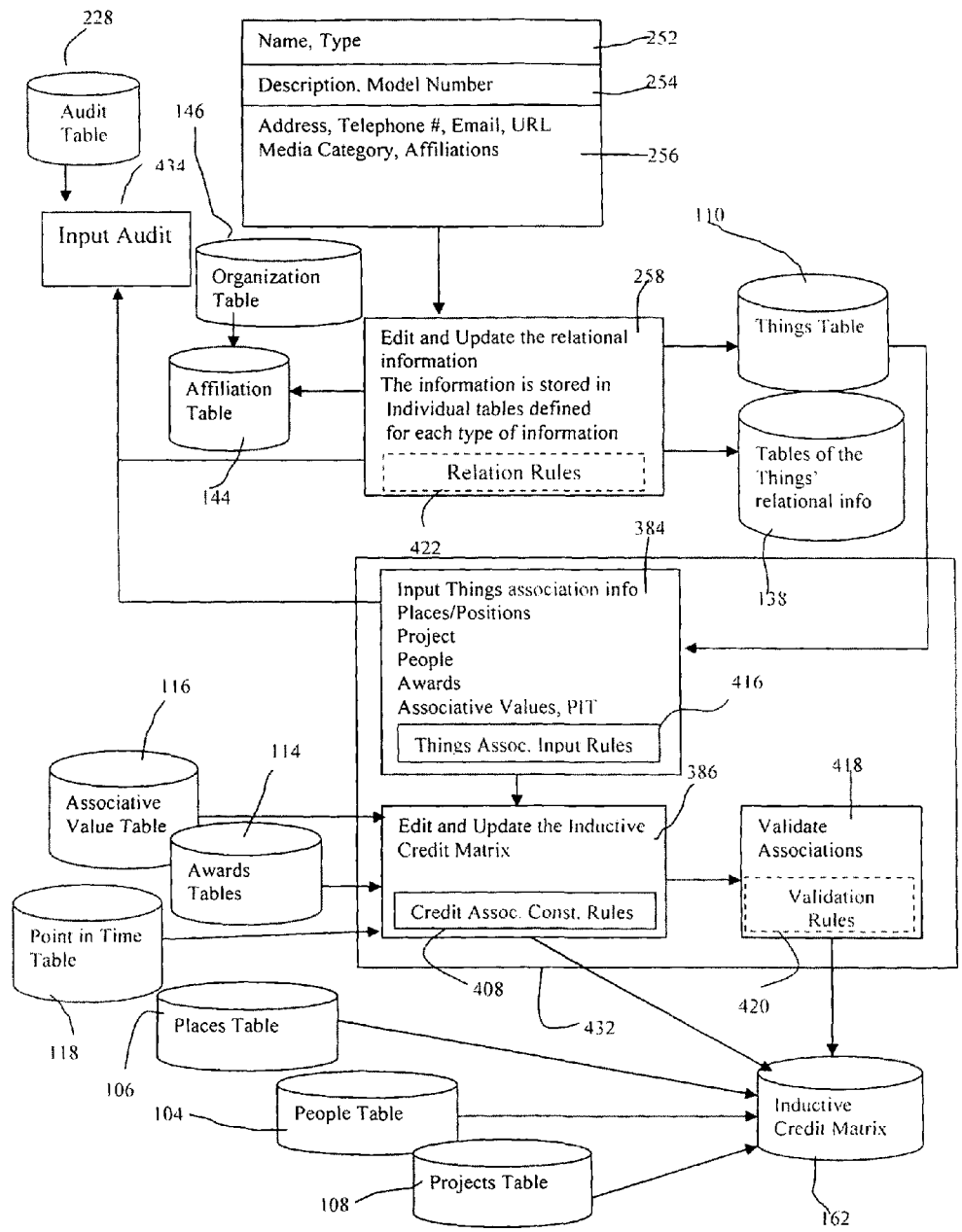
FIG. 7a is a diagram of the method's Things information input process according to the above preferred embodiment of the present invention.
Figure 7B:
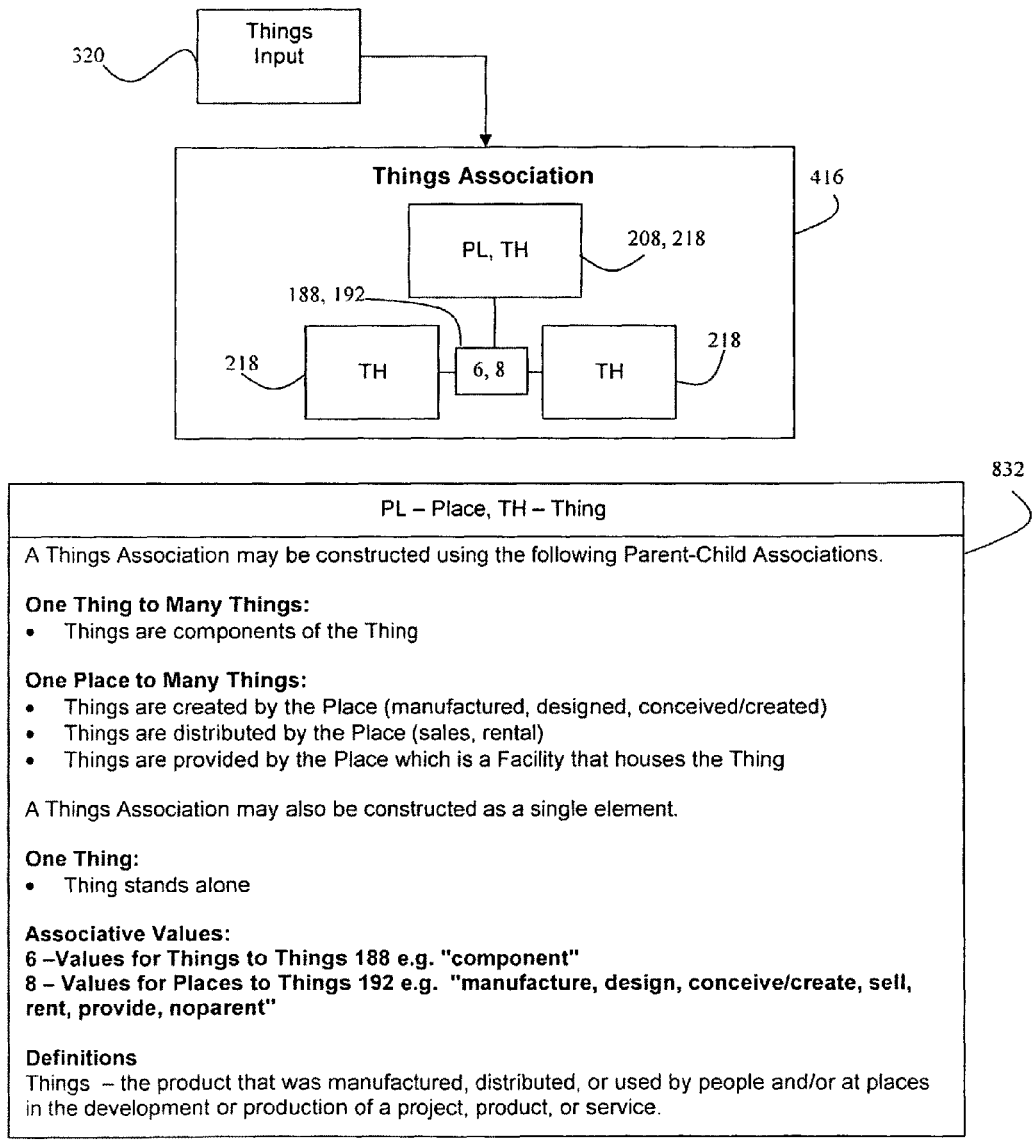
FIG. 7b is a flow chart of the Things association input rules with appropriate text according to the above preferred embodiment of the present invention.

As shown in FIG. 7b, the Things Association Input Rules 416 are composed of the Manufacturer Place 208 or the Thing 218 associated to one or many child Things 218 by the Places to Things Associative Value 188 or the Things to Things Associative Value 192, respectively. Things Association Input Scenarios 830 describe how the Things Association Input Rules 416 are able to build useful Credit Constructs 199 and how the Things 218 are accepted into the system.

As shown in FIG. 4a, an Update People Associations Process 426 updates the Industry Credit Inductive Lineage Construct Matrix 162 with the Associative Information about People 202. As shown in FIG. 5a, an Update Places Associations Process 428 updates the Industry Credit Inductive Lineage Construct Matrix 162 with the Associative Information about Places 204. As shown in FIG. 6a, an Update Projects Associations Process 430 updates the Industry Credit Inductive Lineage Construct Matrix 162 with the Associative Information about Projects 216. As shown in FIG. 7a, an Update Things Associations Process 432 updates the Industry Credit Inductive Lineage Construct Matrix 162 with the Associative Information about Things 218.

Figure 8A:
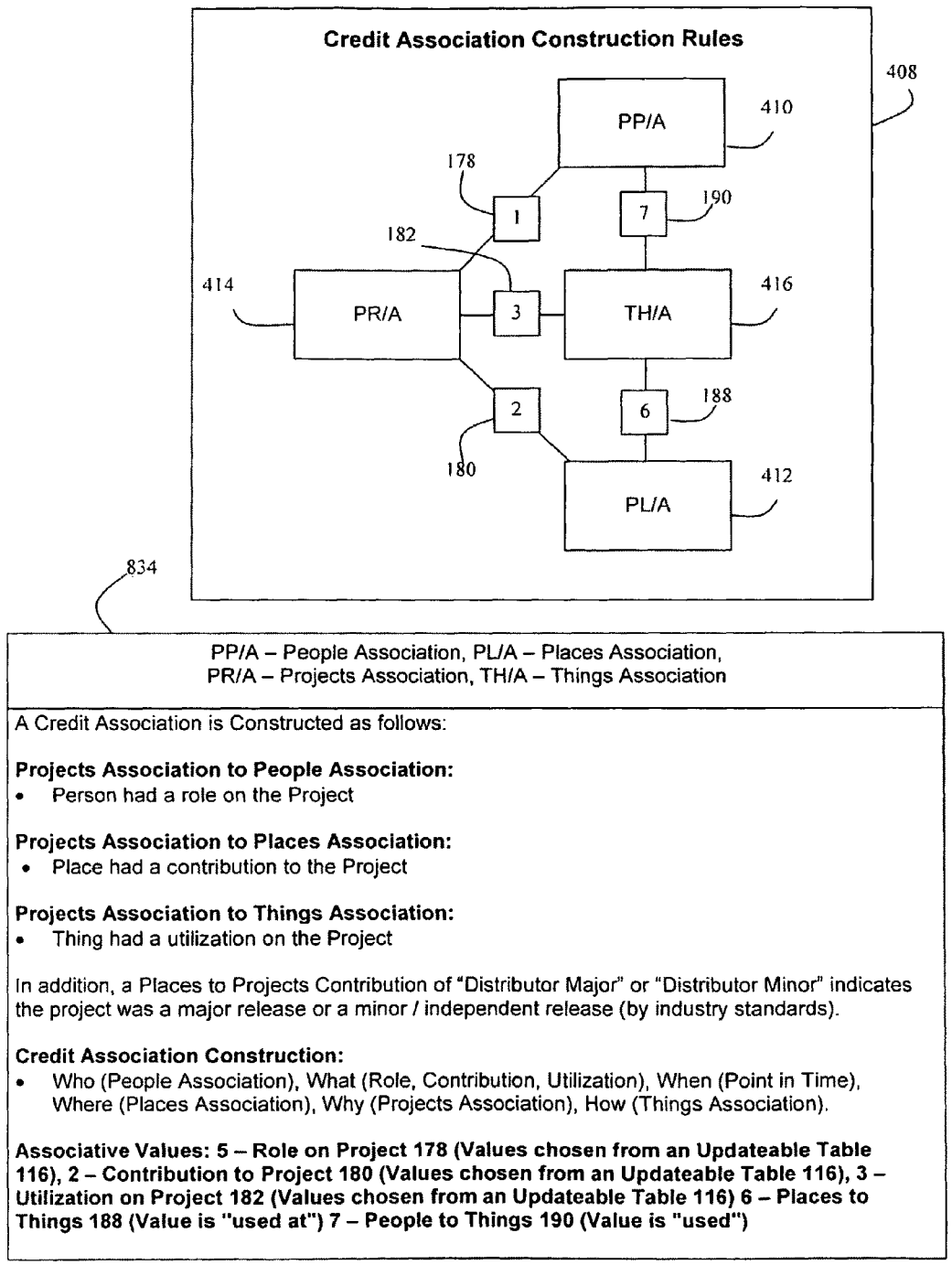
FIG. 8a is a diagram of the Credit Association Construction Rules with appropriate text according to the above preferred embodiment of the present invention.
Figure 8B:
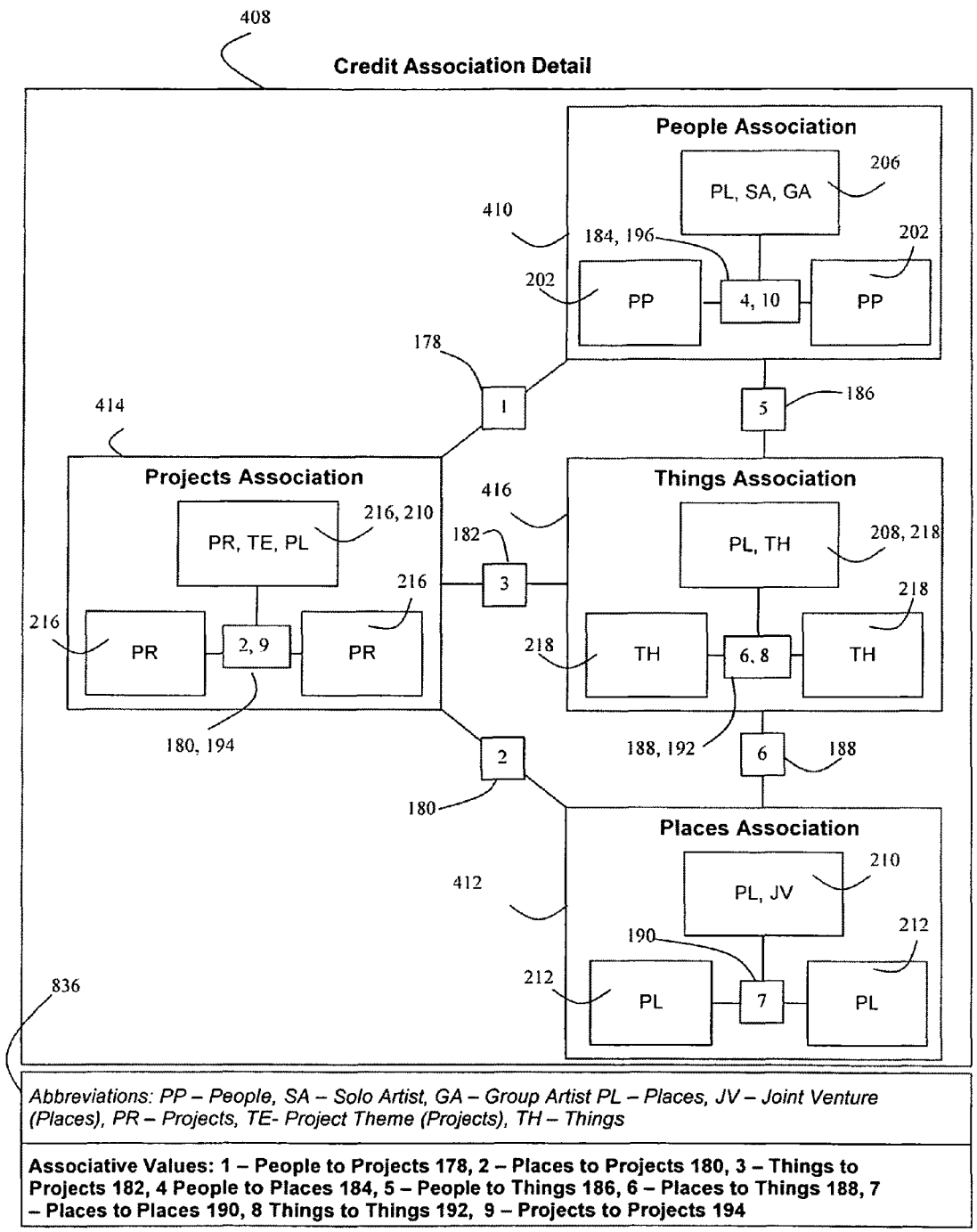
FIG. 8b is a flow chart of the Credit Association Details with appropriate text according to the above preferred embodiment of the present invention.

As shown in FIG. 8a and FIG. 8b, the input credit association construction rules 408 are composed of the People Association Input Rules 410, the Places Association Input Rules 412, the Projects Association Input Rules 414, and the Things Association Input Rules 416, joined by the People to Projects Associative Value (Role Value) 178, the Places to Projects Associative Value (Contribution Value) 180, the Things to Projects Associative Value (Utilization Value) 182, the People to Things Associative Value 186, and the Places to Things Associative Value 188. The Credit Association Construction Rules 408 describe how the People 202, Places 204, Projects 216, and Things 218 are input together into the Industry Credit Inductive Lineage Construct Matrix 162. Distributor Major or Distributor Minor may be used as the Places to Projects Associative Value (Contribution Value) 180 to denote that the Project 216 was published by the Place 204 via Major or Minor/Independent Distribution.

The People Information is inputted by an Input People Process 336 that People Relational and Associative Information, and Inputs data into the Relational Databases 100. The People Name Information is inputted by an Input People Name Process 338 that inputs the People Name into the People Information Table 104 via the Edit and Update People Relational Information Process 344.

An Input People Description Process 340 inputs the People Description from the People Information into the People Information Table 104 via the Edit and Update People Relational Information Process 344. An Input People Relations Process 342 inputs People Relations, including Address, Telephone #, Email, URL, Media Category, Skills, Education, Affiliations for People, from the People Information into the People Relational Information Tables 124 via the Edit and Update People Relational Information Process 344.

The Places Information is inputted through an Input Places Process 346 that accepts Places Relational and Associative Information, and Inputs data into the Relational Databases 100. An Input Place Name Process 348 is used for inputting the Place Name, Type, and Kind Information into the Places Information Table 106 via the Edit and Update Places Relational Info Process 354.

An Input Place Description Process 350 is an input process for inputting the Places Description into the Place Information Table 106 and the Places Position Information into the Places/Positions Information Table 128 via the Edit and Update Places Relational Info Process 354.

An Input Place Relations Process 352 is an input process for inputting the Places Relations, including the Address, Telephone #, Email, URL, Media Category, and Affiliations for Places, from the Places Information into the Places Relational Information Tables 130 via the Edit and Update Places Relational Info Process 354.

The Projects Information is inputted through an Input Projects Process 356 that accepts Projects Relational and Associative Information, and Inputs data into the Relational Databases 100. An Input Project Name Process 358 is an input process for inputting the Project Name and Type Information into the Projects Information Table 108 via the Edit and Update Projects Relational Information Table Process 364.

An Input Project Description 360 is an input process for inputting the Project Date and Project Description Information into the Projects Information Table 108 via the Edit and Update Projects Relational Info Process 364. An Input Project Relations Process 362 is an input process for inputting the Project Relations, including Address, Telephone #, Email, URL, Media Category, and Affiliations for Projects, from the Projects Information into the Projects Relational Information Tables 134 via the Edit and Update Projects Relational Info Process 364.

The Things Information is inputted through a Things Input Process 366 that accepts Things Relational and Associative Information, and Inputs data into the Relational Databases 100.

An Input Thing Name and Thing Type Process 368 is an input process for inputting the Thing Name and Thing Type Information into the Things Information Table 110 via the Edit and Update Things Relational Information Table Process 374. An Input Thing Description Process 370 is an input process for inputting the Thing Description Information into the Things Information Table 110 via the Edit and Update Things Relational Info Process 374.

An Input Thing Relations Process 372 is an input process for inputting Things Relations, including the Address, Telephone #, Email, URL, Media Category, and Affiliations, from the Things Information into the Things Relational Information Tables 138 via the Edit and Update Things Relational Info Process 374.

All Relational Information and Associations are inputted via Input Screens 312. An Input Association Information Process 376 inputs the Associations for People 202, Places 204, Projects 216, and Things 218, from People Associative Information, Places Associative Information, Projects Associative Information, or Things Associative Information. This Process Inputs the Associations for People, Places, Projects, and Things, whether in the People Input Process 336, the Places Input Process 346, the Projects Input Process 356, or the Things Input Process 366. It uses Associative Values from the Associative Value Table 116 and passes the information to the Edit and Update the Inductive Credit Matrix Process 386.

Figure 9A:
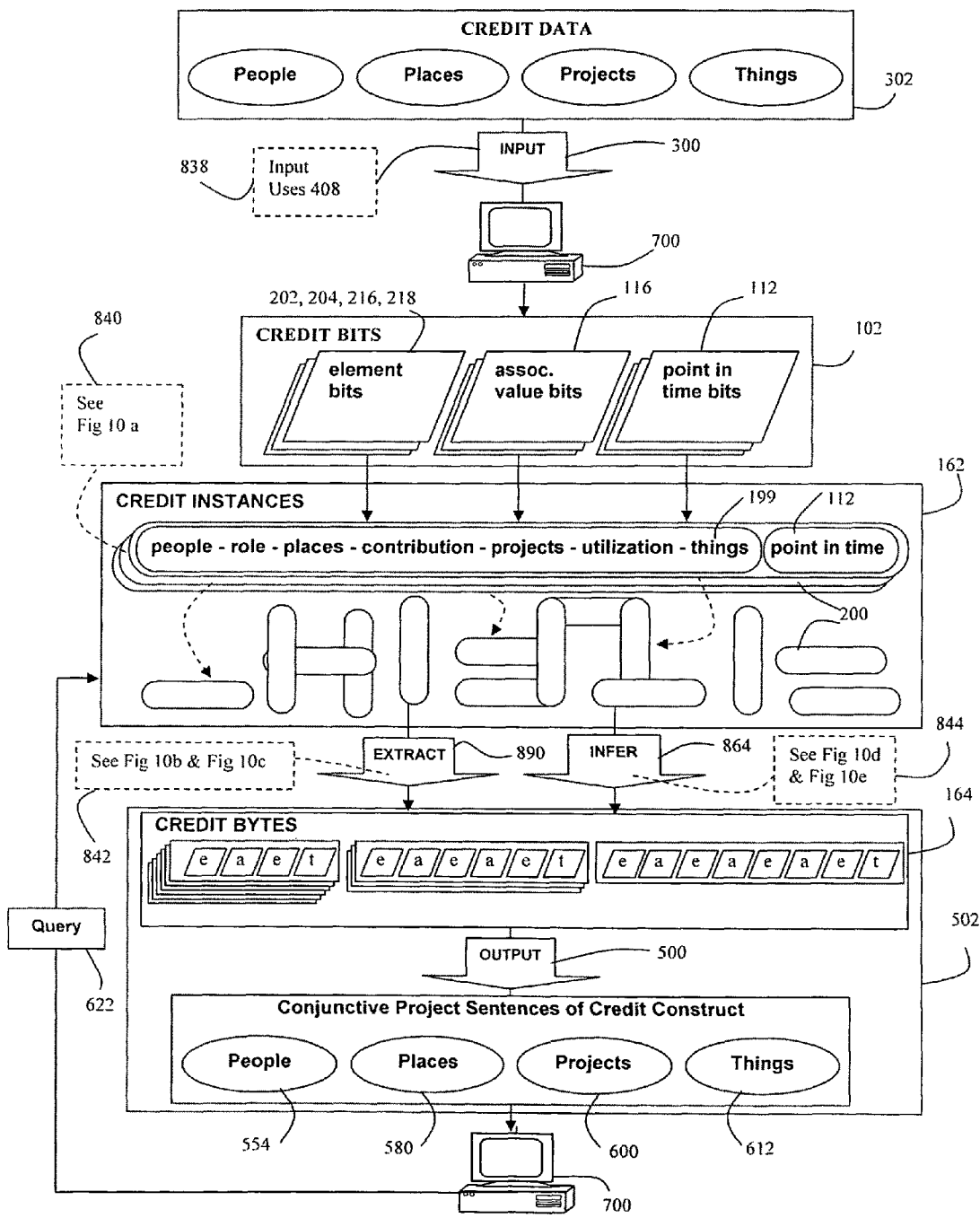
FIG. 9a is a flow chart illustrating of the creation of credit bytes from the method's credit bits as a result of the method's credit instances according to the above preferred embodiment of the present invention.
Figure 9B:
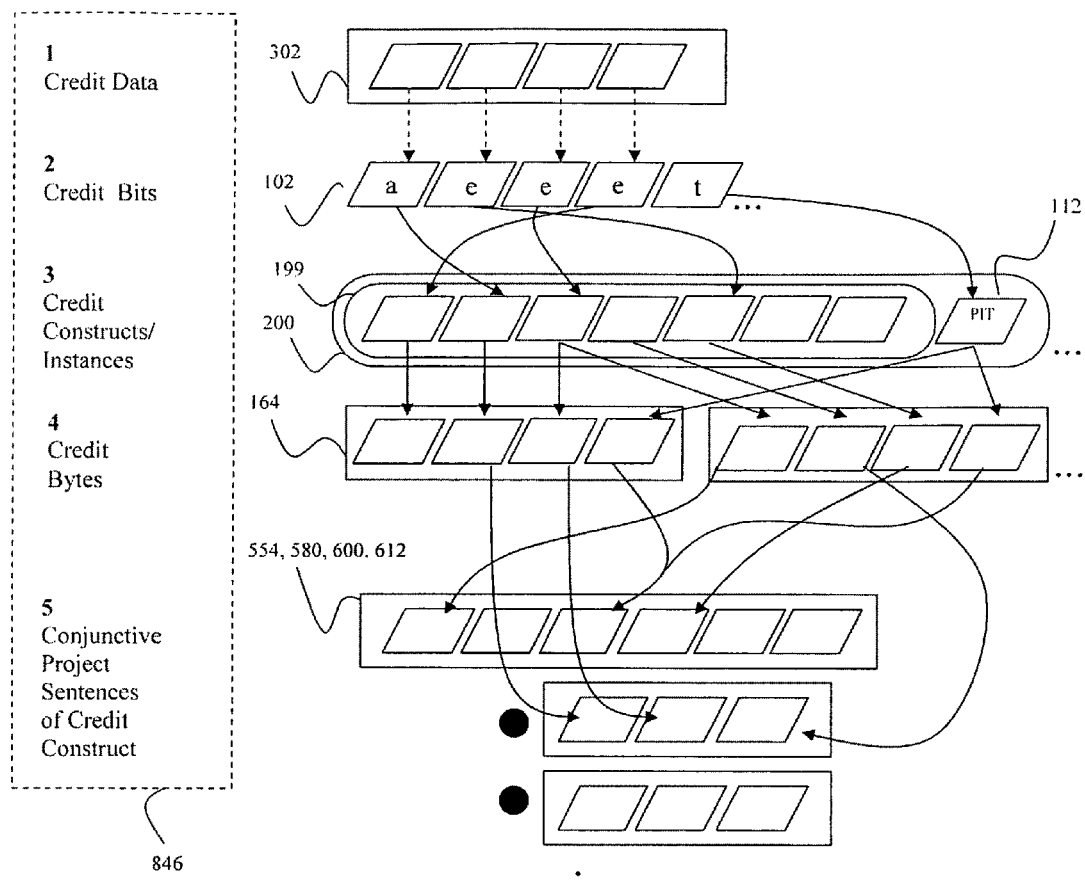
FIG. 9b is a diagrammatic template display of the data life cycle showing how the method creates the Conjunctive Project Sentence of Credit Construct from credit data according to the above preferred embodiment of the present invention.

Referring to FIG. 9a, FIG. 9b, and FIG. 9c, the Credit Bits 102 are extracted from Credit Data 302 which include any information about industry credits, in any form—whether from a resume, a data collection form, a magazine article, verbal, CD jacket, etc, such as Crime Data, Industrial, Business or Sales Data.

The Credit Bits 102 are the People 202, Places 204, Projects 216, and Things 218, the Associative Values 116, and the Point In Time 112. The Credit Bits 102 are arranged to form the Credit Constructs 199, which when joined with a Point In Time 112 become the Credit Instance 200, according to the People Association Input Rules 410, the Places Association Input Rules 412, the Projects Association Input Rules 414, the Things Association Input Rules 416, and the Credit Association Input Rules 408. Each Credit Instance 200 includes the four elements (People 202, Places 204, Projects 216, Things 218); the Associative Values of People to Projects (Role Value) 178, Places to Projects (Contribution Value) 180, and Things to Projects (Utilization Value) 182, in relation to a Point In Time 112.

Null values for the Credit Bits 102 in the Credit Instance 200 are allowed. The Credit Bytes 164 may have two People 202, Places 204, Projects 216, and/or Things 218, and an Associative Value 116. The Credit Bytes 164 may also have three People 202, Places 204, Projects 216, and/or Things 218, and two Associative Values 116. Likewise, Credit Bytes may also have one of each People 202, Places 204, Projects 216, Things 218 and three Associative Values 116. Awards Credit Bytes 174 are associations of Awards to People 202, Awards to Places 204, Awards to Projects 216, and Awards to Things 218.

The Credit Bytes 164 reflect a single Point of View (POV) 860 as they are output in response to a Query 622 which is a request for information from a database Queries and is used to instruct the Industry Credit Inductive Lineage Construct Matrix 162 as to what information is required for output into the Report Writer 502.

The Credit Bytes 164 are extracted from the Credit Instances 200 to form the Conjunctive Project Sentences of Credit Construct from the People Point of View 554, the Conjunctive Project Sentences of Credit Construct from the Places Point of View 580, the Conjunctive Project Sentences of Credit Construct from the Projects Point of View 600, and the Conjunctive Project Sentences of Credit Construct from the Things Point of View 612. When a plurality of Credit Instances 200 intersect to form Intersecting Instance 840, as shown in Box 840 in FIG. 9a, FIG. 10a and FIG. 10c, the Credit Bytes 164 that do not exist in the Industry Credit Inductive Lineage Construct Matrix 162 can be Inferred to form Inferences 842, as shown in Box 842 in FIG. 9a, FIG. 10b and FIG. 10c.

Figure 10A:
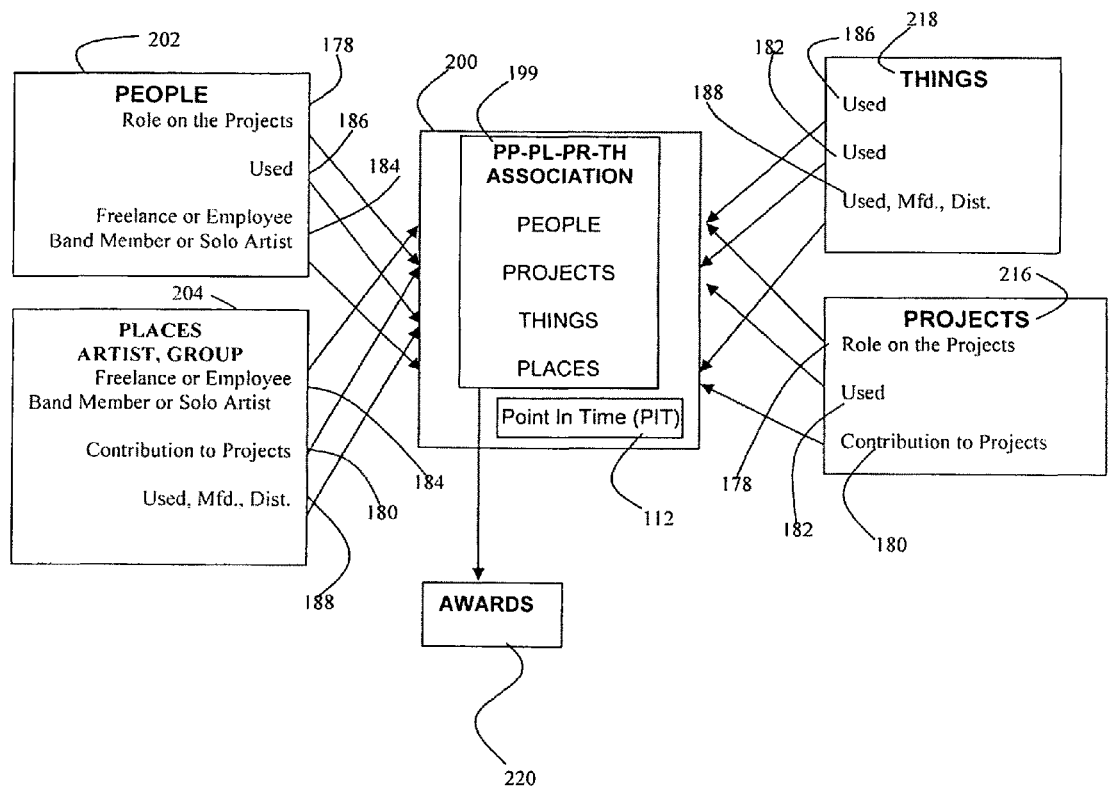
FIG. 10a is a diagrammatic associative illustrating the main elements, associative values and the industry Awards according to the above preferred embodiment of the present invention.

As shown in FIG. 10a, one Credit Construct 199 is made up of the Associations 176 of the Elements People 202, Places 204, Projects 216, and Things 218. The Associations 176 include the People to Projects Associative Value 178, the Places to Projects Associative Value 180, the Things to Projects Associative Value 182, the People to Places Associative Value 184, the People to Things Associative Value 186, and the Places to Things Associative Value 188. The Credit Construct 199 with the Point in Time 112 is the Credit Instance 200. The Credit Construct 199 may be associated to the Award 220.

Referring to FIG. 10b, the Credit Constructs 199 overlap, referencing Box 838 in FIG. 10b, when the People 202, Places 204, Projects 216, or Things 218 are equal. A multitude of overlapping 838 is possible.

Referring to FIG. 10c, the Credit Instances 200 intersect, as illustrating in Box 840, when the People 202, Places 204, Projects 216, or Things 218, and the Point In Time 112 are equal.

Figure 10D:
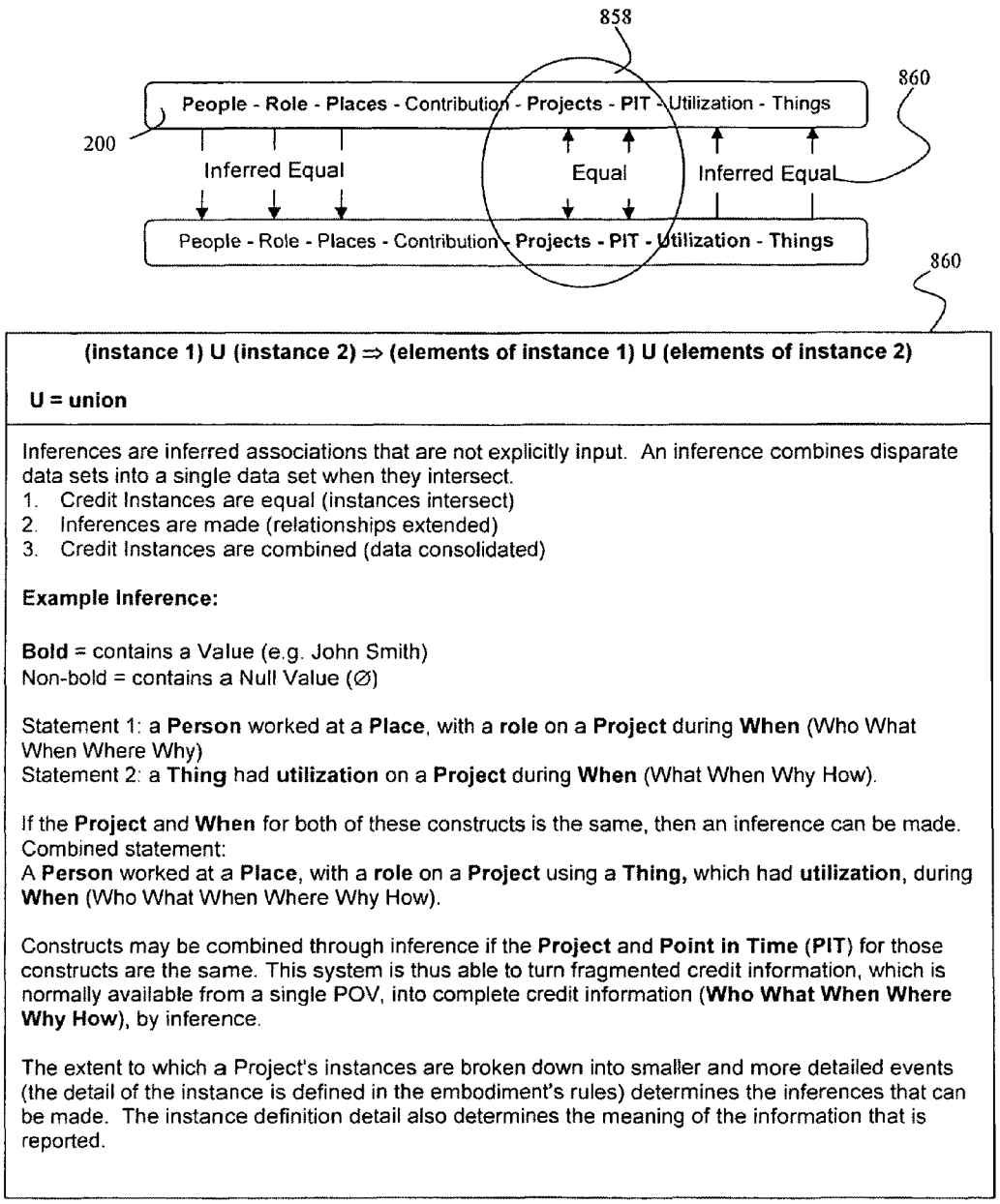
FIG. 10d is a diagram illustrating the inferences developed from the intersecting constructs of the Industry Credit Inductive Lineage Construct Matrix with appropriate text according to the above preferred embodiment of the present invention.

Referring to FIG. 10d, The Inferences 842 can be made when the Credit Instances 200 intersect (840). The Inferences 842 that can be made are dependent on the embodiment and Data 800 allowed for the Point In Time 112. Inferences 842 combine values from separate Credit Instances 200 in the outputted Credit Bytes 164. The Conjunctive Project Sentences of Credit Construct from the People Point of View 554, the Conjunctive Project Sentences of Credit Construct from the Places Point of View 580, the Conjunctive Project Sentences of Credit Construct from the Projects Point of View 600, and the Conjunctive Project Sentences of Credit Construct from the Things Point of View 612 are thus able to report information from the Industry Credit Inductive Lineage Construct Matrix 162 that was not input by any single user from any single Point of View (POV) 860.

Figure 10E:
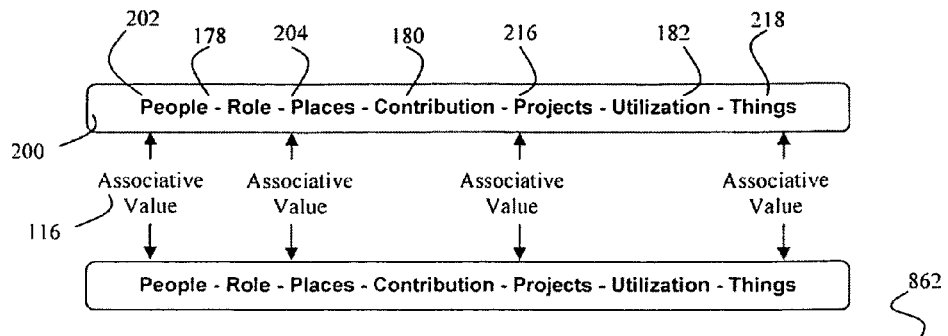
FIG. 10e is a diagram illustrating the association of credit instances [constructs] with associative values of the Industry Credit Inductive Lineage Construct Matrix with appropriate text according to the above preferred embodiment of the present invention.

Referring to FIG. 10e, the People 202, Places 204, Projects 216, or Things 218 of different Credit Instances 200 can be associated to each other through the Associative Values 116 as a Lineage Associations 866 of the People to People Associative Value 196, the Places to Places Associative Value 190, the Projects to Projects Associative Value 194, and the Things to Things Associative Value 192, and as a Lineage Association 866 of the People to Places 184 and Places to Things 188. Lineage Associations 866 are achieved by associating one of the Credit Instances 200 to another Credit Instance 200. In the case of the Lineage Association 866, during Data Input 300 the chosen Associative Value 116 will indicate which People 202, Places 204, Projects 216, or Things 218 is the parent and which People 202, Places 204, Projects 216, or Things 218 is the child as described in Description Box 866 in FIG. 11h. In which the Data Input 300 is a process for Data Entering the Relational Database 100, wherein the Credit Data is collected from outside the system.

Figure 11:
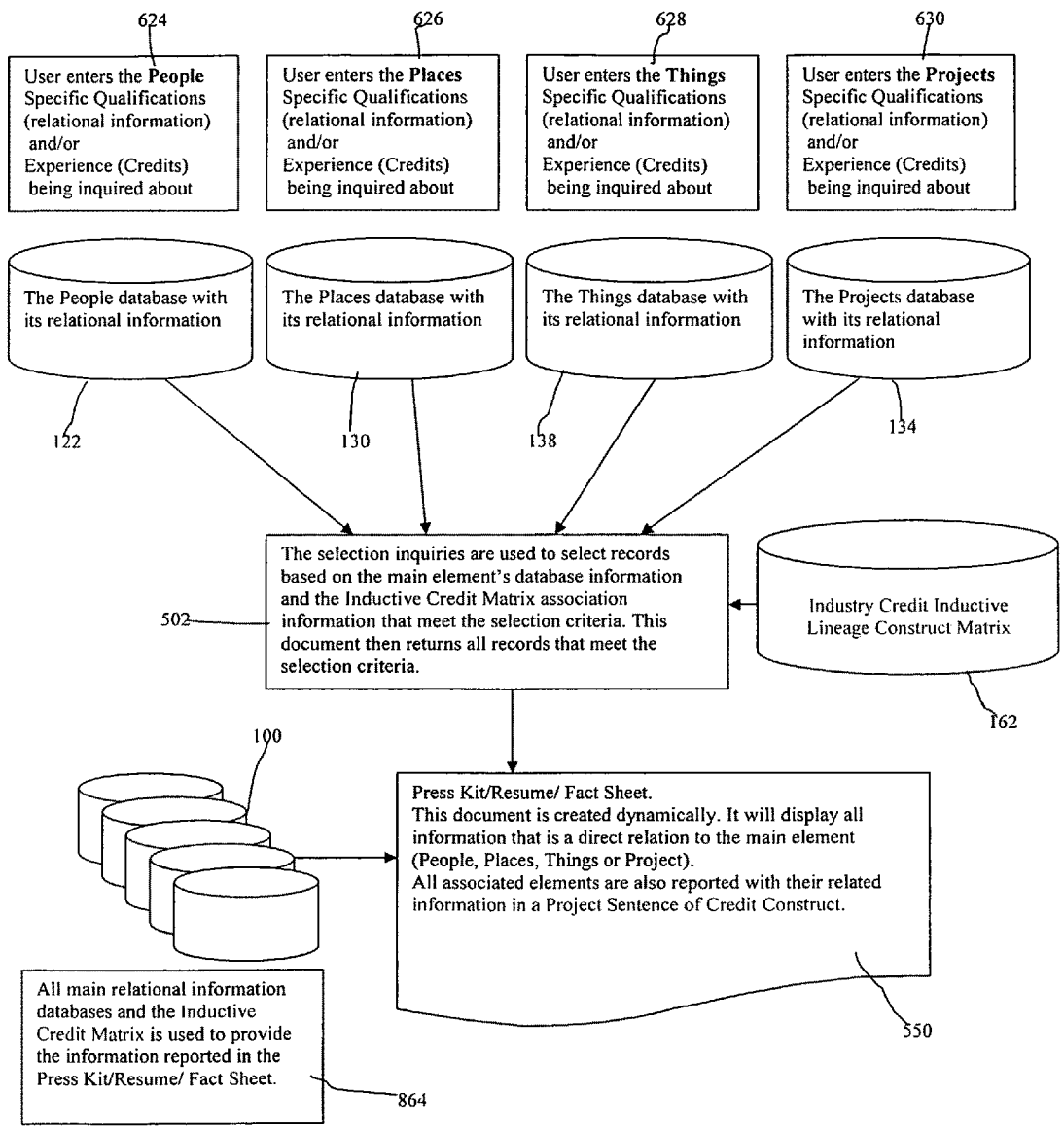
FIG. 11 is a block diagram showing the overview of the reporting capabilities according to the above preferred embodiment of the present invention.

Referring to FIG. 11, People Inquiries 624, Places Inquiries 626, Projects Inquiries 628, and Things Inquiries 630 result in a Record Selection 502 that reports the Press Kit Report 550 according to the Point of View (POV) 860 of the Inquiry 844 requesting Data 800 from the Relational Databases 100 which includes the Industry Credit Inductive Lineage Construct Matrix 162 and the People Relational Information 122, the Places Relational Information 130, the Things Relational Information 138, and the Projects Relational Information 134.

The People Inquiry 624 is an inquiry initiated by the User who enters the People Specific Qualifications, wherein any request for information about People 202 from the Relational Databases 100. The Places Inquiry 626 is an inquiry initiated by the User who enters the Places Specific Qualifications, wherein any request for information about Places 204 from the Relational Databases 100. The Projects Inquiry 628 is an inquiry initiated by the User who enters the Projects Specific Qualifications, wherein any request for information about Projects 216 from the Relational Databases 100. The Thing Inquiry 630 is an inquiry initiated by the User who enters the Things Specific Qualification, wherein any request for information about Things 218 from the Relational Databases 100.

Figure 12:
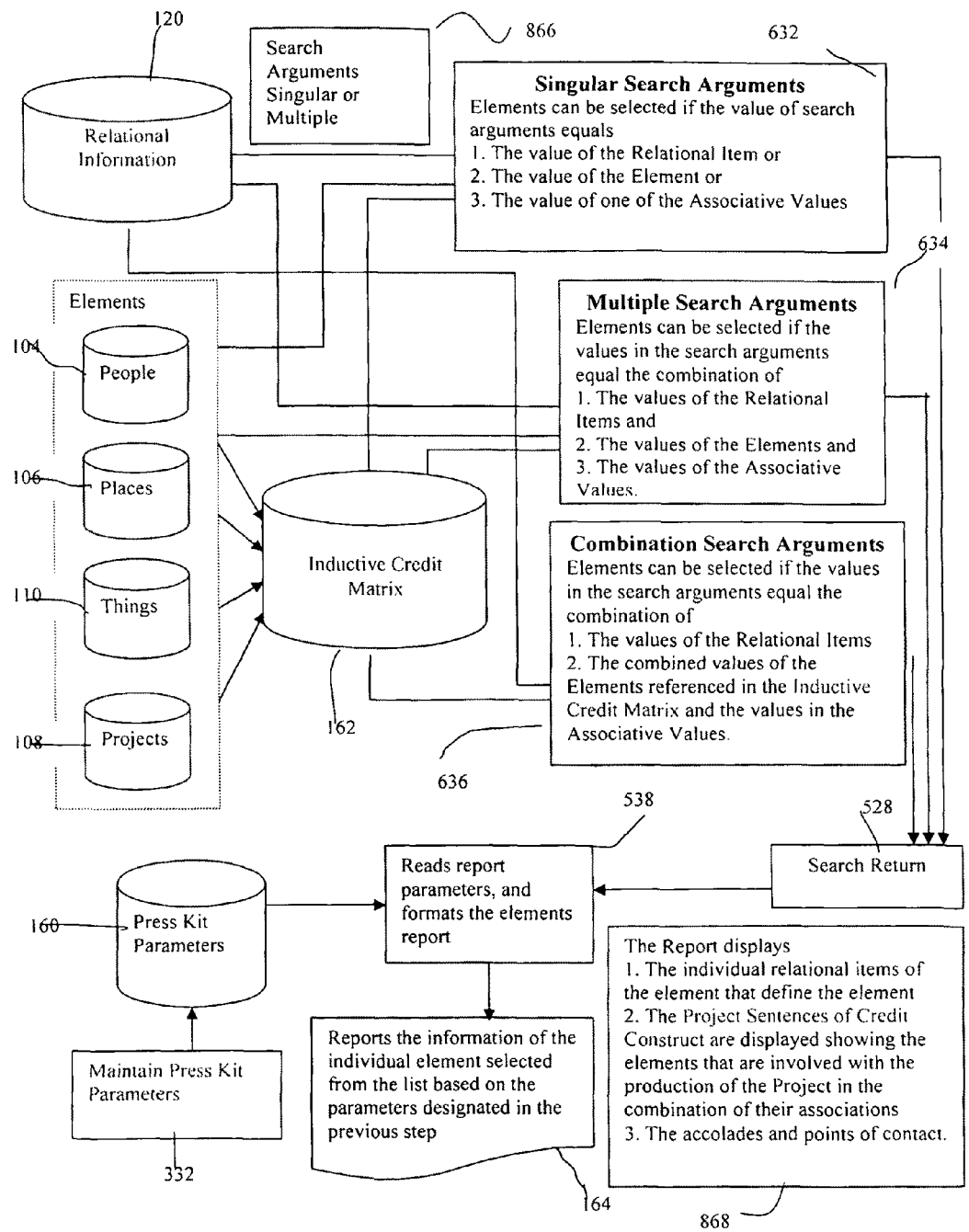
FIG. 12 is schematic flow chart indicating the search, selection and reporting process with appropriate text according to the above preferred embodiment of the present invention.

Referring to FIG. 12, information inquiring about People 202, Places 204, Projects 216, or Things 218 and their Relations is provided for input into the system by the People Query Module 506, the Places Query Module 508, the Projects Query Module 510, the Things Query Module 512, and the Singular Search Arguments 632. The Singular Search Arguments 632 produce the Search Return 528, as a combined People List Module 530, Places List Module 532, Projects List Module 534, and Things List Module 536. The Singular Search Arguments 632 will enter where values are entered for a Relational Item, an Element, or one of the Associative Values and be used to Query the Industry Credit Inductive Lineage Construct Matrix 162, the Relational Information 120, the People Information Table 104, the Places Information Table 106, the Projects Information Table 108, and the Things Information Table 110. The result is a List of the Selected Elements (Search Return 528).

Multiple Search Arguments 636 are search arguments entered where values are entered for Relational Items and the Elements and the Associative Values and Combination Search arguments 646 are search arguments where the values entered are the Relational Items, the combined values of the Elements referenced in the Inductive Credit Matrix and the values in the Associative Values. The Multiple Search Arguments 636 and the Combination Search Arguments 646 are used to Query the Industry Credit Inductive Lineage Construct Matrix 162, the Relational Information 120, the People Information Table 104, the Places Information Table 106, the Projects Information Table 108, and the Things Information Table 110. The result is a List of the Selected Elements (Search Return 528).

Inquiries using the People Query Module 506 are the Multiple Search Arguments 634 and the Combination Search Arguments 636 use the People Search Engine 518 to produce the People List Module 530. Inquiries using the Places Query Module 508 are the Multiple Search Arguments 634 and the Combination Search Arguments 636 use the Places Search Engine 520 to produce the Places List Module 532. Inquiries using the Projects Query Module 510 are the Multiple Search Arguments 634 and the Combination Search Arguments 636 use the Projects Search Engine 522 to produce the Projects List Module 534. Inquiries using the Things Query Module 512 are the Multiple Search Arguments 634 and the Combination Search Arguments 636 use the Things Search Engine 524 to produce the Things List Module 536. The People List Module 530, the Singular Search Arguments 632, the Projects List Module 534, and the Things List Module 536 use the Press Kit Parameters 160 combined with the Report Writer 502 to produce the Project Sentences of Credit Construct from a People Point of View (i.e. People Press Kit Reports) 554, the Project Sentences of Credit Construct from a Places Point of View (i.e. Places Press Kit Reports) 580, the Project Sentences of Credit Construct from a Projects Point of View (i.e. Projects Press Kit Reports) 600, and the Project Sentences of Credit Construct from a Things Point of View (i.e. Things Press Kit Reports) 612.

Figure 13:
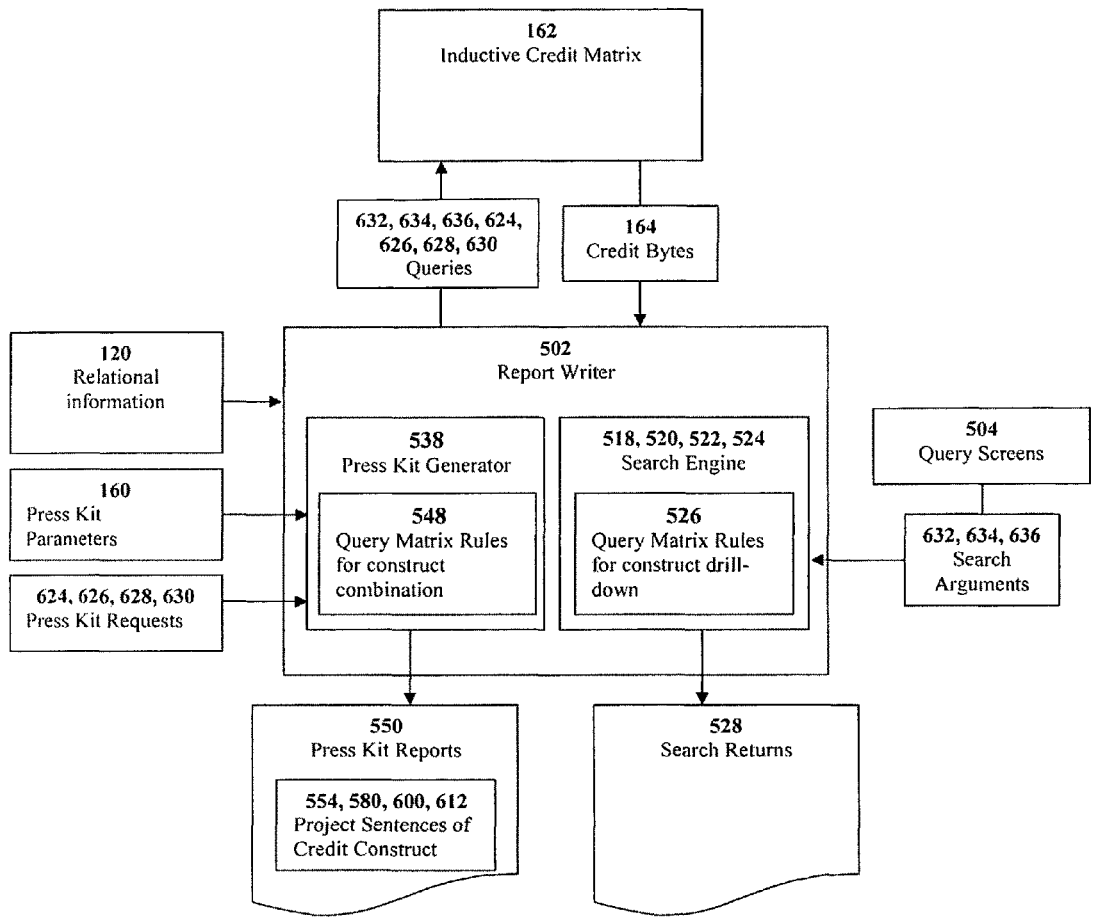
FIG. 13 is a diagram showing the report writer with its inputs and outputs according to the above preferred embodiment of the present invention.

Referring to FIG. 13, the Report Writer 502 transforms the Credit Instances 200 into the Conjunctive Project Sentences of Credit Construct from the People Point of View 554, the Conjunctive Project Sentences of Credit Construct from the Places Point of View 580, the Conjunctive Project Sentences of Credit Construct from the Projects Point of View 600, and the Conjunctive Project Sentences of Credit Construct from the Things Point of View 612 from the Credit Bytes 164. The Report Writer 502 generates the Search Return 528 and the Press Kit Report 550.

As shown in FIG. 13, Query Screens 504, which are screens for entering search criteria for the People 202, Places 204, Projects 216, and the Things 218, pass the Singular Search Argument 632, the Multiple Search Arguments 634, and the Conjunctive Search Arguments 636 into the People Search Engine 518, the Places Search Engine 520, the Projects Search Engine 522, and the Things Search Engine 524, wherein the People, Places, Projects and Things Search Engines 518, 520, 522, 524 query the Industry Credit Inductive Lineage Construct Matrix 162 according to the Construct Drill-down Rules 526, resulting in the Search Return 528 which may also report Relational Information 120.

The People Inquiries (i.e. People Press Kit Requests) 624, the Places Inquiries (i.e. Places Press Kit Requests) 626, the Projects Inquiries (i.e. Projects Press Kit Requests) 628, and the Things Inquiries (i.e. Things Press Kit Requests) 630 are passed into the Press Kit Generator 538 which queries the Industry Credit Inductive Lineage Construct Matrix 162 according to the Construct Combination Rules 548, to create the Conjunctive Project Sentences of Credit Construct from the People Point of View 554, the Conjunctive Project Sentences of Credit Construct from the Places Point of View 580, the Conjunctive Project Sentences of Credit Construct from the Projects Point of View 600, and the Conjunctive Project Sentences of Credit Construct from the Things Point of View 612 in the Press Kit Report 550 which will also report the Relational Information 120. The Press Kit Report 550 is formatted according to the Press Kit Parameters 160 which may be maintained by the Maintain Press Kit Parameters 332 process according to user preferences.

Figure 14:
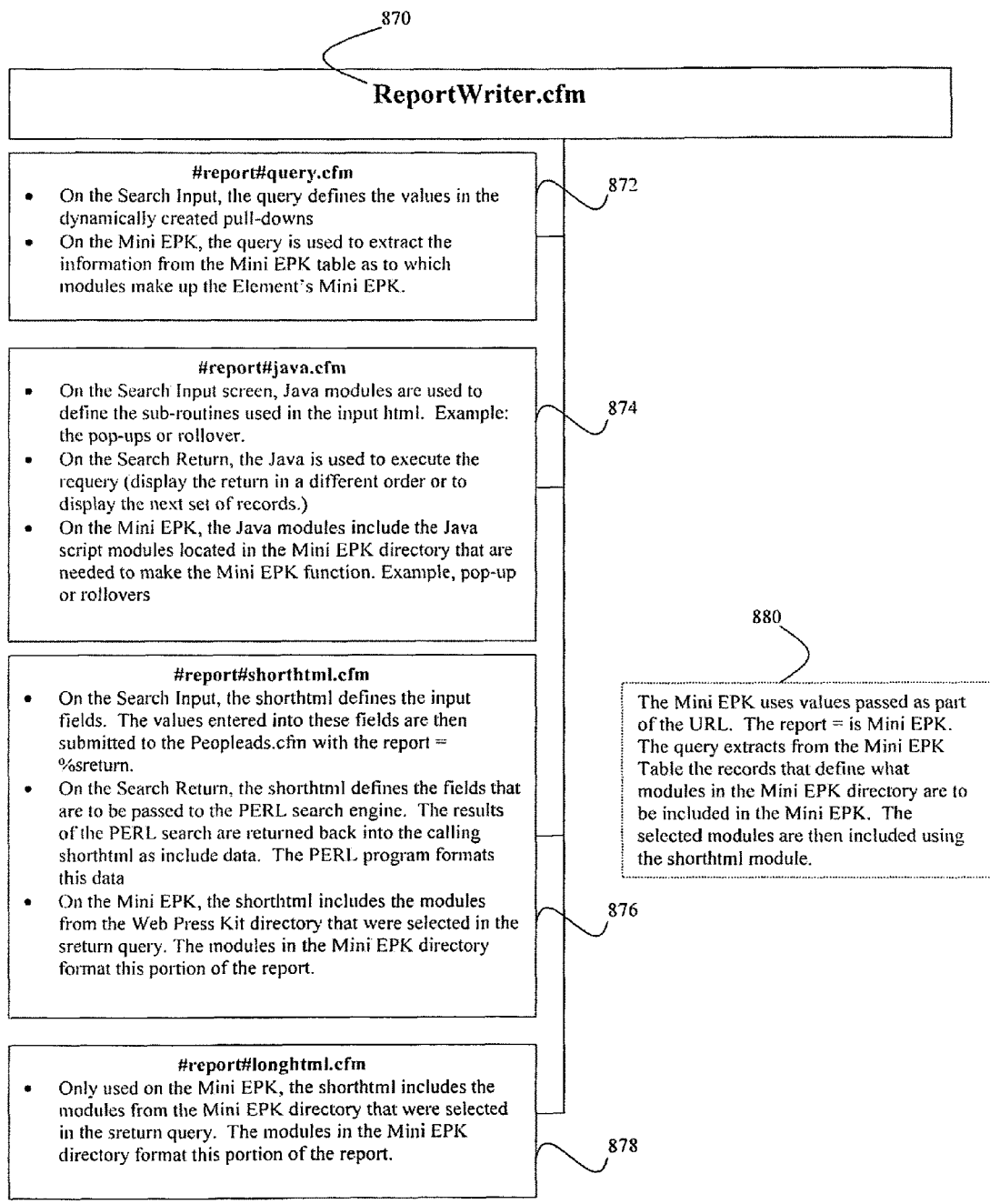
FIG. 14 is a diagram flow chart indicating the report writer module implementation with appropriate text according to the above preferred embodiment of the present invention.

Referring to FIG. 14, in the preferred embodiment, the Report Writer 502 is implemented as a ReportWriter.cfm 846 code module.

Figure 15:
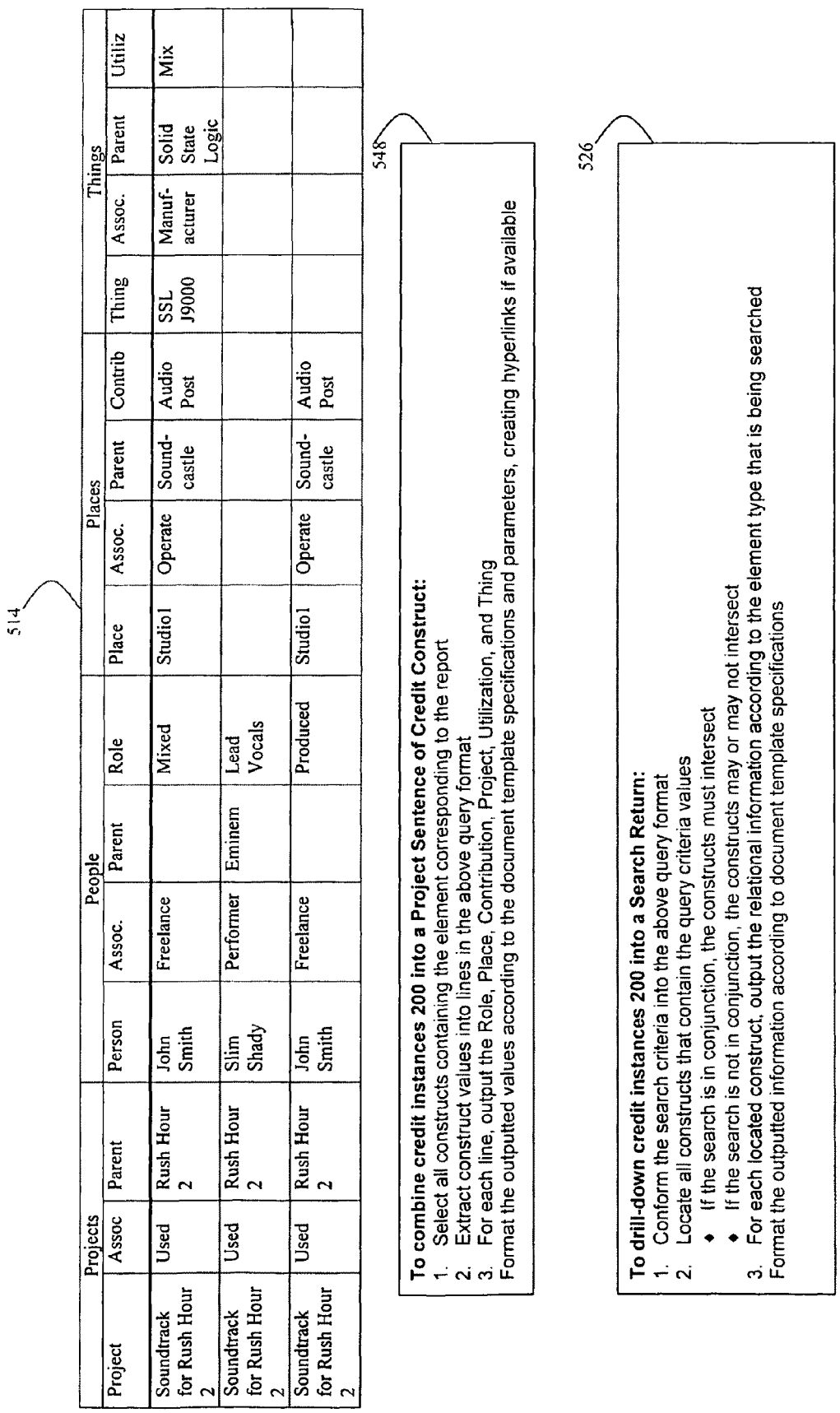
FIG. 15 is a tables diagram showing the query matrix rules in combining constructs and to drill-down constructs into a search return with appropriate text, that is a sub-drawing of the report writer, according to the above preferred embodiment of the present invention.

Referring to FIG. 15, Construction Combination Rules 548 are the rules for combining the Credit Bytes 164 that results in the Conjunctive Project Sentences of Credit Construct. This is used by the Press Kit Generator 538 in the Report Writer 502 whenever a Conjunctive Project Sentence of Credit Construct is requested for display. Construct Drill-Down Rules 526 for construct drill-dow include the steps of conforming the search criteria into the Query Matrix format, locating Credit Instances 200 that contain the values in the Query Matrix, and outputting the Credit Bytes 164 as well as the related Relational Information 120 as needed by the List Modules. These rules are used by the Search Engine to retrieve Credit Bytes 164 from Credit Instances 200 whenever a Search is executed. The Construct Combination Rules 548 and the Construct Drill-down Rules 526 are applied to the Industry Credit Inductive Lineage Construct Matrix 162 by the Report Writer 502 to yield a Query Matrix 514 which forms the Credit Bytes 164.

Figure 16A:
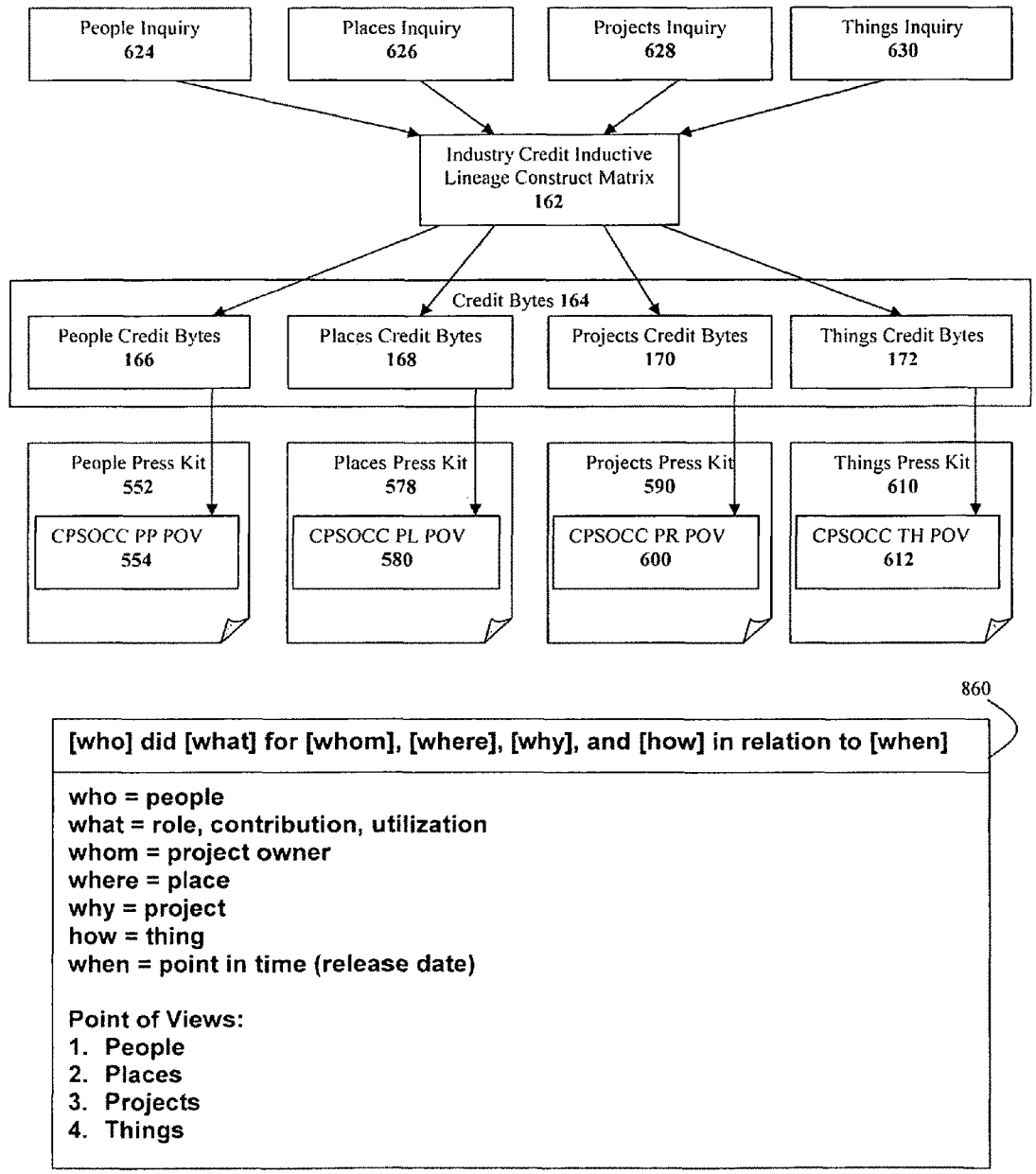
FIG. 16a is block diagram illustrating a conjunctive sentence credit construct template legend reporting who did what for whom, where, why and how in relation to when with appropriate text according to the above preferred embodiment of the present invention.

Referring to FIG. 16a, the Project Sentences of Credit Construct from the People Point of View 554, the Project Sentences of Credit Construct from the Places Point of View 580, the Project Sentences of Credit Construct from the Projects Point of View 600, and the Project Sentences of Credit Construct from the Things Point of View 612, report Who Did What for Whom, Where, Why, and How in relation to When, as illustrating in Box 860 in FIG. 16a, regardless of whether it appears on the People Press Kit Report 552, the Places Press Kit Report 578, the Projects Press Kit Report 590 or the Things Press Kit Report 610.

Figure 16B:
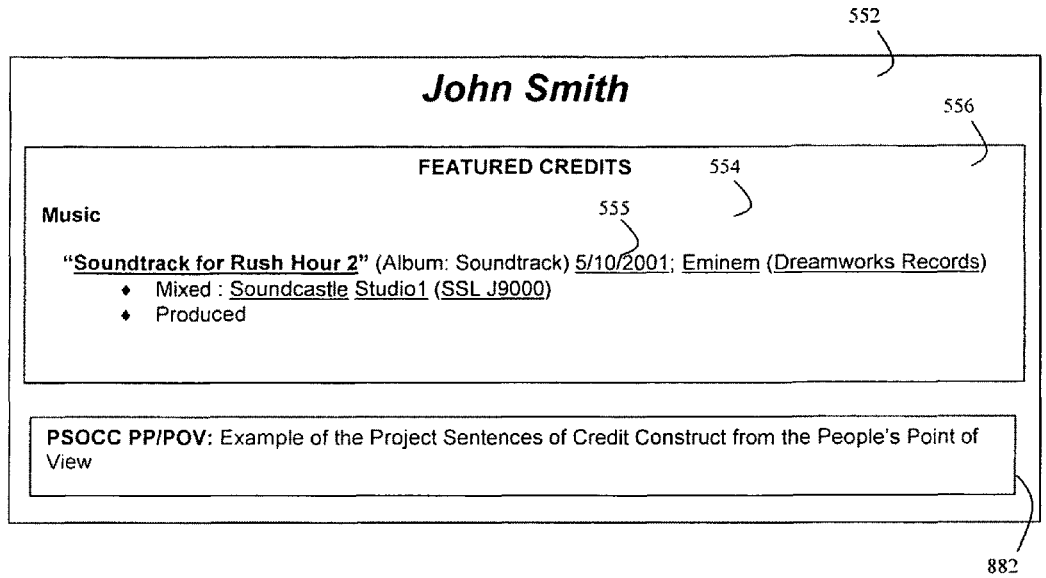
FIG. 16b is a diagram of a Peoples' press kit Conjunctive Project Sentence of Credit Construct example within a credit reporting module for Featured Credits, with appropriate People's point of view text, according to the above preferred embodiment of the present invention.
Figure 17A:
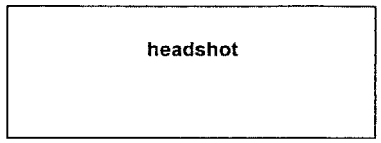
Figure 17C:
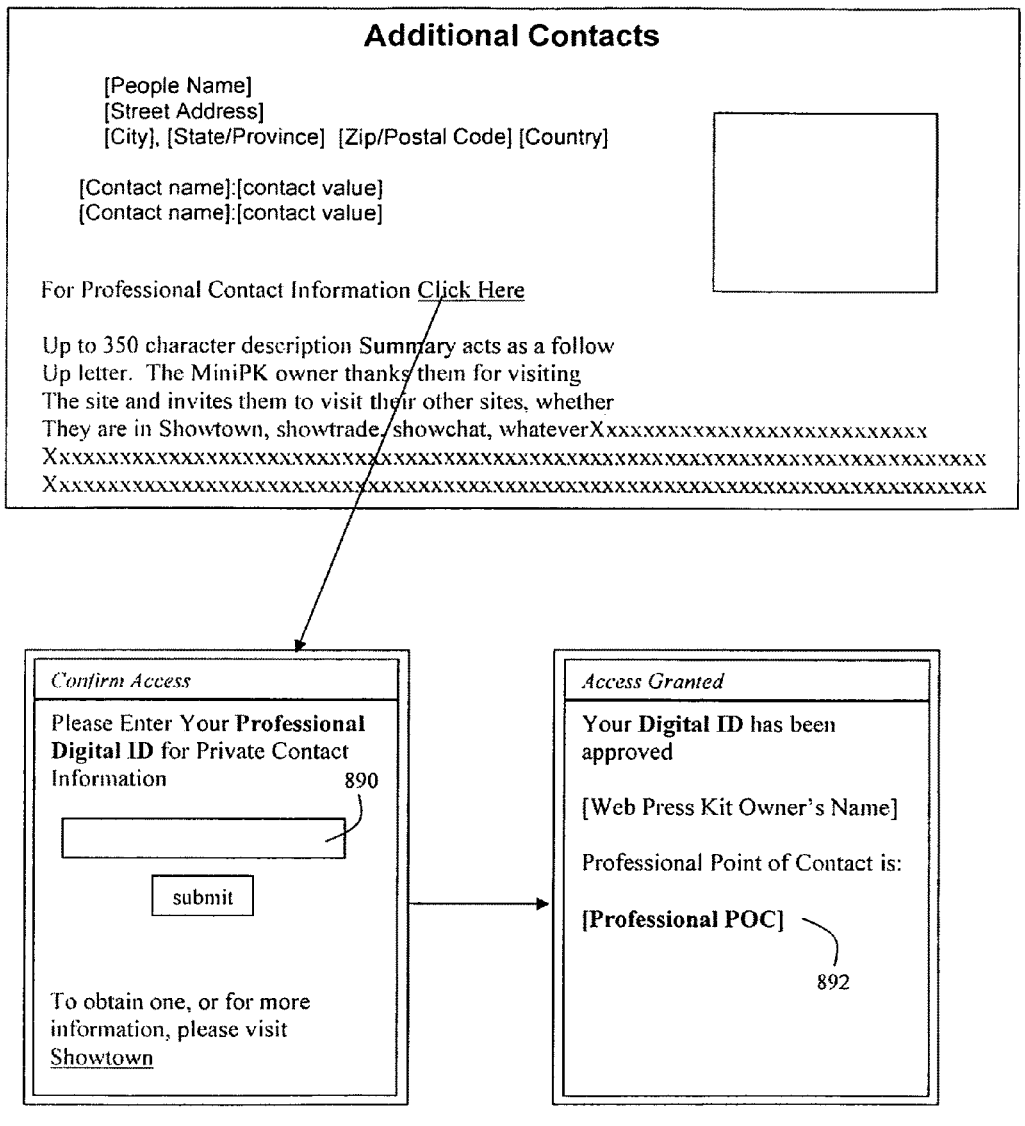
Figure 17D:
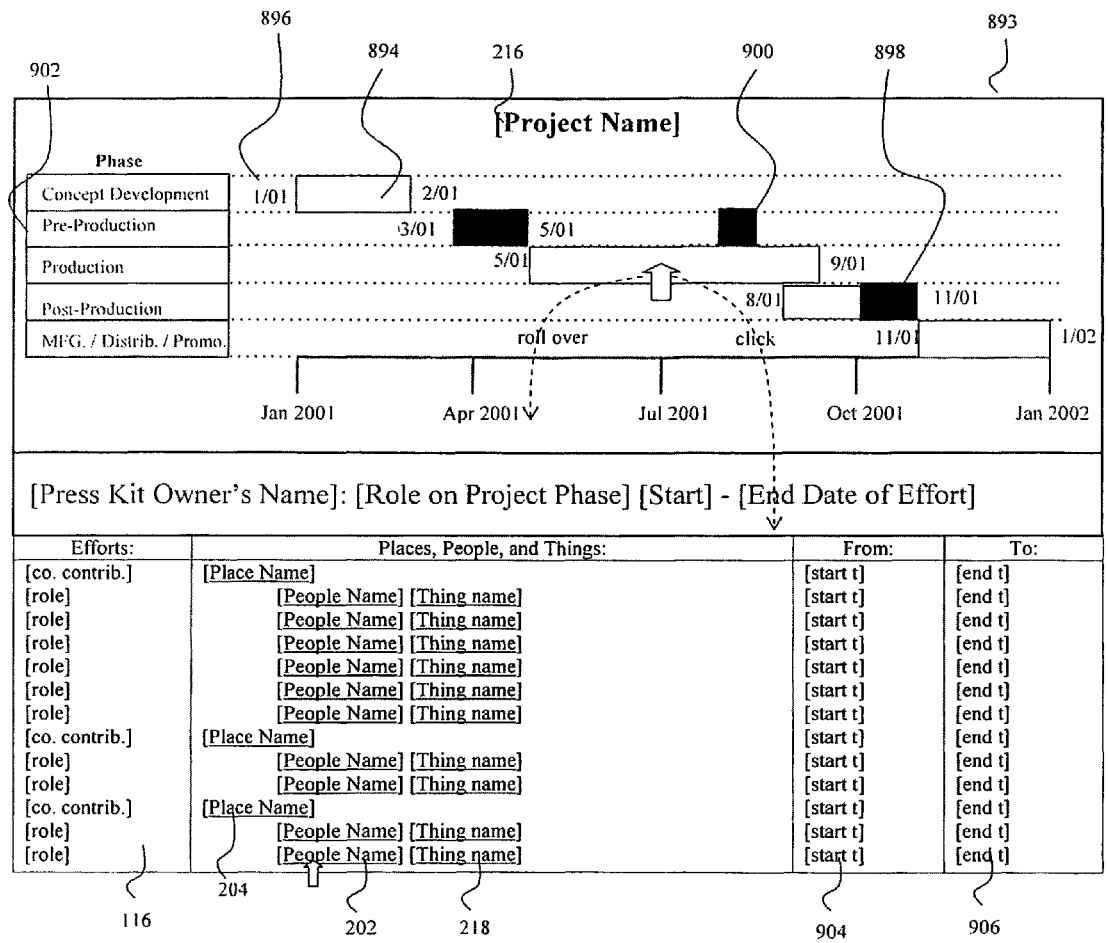
FIG. 17d is a diagram showing the Project Phase Timeline Report displaying the Phases according to the above preferred embodiment of the present invention.

FIG. 16b illustrates that the Press Kit Report for People 552 that may contain the Featured Credits Module 556 containing the Project Sentences of Credit Construct from the People Point of View 554 whose Project Publication Date 930 links to a People Timeline Report as shown in FIG. 17d.

Figure 16C:
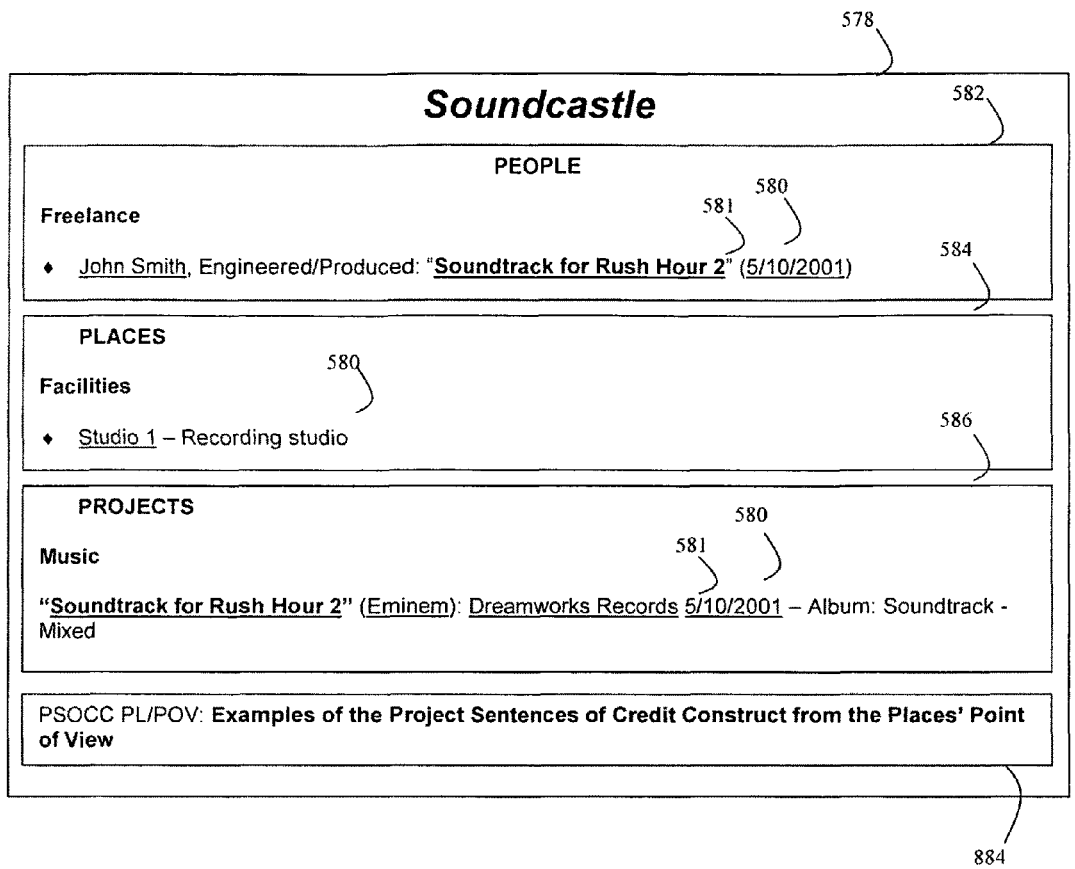
FIG. 16c is a diagram of a Places' press kit Conjunctive Project Sentence of Credit Construct example within credit reporting modules for People, Places, and Projects, with appropriate Places point of view text, according to the above preferred embodiment of the present invention.

FIG. 16c illustrates the Places Press Kit (i.e. Press Kit Report for Places) 578 that may contain a Places People Credit Module 582, a Places Places Credit Module 584, and a Places Projects Credit Module 586, containing Project Sentences of Credit Construct from the Places Point of View 580. The Places People Credit Module 582 displays Project Sentences of Credit Construct containing People Elements in the Places Press Kit 578 and is used in the Places Press Kit 578 to show their Credits and to hyperlink to related People Press Kits 552. The Places Places Credit Module 584 displays Project Sentences of Credit Construct containing Places Elements in the Places Press Kit 578 and is used in the Places Press Kit 578 to show their Credits and to hyperlink to related Places Press Kits 578. The Places Projects Credit Module 586 displays Project Sentences of Credit Construct containing Projects Elements in the Places Press Kit 578 and is used in the Places Press Kit 578 to show their Credits and to hyperlink to related Projects Press Kits 590.

Figure 16D:
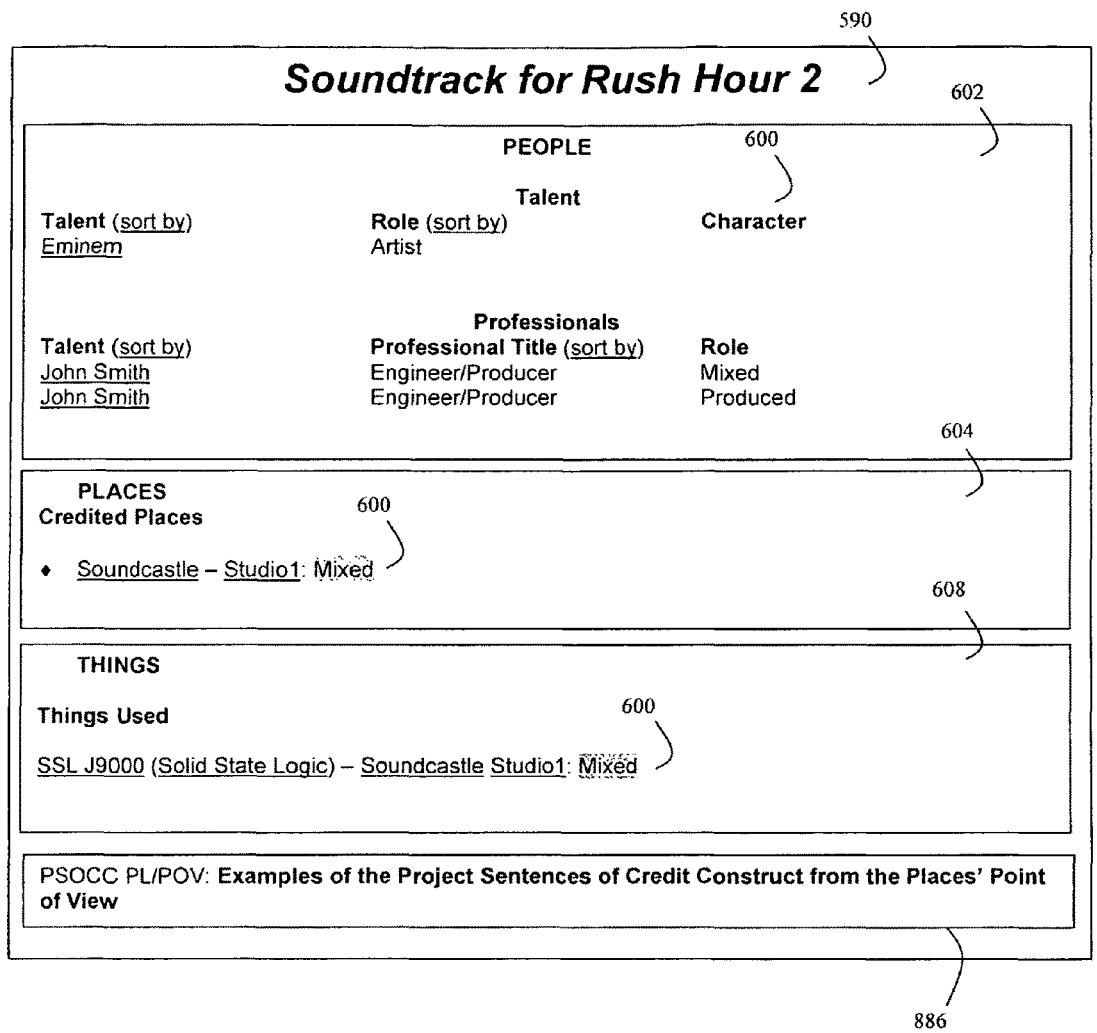
FIG. 16d is a diagram of a Projects' press kit Conjunctive Project Sentence of Credit Construct example within credit reporting modules for People, Places, and Things, with appropriate Projects point of view text, according to the above preferred embodiment of the present invention.

FIG. 16d illustrates the Projects Press Kit (i.e. Press Kit Report for Projects) 590 may contain a Project People Credit Module 602, a Projects Places Credit Module 604, and a Projects Things Credit Module 608, containing Project Sentences of Credit Construct from the Places Point of View 600. The Project People Credit Module 602 displays Project Sentences of Credit Construct containing People Elements in the Projects Press Kit 590 and is used in the Projects Press Kit 590 to show their Credits and to hyperlink to related People Press Kits 552. The Projects Places Credit Module 604 displays Project Sentences of Credit Construct containing Places Elements in the Projects Press Kit 590 and is used in the Projects Press Kit 590 to show their Credits and to hyperlink to related Places Press Kits 578. The Projects Things Credit Module 608 displays Project Sentences of Credit Construct containing Things Elements in the Projects Press Kit 590 and is used in the Projects Press Kit 590 to show their Credits and to hyperlink to related Things Press Kits 610.

Figure 16E:
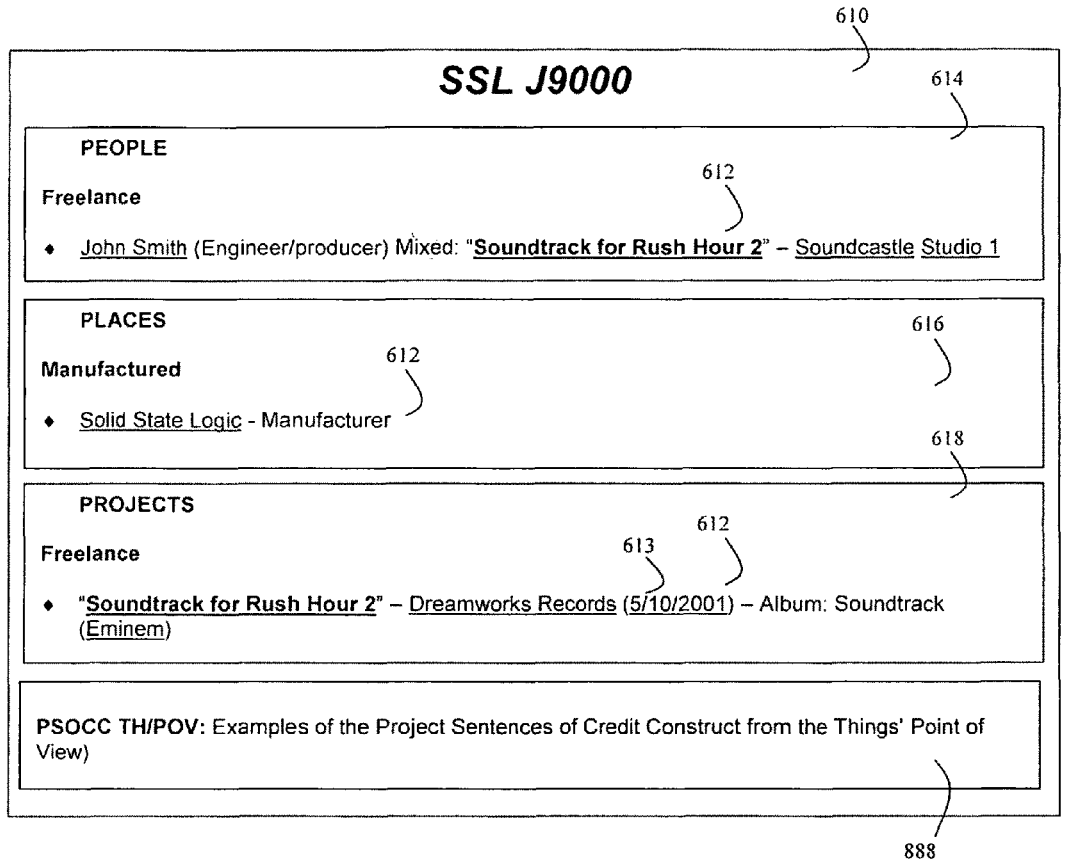
FIG. 16e is a diagram of a Things' press kit Conjunctive Project Sentence of Credit Construct example within credit reporting modules for People, Places, and Projects, with appropriate Things point of view text, according to the above preferred embodiment of the present invention.

FIG. 16e illustrates the Things Press Kit (i.e. Press Kit Report for Things) 610 which may contain a Things People Credit Module 614, a Things Places Credit Module 616, and a Things Projects Credit Module 618, containing Project Sentences of Credit Construct from the Things Point of View 612. The Things People Credit Module 614 displays Project Sentences of Credit Construct containing People Elements in the Things Press Kit 610 and is used in the Things Press Kit 610 to show their Credits and to hyperlink to related People Press Kits 552. The Things Places Credit Module 616 displays Project Sentences of Credit Construct containing Places Elements in the Things Press Kit 610 and is used in the Things Press Kit 610 to show their Credits and to hyperlink to related Places Press Kits 578. The Things Projects Credit Module 618 displays Project Sentences of Credit Construct containing Projects Elements in the Things Press Kit 610 and is used in the Things Press Kit 610 to show their Credits and to hyperlink to related Projects Press Kits 590.

Referring to FIG. 17a, FIG. 17b, and FIG. 17c, the People Press Kit Report 552 may also contain a Header Module 558, a Profile or Highlights Module 560, a Highlights Module 562, a Skills & Talents Module 564, a Media Styling Module 566, an Affiliations Module 572, an Education Module 574, and an Additional Contacts Module 576 containing a World Address 148, wherein said modules are derived from the Relational Information 120.

The Header Module 558 is a module featuring the Relational Information 120 including the Element's Name, wherein the Press Kit Generator 538 retrieves Header Information from the Relational Information 120 and reports it in this module. The Profile or Highlights Module 560 is a module featuring the Relational Information 120 including the Profile or Highlights, wherein the Press Kit Generator 538 retrieves Profile or Highlights Information from the Relational Information 120 and reports it in this module. Highlights Module 562 is a module featuring the Relational Information including the Highlights, wherein the Press Kit Generator 538 retrieves Highlights Information from the Relational Information 120 and reports it in this module. The Skills & Talents Module 564 is a module featuring the Relational Information 120 including the Skills Relational Information, wherein the Press Kit Generator 548 retrieves Skills Information from the Relational Information 120 and reports it in this module. The Media Styling Module 566 is a module featuring the Relational Information 120 including the MediaStyling Relational Information, wherein the Press Kit Generator 538 retrieves MediaStyling Information from the Relational Information 120 and reports it in this module. The Affiliations Module 572 is a module featuring the Relational Information 120 including the Affiliations Relational Information, wherein the Press Kit Generator 538 retrieves Affiliations Information from the Relational Information 120 and reports it in this module. The Education Module 574 is a module featuring the Relational Information 120 including the Education Relational Information, wherein the Press Kit Generator 538 retrieves Education Information from the Relational Information 120 and reports it in this module. The Additional Contacts Module 576 is a module featuring the Relational Information 120 including the Additional Contacts Information, wherein the Press Kit Generator 538 retrieves Additional Contacts Information from the Relational Information 120 and reports it in this module.

The Featured Credits Module 556 contains Project Sentences of Credit Construct from the People Point of View 554. Project Sentences of Credit Construct from the People Point of View 554 may also be included or excluded from display according to its reported elements of People 202, Places 204, Projects 216, or Things 218 where said includes and excludes are defined in the Press Kit Parameters 160 and may be maintained by the Maintain Press Kit Parameters 332 process, according to user preferences.

It is readily understood that this feature provides the user a means for blocking unwanted Conjunctive Project Sentences of Credit Construct from the People Point of View 554, Conjunctive Project Sentences of Credit Construct from the Places Point of View 580, Conjunctive Project Sentences of Credit Construct from the Projects Point of View 600, and Conjunctive Project Sentences of Credit Construct from the Things Point of View 612 from displaying in the respective People Press Kit Report 552, Places Press Kit Report 578, Projects Press Kit Report 590, or Things Press Kit Report 610.

As shown in FIG. 17b, An Awards Module 568 in the People Press Kit 552, the Places Press Kit 578, the Projects Press Kit 590, and the Things Press Kit 610 lists the Awards 114 that are associated to the respective People 202, Places 204, Projects 216, and Things 218. A Related Awards Module 570 lists the Awards 114 that are associated to the respective People 202, Places 204, Projects 216, and Things 218 by an Overlapping Credit Construct 199, including the People 202, Places 204, Projects 216, or Things 218 that is pointed to by the Awards to Recipient Associative Value 198 as the recipient. Said Modules may be arranged in an order determined by the Press Kit Parameters 160, which may be set according to user preferences. A Press Release Link 946 may link to Performance Venues on a Showire 948.

The Additional Contacts Module 576 contains a Private Professional Contact Link 577, upon click displays a Digital ID Entry Prompt 890 which is a digital ID input box where the user can input their digital ID, such as a password, to gain access to the private professional POC. If permission to view is granted, a Private Professional Contact 892 is displayed, which is a Point of Contact (POC) for the Press Kit owner that can only be viewed by selected users, typically a professional user. It is linked from the Press Kit if the user enters a digital ID. The digital ID is checked against a security database which permits any Press Kit owner to grant or deny access to their private professional POC by any other member. In addition, an Additional Attributes Link 932 links to Physical Attributes 222, wherein the Additional Attributes Link 932 is a link to a page containing physical attributes from the physical attributes table on the Press Kit Report.

Referring to FIG. 17d, a Project Phase Timeline Report displays the Phases 902 which are Concept Development, Pre-Production, Production, Post-Production, Manufacturing/Distribution/Promotion. These Phases 902 are possible data 800 for the Point In Time 112 in the Point In Time Table 118. Each of the Phases 902 of the Project 216 has a Start Time 904 and an End Time 906 which are attributes in the Point In Time Table 118. The Associative Value 116 is an Effort on the Phase 898 with its own unique Start Time 904 and End Time 906. The Start Time 904 and End Time 906 corresponding to the Associative Value 116 may appear Within the Phase 898, or Outside the Phase 900, determined by the Start Time 904 and the End Time 906 of the Associative Value 116 compared with that of the Phase 902. The Phases 902 form an Axial Line 896 with the pictoral Phase Box 894.

Figure 17E:
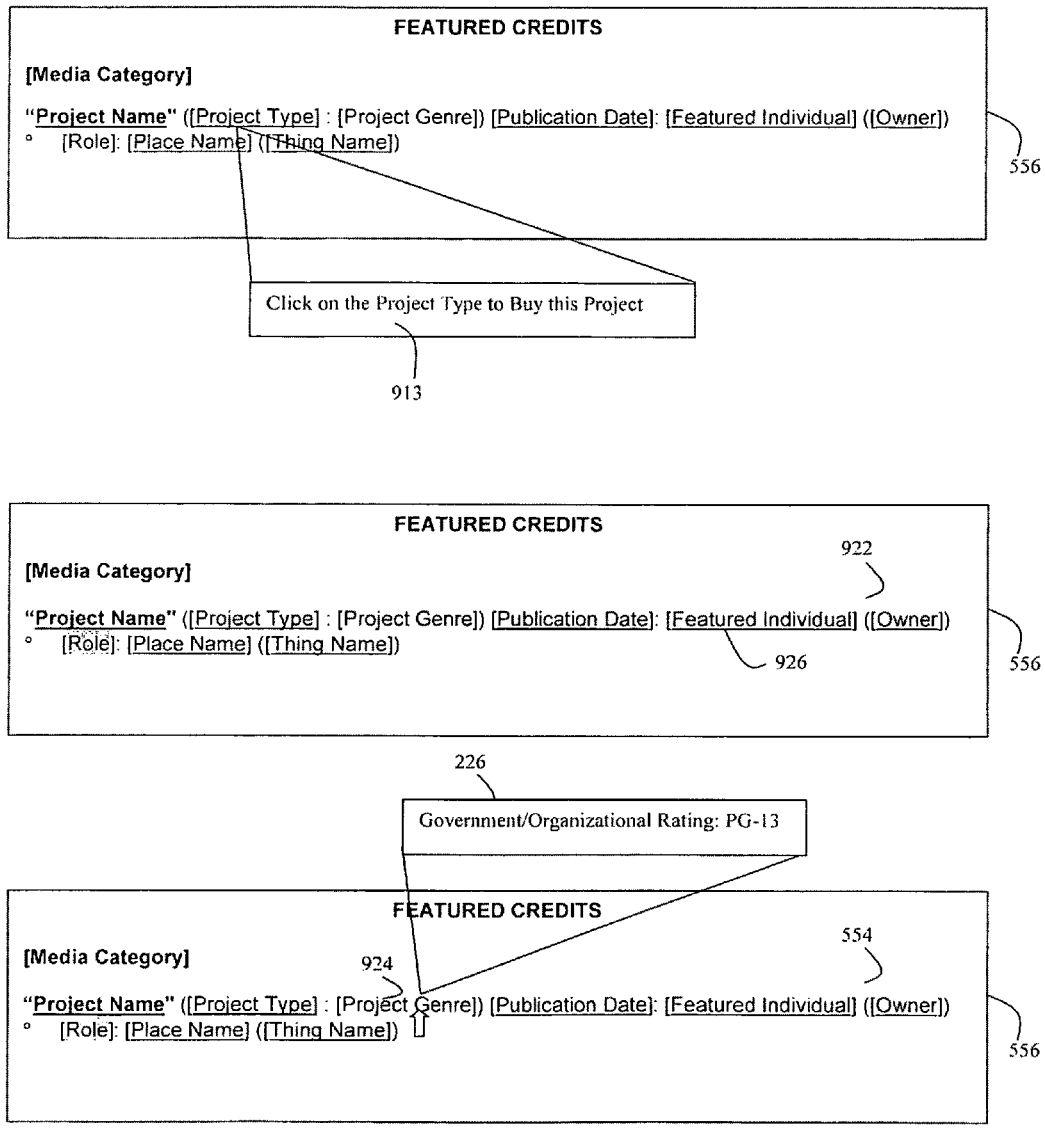
FIG. 17e is a diagram showing the various Conjunctive Project Sentences according to the above preferred embodiment of the present invention.

FIG. 17e illustrates a Project Type Mouseover 912 revealing a Project Buy

Dialog Box 913 in order to purchase goods related to the Project 216. The Conjunctive Project Sentences of Credit Construct from the People Point of View 554, the Conjunctive Project Sentences of Credit Construct from the Places Point of View 580, the Conjunctive Project Sentences of Credit Construct from the Projects Point of View 600, and the Conjunctive Project Sentences of Credit Construct from the Things Point of View 612 may appear as Certified Credits 922 which is a credit that has passed external credit certification process, wherein when a credit is certified, it displays in gold on the press kit report. Also, a Project Genre Mousover 924 reveals the Government/Organizational Rating 226. A Featured Individual 926 is selected by an Associative Value 116 specified in the Press Kit Parameters 160, wherein the Project Genre Mousover 924 is a slot for an element that is featured, wherein the element is selected according to the rules for featured element selection. The featured element slot is a field of the conjunctive project sentence of credit construct.

Figure 17F:
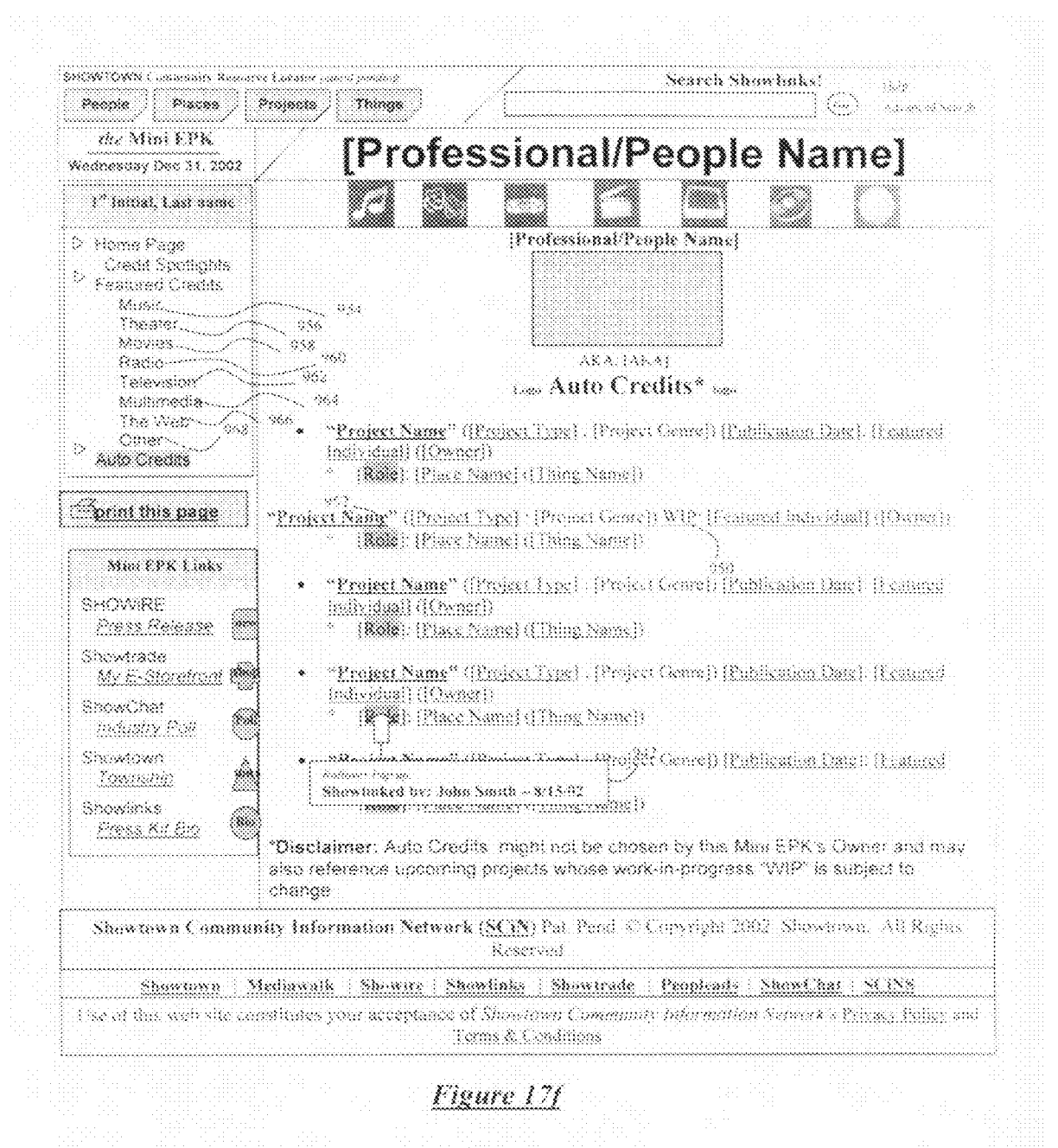

FIG. 17f illustrates an Auto Credits Page 918 in the Press Kit Report 550 shows any Conjunctive Project Sentences of Credit Construct from the People Point of View 554, Conjunctive Project Sentences of Credit Construct from the Places Point of View 580, Conjunctive Project Sentences of Credit Construct from the Projects Point of View 600, or Conjunctive Project Sentences of Credit Construct from the Things Point of View 612 that were not selected in the Press Kit Parameters 160 as Featured Credits 556. In which, credits not chosen by the Press Kit owner to appear in the featured credits section. Also, future projects are listed here. It also displays the Not Yet Released Projects 952. An Input Source Rollover 942 appears on rollover of the Associative Value 116.

FIG. 17g illustrates that the Physical Attributes 222 may be displayed. The embodiment may desire to not allow Physical Attributes 222 to be accessed by the People Search Engine 518, Places Search Engine 520, Projects Search Engine 524, or Things Search Engine 526.

Figure 18:
FIG. 18 is a schematic diagram of a homepage of the Automated Press Kits with Auto Credits Report displays the Conjunctive Project Sentences of Credit Construct according to the above preferred embodiment of the present invention.

Referring to FIG. 18, an Automated Press Kits with Auto Credits Report 920 displays the Conjunctive Project Sentences of Credit Construct from the People Point of View 554, the Conjunctive Project Sentences of Credit Construct from the Places Point of View 580, the Conjunctive Project Sentences of Credit Construct from the Projects Point of View 600, and the Conjunctive Project Sentences of Credit Construct from the Things Point of View 612 that do not appear elsewhere on any Press Kit Report 550.

Figure 19A:
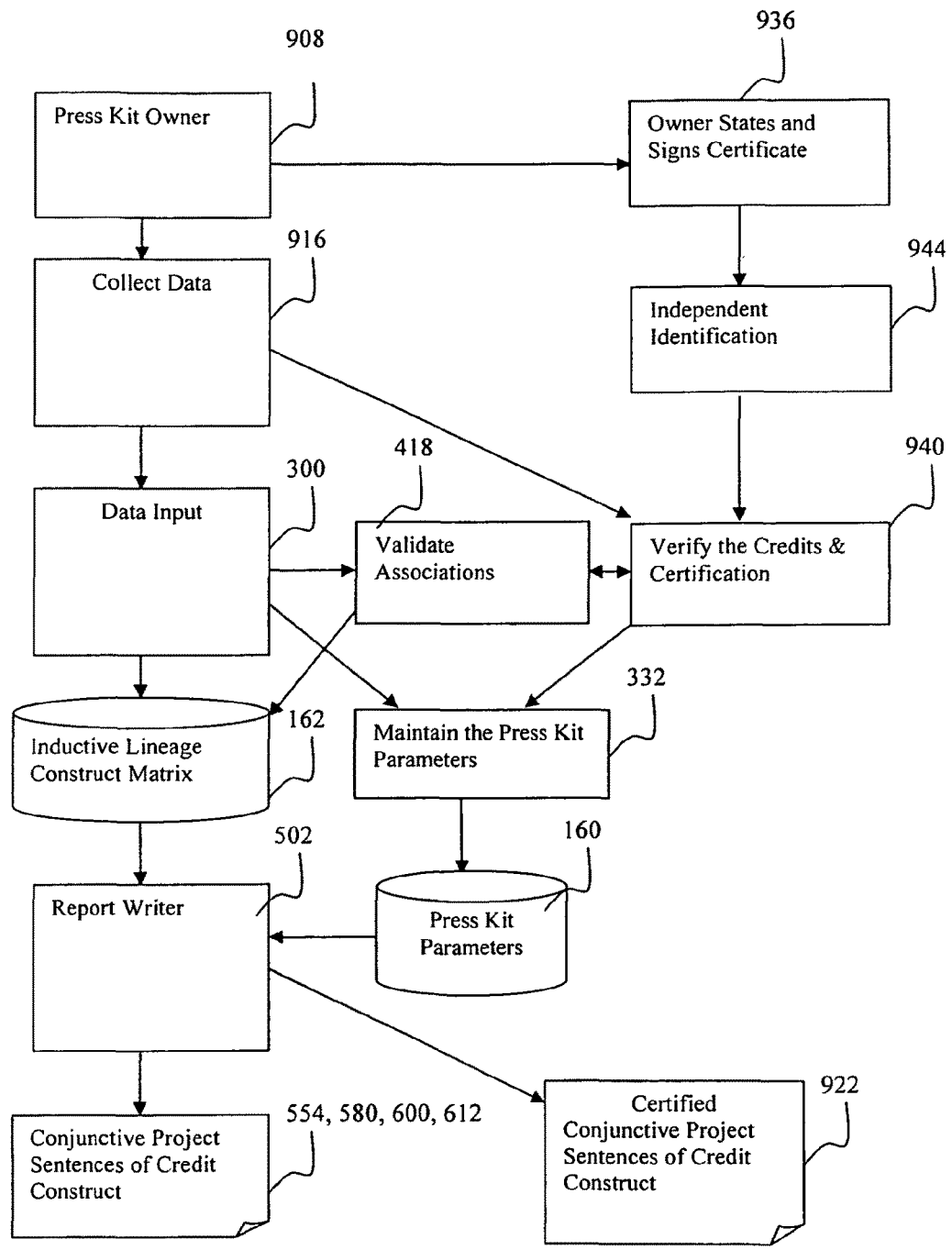
FIG. 19a is a block diagram illustrating the Collect Data Process according to the above preferred embodiment of the present invention.

Referring to FIG. 19a, the Press Kit Owner 908 submits Credit Data 302 to the Collect Data Process 916. In order to report Certified Conjunctive Project Sentences of Credit Construct 922, the Owner States and Signs a Certificate 936 which is used by the Report Writer 502 to format the Credits, select and display the featured element, and format the sentence by media category. If the Verify the Credits and Certification Process 940, which is a process for verifying the credits and approving the certification, does not reject the Credit Data 302, then the Maintain the Press Kit Parameters Process 332 will note those credits as certified in the Press Kit Parameters 160. This will cause the Report Writer 502 to output the Certified Conjunctive Project Sentences of Credit Construct 922 in a different color. The IV&V's are used for validating part of the certification, while more stringent verifying aspects of certification are handled by this process. This process contacts individuals who were involved in the project, while the IV&V's contact the organizations that are authorities on the information.

Figure 19B:
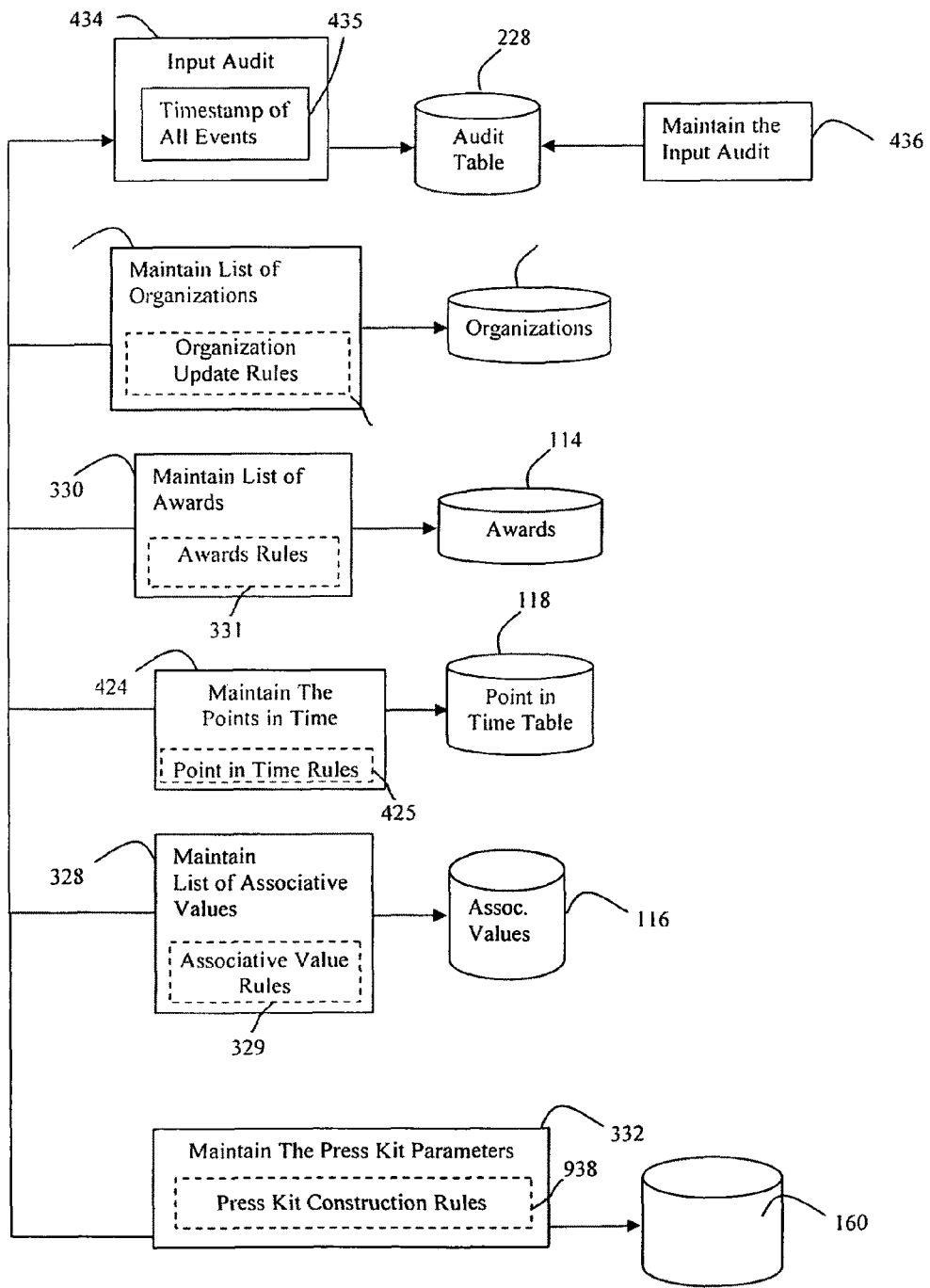
FIG. 19b is a block diagram illustrating the Maintenance Modules according to the above preferred embodiment of the present invention.

FIG. 19b illustrates various Maintenance Modules 322 which are Programmed Modules used to maintain and edit existing information, including the Press Kit Parameters 160 which may be set according to user preference, the lists of Organizations 146 the Awards 114, the Point In Time Table 118, and the Associative Values 116.

The Press Kit Parameters 160 is maintained by a Maintain Press Kit Parameters Process 322 which is a process for changing the Press Kit Parameters for a particular Element's Press Kit Report, as part of the data entry process or in response to user request, wherein the Press Kit Construction Rules 938 are the rules for constructing the Press Kits so as to controls the selection of featured elements, the wording of module titles, and the notation of certified credits.

A Maintain Organizations Process 324, which is used to maintain the list of organizations, to add new organizations, to remove organizations, and to edit organizations, maintains the values found in the List of Organizations 146 in order to eliminate duplicate entries, incorrectly combined entries, and to ensure the values are correctly spelled, wherein A set of Organization Update Rules 326 is used to govern the decisions involving the adding, removing, and editing of Organizations These rules are used by the Maintain Organizations Process to determine what values of information will be allowed in the database.

A Maintain Associative Valves Process 329 is used to maintain the list of Associative Values 116 in order to eliminate duplicate entries, incorrectly combined entries, and to ensure the values are correctly spelled so as to maintain the list of Associative Values 116, to add new Associative Values 116, to remove Associative Values 116, and to edit Associative Values 116, wherein a set of Associative Value Rules 329 is used by the Maintain Associative Values Process to determine what values of information will be allowed in the database, i.e. to govern the decisions involving the adding, removing, and editing of Associative Values 116.

A Maintain Awards Process 330 maintains the list of Awards 114 in order to eliminate duplicate entries, incorrectly combined entries, and to ensure the values are correctly spelled so as to maintain the list of Awards 114, to add new Awards 114, to remove Awards 114, and to edit Awards 114. A set of Awards Rules 331 that govern the decisions involving the adding, removing, and editing the list of Awards 114 are used by the Maintain Awards Process 330 to determine what values of information will be allowed in the database.

A Maintain the Point In Time Process 424 maintains the Point In Time Table 118 whenever there is a change to the Point In Time table 118 such as the input process. Also, An Input Audit Process 434 is used to maintain the Audit Table 228 by recording input and maintenance actions by the input and the maintenance processes. Timestamp Changes 435 is processed by the Input Audit Process 434 for attaching the current time for any input or maintenance action.

It should be understand that any future module and/or process as illustrated in Box 334 in FIG. 2a, that may access the system, and/or produce different reports from the same information and to illustrate that the reports and the existing data entry process are not the only means for inputting and outputting from the system.

Figure 20A:
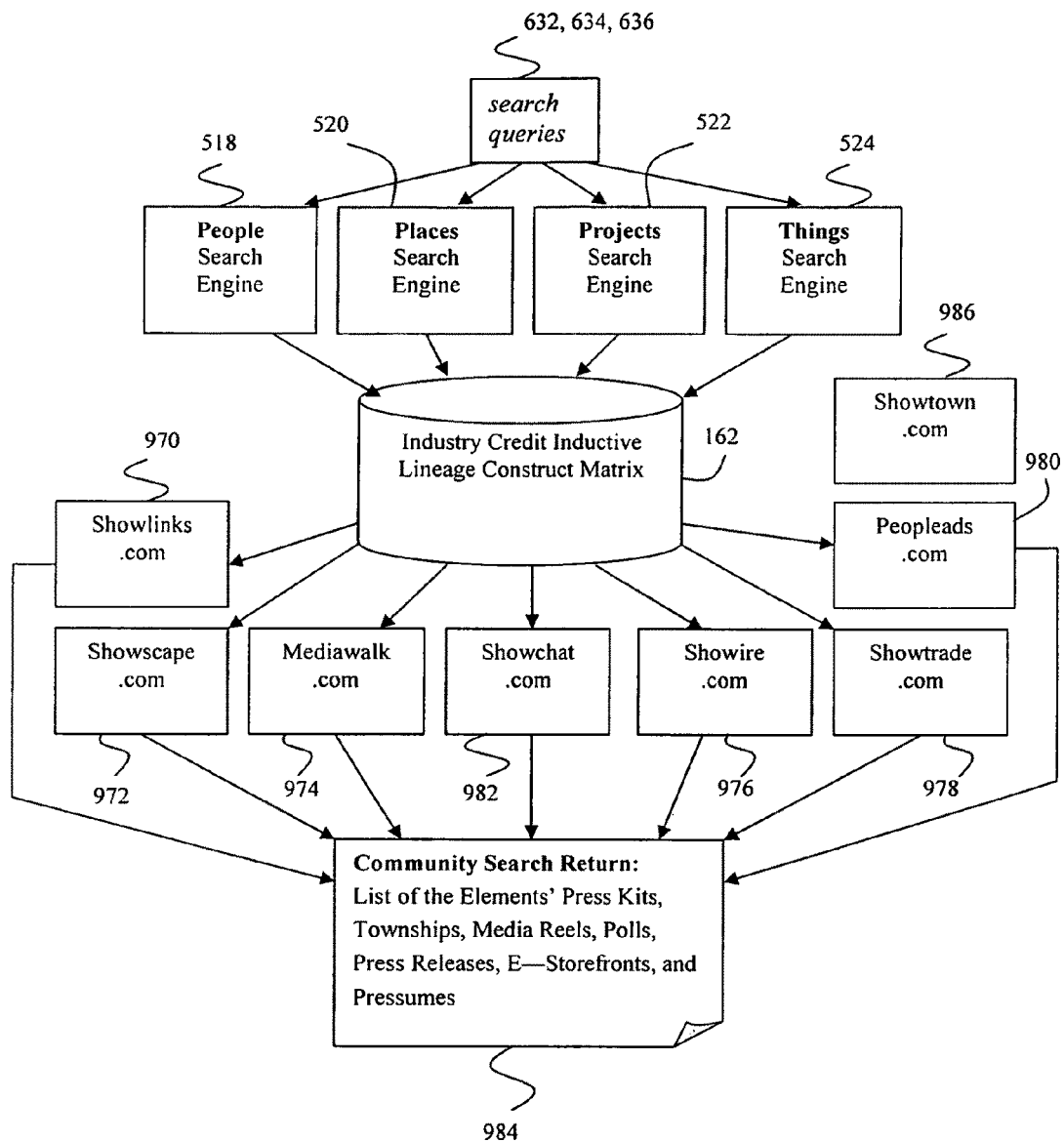
FIG. 20a is a block diagram illustrating the Search Queries and Search Engines for various applications according to the above preferred embodiment of the present invention.

Referring to FIG. 20a, the Search Queries 632, 634, 636 are passed into the People Search Engine 518, the Places Search Engine 520, the Projects Search Engine 522, and the Things Search Engine 524 to query the Industry Credit Inductive Lineage Construct Matrix 162. A Showlinks 970, a Web Sites Showscape 972, a Mediawalk 974, a Showire 976, a Showtrade 978, a Peopleads 980, a Showchat 982, and a Showtown 984 will report whether the People 202, Places 204, Projects 216, or Things 218 in a Community Search Return 984 will have a Poll 1000, an E-Storefront 998, a Press Release 994, a Township 990, a Media Reel 992, or a Press Kit Report 550.

The Showlinks 970 is a community web site whose main feature is the Web Press Kit. The showscape 972 is a community web site whose main feature is the Township. The Mediawalk 974 is a community web site whose main feature is the Media Reels. The Showire 976 is a community web site whose main feature is the Press Release. The Showtrade 978 is a community web site whose main feature is the E-Storefront. The Peopleads 980 is a community web site whose main feature is the Pressume. The Showchat 982 is a community web site whose main feature is the Poll. The Showtown 984 is a community web site whose main feature is the Customized Portal Page.

The homepages of the Showtown 984, the Showscape 972, the Mediawalk 974, Showchat 982, the Showtrade 978, the Showire 976, the Peopleads 980, the Showlinks 970, and the Showtown World Wide are embodied and illustrated in FIGS. 21a to 21i of the present invention. The homepages designs as shown in FIGS. 21a to 21i are used to demonstrate how the system of the present can be embodied through the Internet and operated through the Computer System 700 of the user, but not intended to limit the scope of the following claims.

Figure 20B:
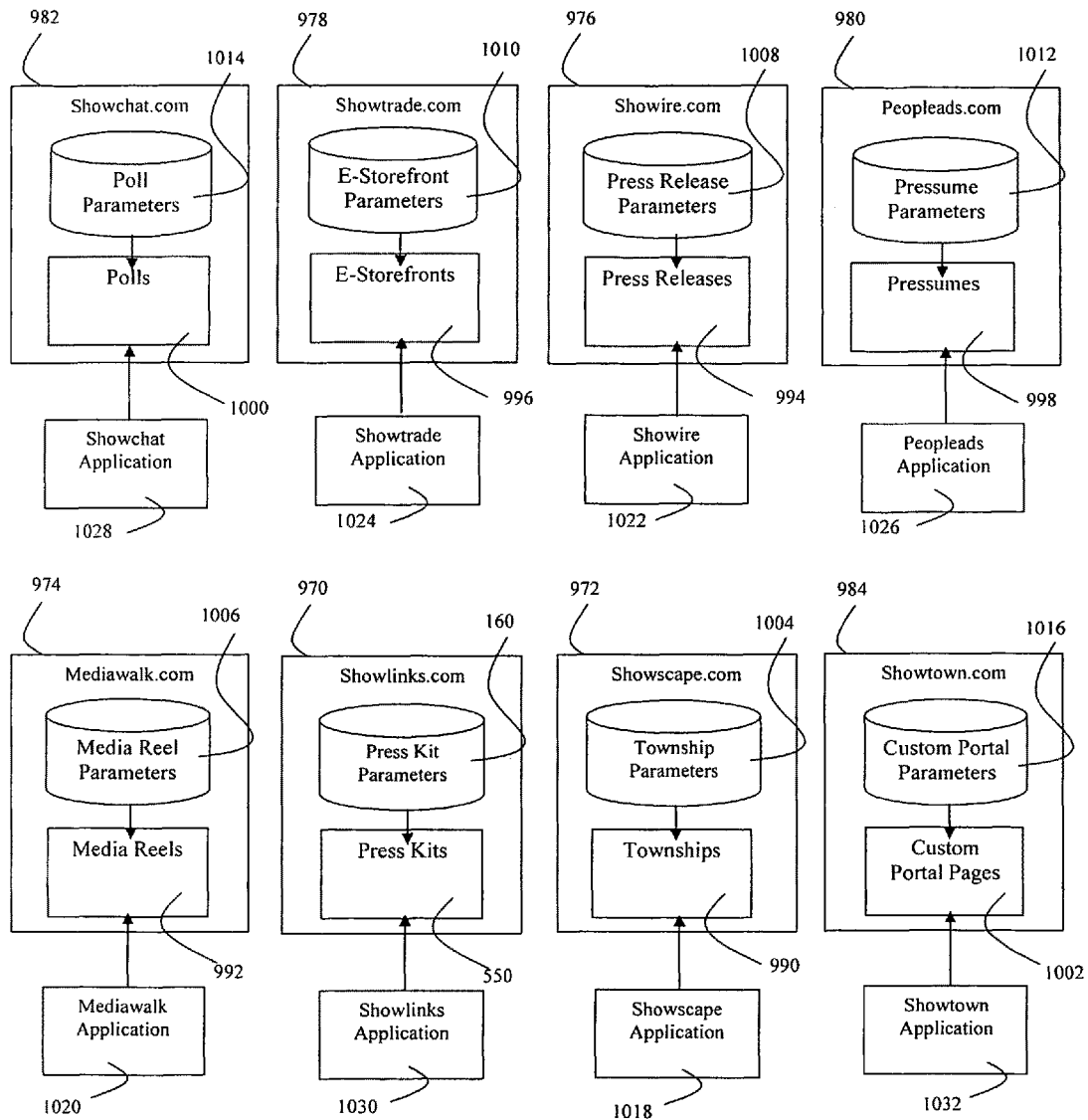
FIG. 20b illustrates the Poll Parameters and Polls for various applications according to the above preferred embodiment of the present invention.
Figure 21B:
Figure 21H:
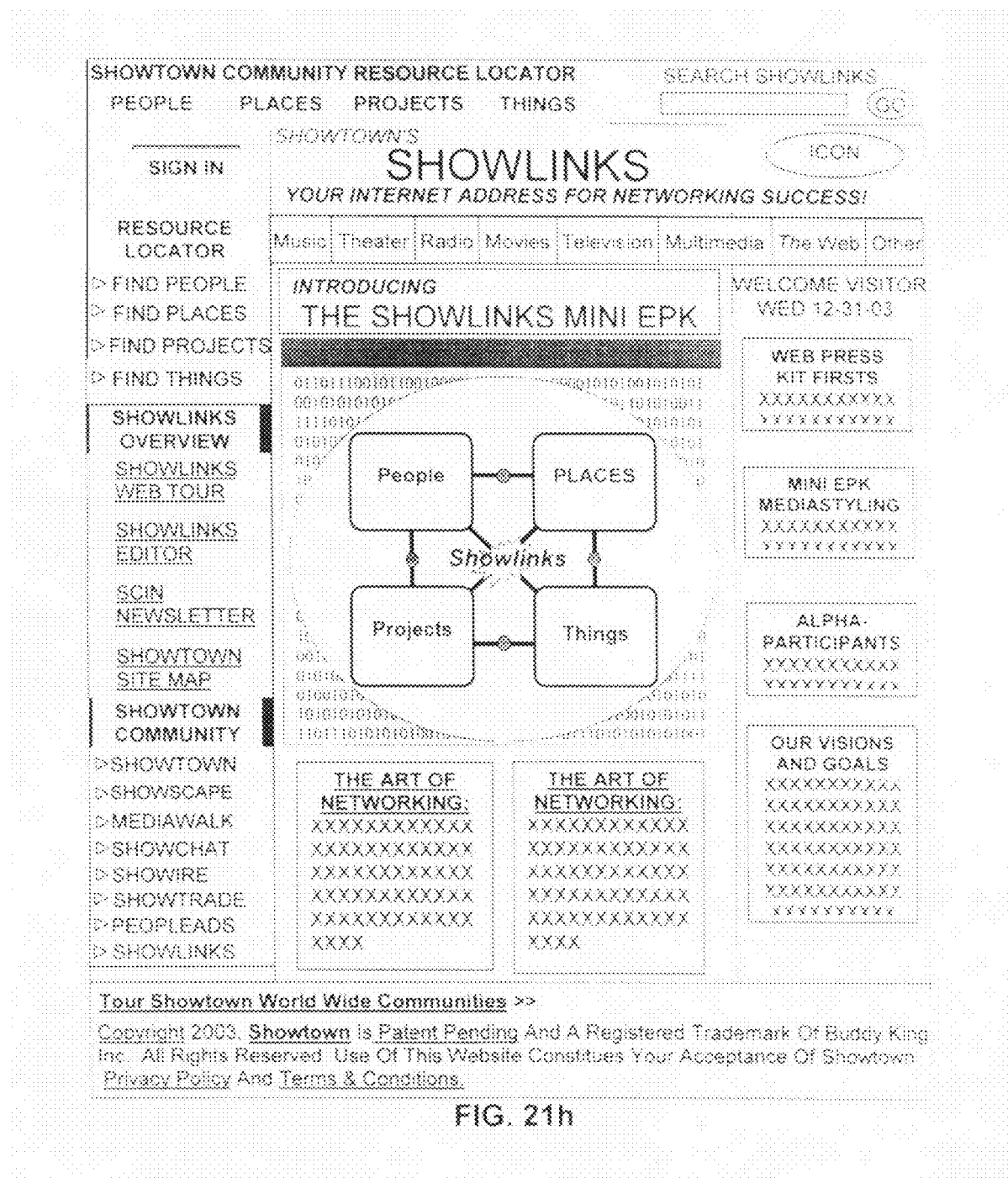
Figure 21I:
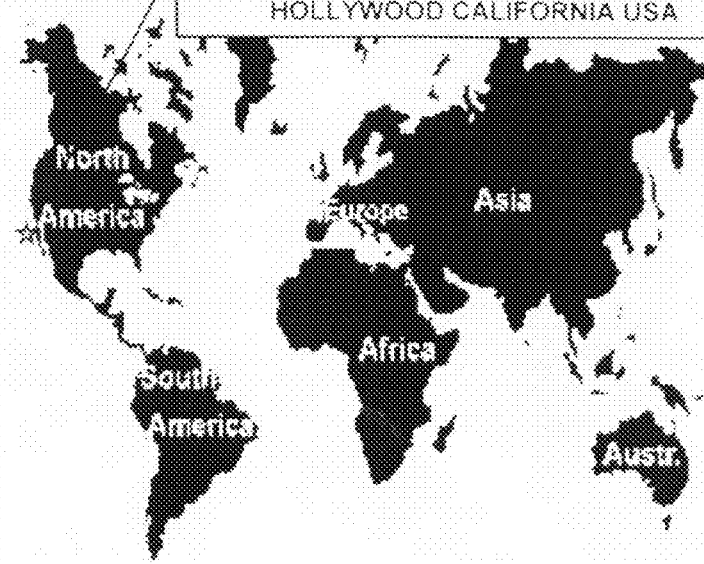

Referring to FIG. 20b, the Showchat 982 comprises Poll Parameters 1014 and the Polls 1000 which are maintained by the Showchat Application 1028. The Showtrade 978 comprises E-Storefront Parameters 1010 and E-Storefronts 996 which are maintained by the Showtrade Application 1024. The Showire 976 comprises Press Release Parameters 1008 and the Press Releases 994 which are maintained by the Showire Application 1022. The Peopleads 980 comprises Pressume Parameters 1012 and Pressumes 998 which are maintained by the Peopleads Application 1026. The Mediawalk 974 comprises Media Reel Parameters 1006 and Media Reels 992 which are maintained by the Mediawalk Application 1020. The Showlinks 970 comprises Press Kit Parameters 160 and Press Kits 550 which are maintained by the Showlinks Application. 1030. The Showscape 972 comprises Township Parameters 1004 and Townships 990 which are maintained by the Showscape Application 1018. The Showtown 984 comprises Custom Portal Parameters 1016 and Custom Portal Pages 1002 which are maintained by the Showtown Application 1032.

Regarding the rules for People 202, for People Credit Sentence Structure for Pressume Web Kit, if the category is Music, display the Performing Artist. If the project is a song, and the parent project is an album, display the album name and the owner. If the project is an episode and the parent is a TV show, display the TV show name and the owner.

Regarding the rules for groups, when entering the people information, the following transactions are required:

Note: Groups are treated as facilities

1. Create a group information record using the company maintenance screen.

2. Create a Company to Company relation (parent no provider) (used as company in the element relation).

3. Create an element relation using the professional name (people), Group name (company) and role is member. Note: no contribution needed.

4. Member of the group on a project is known by there being an element relation containing PROFESSIONAL name & group. A PEOPLE name & group means that you worked for the group example (hairdresser).

This will allow the People Press Kit 552 to display that they where a member on a project 216. And what they did as a member of the group on the project 216.

When entering the group information, the following transactions are required:

Note: Groups are treated as professional name

1. Create a group information record using the company maintenance screen.

2. Create a professional name record for each member.

3. Create a people 202 to company relation using the professional name the associative values are relation is current member or past member company position is what they do in the group example (drummer) (populates the member section in the Press Kit).

4. Create a Company to People with the group as the professional name and the relation freelance (used as the people record in the element relation).

5. When an individual is no longer a member they are removed from the people 202 to company relation.

6. Create a element relation using the Group name (people), performance location (company facility) and role.

7. This will allow the group press kit to display current members and the group's role on the projects 216.

Does not allow for the display of the members that performed with the group on the project 216. For this the user would need to input member transaction.

If the user performed with the group (not as a member), then the Group is the AOP and you had a role on the project (backup singer).

Regarding the adding Groups, Groups can be added by creating a transaction similar to the facility transaction. The transaction would consist of the people 202, project 216, company (group) and the associative value would be what they did with the band on this project. It would display in the People Press Kit 552 as another role on project.

Regarding the rules for Places 204, for the company template, the modules will list in the order of the sequence number that is assigned in the Kit Module Section.

Regarding the Short_co_header1 module Layout, for fixed selections, only Awards that where directly awarded to the company. Media Category list all category separated by a comma. Place Type is company type from the company header record.

Regarding the accepted parameters, for Significant Positions, Default is "owner, president, executive CEO, vice president, manager, sales". These are company positions. This positions will list in this order. This list can be customized by entering a new list.

In the parameters for "short_co_header1" by entering a parameter the default will be over ridden. The column name is "pos_title" the value must be ones that were entered as a company position. The parameter type is "include".

Regarding Places 204 description, default is null. Entering a parameter in the description module for the "Short_co_header1" module can customize the description. The type is "company description".

Regarding the Short_co_featured_project module layout, for accepted parameters, if no parameters the first 5 projects produced or owned by the company will be displayed in project date order.

Type=Loop controls how many projects will show. The default is 5.

Type=Order controls the order that the projects will list. If no order parameter is entered that projects default order is date.

Regarding the column name field, for project name (proj_name), or project date (proj_date yyyy), the order parameter can accept both fields on the same record separated by a comma. You can also suffix the list of names in the column name field with description for descending or ascending for ascending.

Type=Includes and Exclude controls what projects will be displayed.

The program will accept in the Column name field. Company contribution (contrib.) will allow projects for companies other then the owner or producer to show theses projects as featured.

project name (proj_name), project Id (proj_id), or project date (proj_date yyyy)

The value field will contain the values for that field as in the data base. The list is separated by commas.

Type=Sequence controls the absolute order that the projects will list. If the list of sequence number is less then the Loop number the remaining projects will use the default order. Sequence takes precedence of the Order parameter. If Include or Exclude are set the Sequence will only act upon the projects the meet the include or exclude list.

Regarding the Short_co_buttonsv module layout, this module only adds the links to the press kit that will display the people, projects, equipment, and Awards that are associated to the company.

Regarding the Short_co_contact module Layout, this module currently has not parameter options and will display all address in one column and the other contact information parallel column., telephone numbers.

Regarding the Rules for Company Credit Construct, if the credit is in category TV or Radio and project type "Commercial", display the company with role "designed ad". If the credit is in category Music and there is a "Performing Artist", display the Performing Artist. If the credit is in category Multimedia and project type "Game", display the company with the contribution "designed game". If the credit is in category Video, display "Producer". If the credit is in category TV and project type is not "Commercial", display "Producer". If the credit is in category Radio and project type is not "Commercial", display "Producer". If the credit is in category Film, display "Producer".

Regarding the Company To Company Maintenance, the users need to establish what the "reason for the affiliation" is. The users can have "peer to peer" associations which are controlled by the value entered. The users have reserved the following words:

\*Distribution
Joint Venture
Collaboration
Service
Product

\*Internal Distribution would be on "Location" record.

In establishing the associations, we have the following rules:

Regarding Supplier\Vendor to Client/Customer, the most common association would appear to be the following:

Supplier/Vendor to Client/Customer

If there are Supplier/Client associations in both directions, then you would enter the association twice—once in each direction.

The associative value in this association would either be "Service" or "Product."

It is the fact that it did not want to make a client's vendor list or customer list available to his competitors. Therefore, a vendor list or customer list would only be available on special request.

Regarding the Performing Artists Collaboration, another scenario would be if two Performing Artists collaborate on a project, we would establish the following association:

Performing Artist to Performing Artist

The "associative value" would be "Collaboration."

Regarding the Two Companies Doing Business Together, if two Companies are doing business together under a Distribution arrangement, we would establish the following association:

Company to Company

The "associative value" would be "Distribution."

Regarding the Joint Venture, if two Companies are doing a joint venture on a project, we would establish the following association:

Company to Company

The "associative value" for this association would be "Joint Venture."

Regarding the Sample Company Structure, the company would be entered as an Entertainment Company, Manufacturer, Service. The Production Locations and Work Areas would be entered as Facilities. The Company owns the Production Location and the Production location owns the Work Area.

If accessing the Company, the name is "Company Name". If accessing the Production Location, the name is "Company Name: Production Location". If accessing the Work Area, the name is "Production Location: Work Area".

The Facilities under Company are:
Company Name: Production Location A
Production Location A: Work Area 1
Production Location A: Work Area 2
Company Name: Production Location B
Production Location B: Work Area 1
Production Location B: Work Area 2
The Facilities under each Production Location are:
Production Location A: Work Area 1
Production Location A: Work Area 2

The Distribution (external) could be another company or a subsidiary of the current company. The Distribution (internal) would be company to company with the ID's the same. When the user asks for the company sources of distribution the user would get the external and internal Distribution Company ID. When the user asks for the "Production Location B: work area 2" sources of distribution, the user would only get the internal distribution company ID. All other production locations and work area would not return information about the distribution.

Regarding New Company configuration, companies would be entered:

1. Entertainment Company—Companies involved in the production of the project. Example the record label, production company 2. Manufacturing Company—Companies that are involved with making the things that are used on the project 3. Services—Companies that provided support services for the project; catering company, wardrobe, location scout, distribution company 4. Facilities—The physical location where that project was produced. This would include studios, theaters, shooting location, concert locations.

A location would be associated to either an Entertainment company (sound studios, back lots, or location where a scene was shot, Manufacturing Company (factory), or Service (distribution company).

All Facilities must have a parent company. To properly create a facility the user needs the following:

1. Create a company record for the company that owns the facility

2. Create a Facility record

3. Create a company to company association with the value of owner. (the company is the parent and the facility is the child).

If the facilities POC is not the parent company then the facility record will have a POC.

1. The address in the facility is where it is located
2. The name is what it is called
3. The type is what it is.

Facilities would only have telephone numbers if the facility has a unique POC. The Companies could have an address and telephone number—one for POC and one for additional contacts. If these additional contacts are locations that belong to the company, they would be entered as Facilities with a company to company association.

Reference to the distribution of the manufacturer's product or the production's product is handled using a company to company association to the company that does the distribution. If the same company handles the production and distribution, a company to company association with both companies being the same would be used. If the user needs to track distribution activity separate from the production activity, then the distribution would be handled as a separate company.

The same would be true for sales, advertisement, marketing, and any other facet of the business that is required to get the product to market.

Regarding the rules for contribution to project values, Facility's contributions are what the facility was used for:

Example post production, over dubbing, shooting location, production location, live theater Company contributions are what the company does:

Example produced, own

Regarding the rules for Locations, for definition of location:

When searching for location. By definition, the user is looking for the name of a place that is located in a particular geographical location. This place is referred to as a Facility. The following are the rules for relating location (address) records to Facility (location) records.

Projects 216 can only have a POC address that is a contact address (locations are denoted using the association to a facility) If the Projects POC is the Production Company then the project does not have a location (address) record.

Facilities can have a location address and the POC would default to the company or facility. Or the facility can have a location address and a POC that is a contact address. Or the POC can be the location address.

Companies can have a contact address, and a location address. Either address can be the POC.

People can have an address that is their POC plus additional contact addresses.

Things can only have a POC address that is a contact address if the POC is not the manufacture.

When associating a location (address) record to a Facility (location) or Company the following field definitions apply. "Location Address" is a valid value that would go in the location type field to show that this is an address that denotes the geographical location of a place.

"Contact Address" is a valid value that would go in the location type field to show that this is an address that can be used as a source of contact.

For example (a P.O. Box could be a contact address but not a location address.) POC can be either a contact address of a location address.

The location name field is where you would put the name of the contact. The location name type would be where you would put the identifier of an individual.

For example, the name field might be John Smith and the name type would be Sales Manager This could then be displayed as:

John Smith

Sales Manger

12345 Main Street

On location type "location address" the user would not have a location name or type, unless on a Company record the user is using the location address as the POC. This also applies if the Facility is the Company.

If the POC is on a location address the addressee is the company name. If the location address is the POC and there is a value in the name field then the name shows as "c/o". If the POC is on a contact address the addressee is the location name field and location name type field.

To show the locations involved with the production of a project. The user must associate the project to a Facility (location).

When you want to create this Facility(location), you create the three needed records, company, facility, and company to company association. To show that facility is a "shooting location" you associate facility to a project with the contribution "shooting location" (facilities and not shooting locations until they are used as a shooting location).

Regarding the Shooting Location, a facility (location) is entered by the name of the facility (location) "6.sup.th & main" and the type would be "public street corner" the kind is "facility". The location record would have an address with out a name or type unless the POC was not the owner. This record would then have a company to company association. The associated company's name is "City of Los Angeles" the company type is "city municipal" the kind is "service". The way you know it is a shooting location is through its contribution to a project as "shooting location".

Regarding the rules for Projects 216, for Series Evolution, the user has a base cast of significant individuals. The series is entered by seasons with an association to the theme. The highest level of associations is the season series. The base cast is associated to the season series.

If a base cast member changes then the new member is associated to the season series with the character suffixed with replacement or add and the date. When cast or crew member is associated to an episode they are displayed in addition to the base cast. When displayed, the character will list the original and the replacement or addition. A cast or crew replacement is associated to an episode only if the replacement is temporary. The replacement association must be enter for each episode then they replace the original cast or crew member.

If the replacement is permanent then the member is associated to the season series with a character designated as a replacement. When displayed the character will show the original member followed by the replacement. To designate a member as a replacement for the cast the character is suffixed with the word replacement if the cast member is an addition to the base crew then the character is suffixed with add and the date. If the cast member is a replacement to the base cast then the character is suffixed with replacement and the date.

The crew works the same as the cast except the designations are on the role and not the character. This means on a company record the credits in the media category will show as follows. Elements that are associated to multiple season series will display there association as being from and to season series.

For example, if elements are involved only with a particular episode, then that element is associated only to the episode. When reporting the element it shows the credit as the "series: episode" [TV Show: Episode 1] If the element is involved with many episodes then the element is associated to the series. When reporting the element it shows the credit as the "series(year)" [TV Show (1999)] Because series are tracked by season. If an element is associated to more then one season then the credit shows as "series(from - - - to)". [TV Show (1996-1999)].

Regarding the rules for Things 218, Things 218 can not be tracked as individual items, and can only be reported as a class representation of the things. This means it is not able to identify who provided an individual thing used on a project or who manufactured the individual item. This is because if two companies provided the same type of thing.

For example, two companies provided Red 66 mustang convertibles for a chase scene in a movie. The users can not say which company provided which car. When reporting from a things point of view. The report would show the companies that create, distribute, and uses this class of thing.

For example, if the user say that Red 66 mustang convertibles was used on a project. A Red 66 mustang convertibles press kit would describe the things that make it a Red 66 mustang convertible, it would list all of the companies that Manufacture, Distribute, Sale and use Red 66 mustang convertibles.

What we are tracking in the thing relations is:
  A project used a particular type of thing (This project used Red 66 mustang convertibles).
  A Company provides (sales, rents, distributes) these type of things (These companies rent Red 66 mustang convertibles for use in the movie. We could not say what company rented which Red 66 mustang convertible.
  A Company Manufactures a particular type of thing (we could say these companies manufacture Red 66 mustang convertibles. The user could not say what company manufactured either of the Red 66 mustang convertibles used in the movie.

Regarding the rules for Awards, Related to Award Winning Elements, if a project receives an Award then all People and Places worked on an Award winning project. The People and Places do not have to be on the same relational record.

If a Place 204 worked on a project and received an Award for their effort on the project, then this Award is then included in the total Awards earned for efforts on the project. The relational record is Place contribution Project. This relation is then assigned to the Award.

If a Person worked on a project and received an Award for their effort on the project, then this award is then included in the total Awards earned for efforts on the project. The relational record is People role Project. This relation is then assigned to the Award.

For a Person to get credit for an Award to a company, the person would have to be part of the company project relation. The relational record would then read Company contribution Project role Person. This would apply to individuals whose role on the project was the cause of the company receiving the Award for the project.

For a Company to get credit for an Award to a Person, the Company would have to be part of the People Project relation. The relational record would then read People role Project contribution Company. This would apply to companies whose contribution on the project was the cause of the person receiving the Award for the project.

For a Project to get credit for an Award to a Person or Company, the Person or Company would have had to receive the Award for their role or contribution on the project. Things can only have direct Awards.

The human resource networking system of the present invention can be used in the Crime system—so called "Crime Links", wherein the People 202 are Criminals, the Places 204 are Crime Scenes, the Projects are Crimes, and the Things include Tools & Weapons.

Although the data to be collected and reported is different the System itself is still the same. The following chart indicates a plurality of applications of the system of the present invention, including Showlinks, First Looks, Peopleads, Crime Links, Study Links, and Health Links, and their potential users.

| The System | Application Examples | Intended Users |
|---|---|---|
| Independent Bits** of Information Structured in Relations | Showlinks | Entertainment Professionals etc. |
| | First Looks | Casting Agents, Actors, etc. |
| | Peopleads | Ent. Students, Employers, etc. |
| | Crime Links | Law Enforcement, etc. |
| | Study Links | Students, Schools, etc. |
| | Health Links | Medical Professionals, etc. |

First Looks: is an application that uses the system for the entertainment industry. Other applications may be developed for differing industries.

Study Links, Crime Links, Medical Links, and Applications for any other industries (Projects are composed of People, Places, and Things) would have different reporting requirements and different information, adjunctly for a different intended user base. Instead of reporting information about projects it might report information about crimes, events, etc. The system would still create associations, and overlaps between those four main elements.

The same advantages and disadvantages of the system still apply for each other application:

(1) The information related to an element can be updated by the input from another element (e.g. one element can input data for another element).

(2) The application can perform inference of missing data based on the data available.

(3) Because the information is collected in combinations, it allows searching and reporting in combinations (e.g. give me the left-handed guitar player who has worked at Soundcastle).

(4) You have to collect the information from the Projects (or other main information repositories) in order for the verification to be cost-effective.

(5) Information of questionable integrity that slips through the verification can cause costly problems in fixing. Verification is required because inputted data affects reports belonging to different individuals. After-the-fact corrections may be infeasible.

Each intended use, or application, uses business methods that are similar in nature, however of course the actual details of each step and each report must be very different because the applications and the users are different.

The core system is that Projects are composed of People, Places, and Things in relation to a Point in Time. What is changed is:

1. The definitions and groupings of valid values (e.g. Role, Contributions, Group, Solo Artist, Facilities, etc.)

2. The attributes (e.g. skills, education, media category, Awards, organizations).

As the system is used for different applications for different industries, we would evaluate the information and relationships needed. For example, Crime Links could track the city jails in relationship to the federal jails. Organizations could be CIA, FBI, etc. All of this we would be done upon further detail work.

Bits are People, Places, Projects, and Things, further defined by their attributes, and joined by Valid Associative Values of Roles, Contributions, Utilizations, in relation to a given Point In Time. The system is the back bone of the Showtown Community structure.

The present invention satisfies an industry need for a single source locating and identifying talent tool. Industry professionals will be surprised by this invention's novel approach in solving this long-standing need. By being an interactive method for locating particular types of workforce talents existing for hire in developing industry projects in entertainment and other human resource industries, the application is applicable for expanding needs existing in the unique project workforce style of the entertainment industry.

Additionally, the automatically generated industry career reports with their conjunctive sentences of industry credits should also be an industry surprise once discovered. The multimedia report combines the function of a resume with the purpose of a press kit. Additionally, the Press Kit generates a novel conjunctive sentence of industry credit that is automatically uplifted with the input of another's professional input of relational credits. Another industry first which we expect to find an industry acceptance.

However, the most interesting utility our method offers is making available for the entire industry of entertainment the secure mode of private transmissions for negotiations. Which is just the tip of the iceberg of the advantages in using our methods Internet technological capabilities that our inventions offer to the entire industry at competitively priced to the existing networking systems used in the industry.

In order to further illustrate how the present invention can be embodied to function as a web community's entire infrastructure, an example of a member (People 202) of a band is used to illustrate how one can be found by using the Credit Bytes 164 of the human resource networking locator system of the present invention, but in addition how the People 202, Places 204, Projects 216, and Things 218 infrastructure enables the system to locate other data informational links, such as Press Releases (Showire), E-storefront merchandise (Showtrade), Research Polls (ShowChat), and the ability to demonstrate one's style of work or products from infomercials whose data is controlled by the People, Places, Projects and Things infrastructure's InfoConsole as accessed on the site's Mediawalk.

This example should also indicate how all Showlinks communities' People 202, Places 204, Projects 216 and Things 218 infrastructure is accessed from those site's POV and also demonstrate that the system of the present invention can substitute industry studies for industry credits, and other project data, as a means to track a particular industry's Peoples, as in Peopleads first Break: a directory of recent industry graduates.

To collect the data, the members of a band input their credits by providing Credit Data 302. The Credit Data 302 may be a resume, it may be published material, or it may be a data collection form specifically tailored to the present invention. Note that custom reports are possible, as not all data collected here is in conjunction (the People, Places, and Things Pages). Different Press Kit Report Modules may display information differently, according to present needs and data collection feasibility.

The members of the band input their credits to form the band credits which are input from the Credit Data 302 referencing the People 202, Places 204, Projects 216, and Things 218.

First the band members are associated to the band by a People Association. This forms the structure of the band which will be used on the credits that they worked together.

For each credit, one has to input a Credit Association using said People Association, and any of the following (for each credit):

(a) a Projects Association including the Project 216 and any additional information that is known to complete the Projects Association (Places to Projects and/or Projects to Projects);

(b) a Places Association featuring the Facility where the work was done and any additional information that is known to complete the Places Association (Places to Places); and (c) a Things Association featuring a Thing that was used at the Place, and any additional information that is known to complete the Things Association (Things to Things and/or Places to Things).

The Projects, Places and Things associations which are input will uplift the credits in the Places, Projects, and Things Press Kit Reports 554, 580, 600, 612.

Step 1: Input Credit Bits and Credit Constructs (i) The Relational Information 120 is entered into the People Information Table 104, the Places Information Table 106, the Projects Information Table 108, and the Things Information Table 110.

(ii) ID numbers are automatically assigned in the sequence of input for each Information Table 104, 106, 108, 110.

(iii) The Associative Values Table is updated with Associative Values.

(iv) The Places ID "104" is a second entry for "103" which will be used as the parent in the Places Association.

Elements

Places: ID 100 (Name=The Abominable, Kind Group, Type=Band)

Places: ID 101 (Name=NJRIS Records, Kind=Entertainment Company, Type=Distribution)

Places: ID 102 (Name=Korg, Kind=Manufacturer)

Places: ID 103 (Name=The Abominable Home Studio, Kind=Facility)

Places: ID 104 (Name=The Abominable Home Studio, Kind=Entertainment Company)

Person: ID 100 (First=Jeff, Last=Henderson)

Person: ID 101 (First=Frank, Last=Wilowski)

Person: ID 102 (First=Robert, Last=Wiles)

Project: ID 100 (Name=The Abominable, Type=Album, Genre=Rock & Roll, Category=Music)

Thing: ID 100 (Name=Korg Triton, Model=LE, Type=Keyboard)

Associative Values

Places to Projects (Contribution)=Perform

Point in Time

Point in Time=Production

From the assignment of IDs to the elements, it has created Credit Constructs 199 for each Element where the other Elements and the Associative Values in these Credit Constructs 199 contain Null Values.

Step 2: Input Construct to Construct Associations

Step 2A: Input People Association

Using the IDs created in step 1; input the People Association using Credit Construct 199 to Construct Method. IDs are created for the People Association so that they may be used in the Credit Association, for delineation in this example we have started with ID 200 instead of ID 100, though starting with ID 100 would work equally as well.

Where Bold=Value Non Bold=Null Value

People Association: ID200

ID = 100-Role-Places-Contribution-Projects-Utilization-Things

People to Places = Current Member

People-Role-ID = 100-Contribution-Projects-Utilization-Things

People Association: ID 201

ID = 101-Role-Places-Contribution-Projects-Utilization-Things

People to Places = Current Member

People-Role-ID = 100-Contribution-Projects-Utilization-Things

People Association: ID 202

ID = 102-Role-Places-Contribution-Projects-Utilization-Things

People to Places = Employees

People-Role-ID = 100-Contribution-Projects-Utilization-Things

These associations will not be used in the Credit Association because the Data was not collected in relation to the Project 216 (this report did not require it). Therefore it will create another People Association with only the group, which we will use in the Credit Association.

People Association: ID203

People-Role-ID = 100-Contribution-Projects-Utilization-Things

Step 2B: Input Places Association
Bold=Value Non Bold=Null Value
People Association: ID 200

People-Role-ID = 104-Contribution-Projects-Utilization-Things

Places to Places = Facility Owner

People-Role-ID = 103-Contribution-Projects-Utilization-Things

Step 2C: Input Things Association
Bold=Value Non Bold=Null Value
Things Association: ID 200

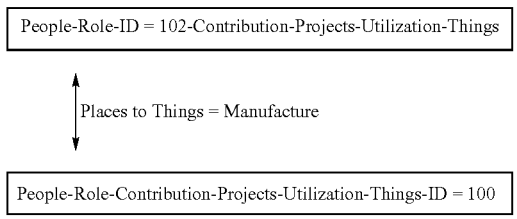

Step 3: Input a Credit Association

Input the Places Association ID, the Project ID, and the Things Association ID, with a Point in Time. Also note the associative values within Credit Association.

| ID = 203-Perform-Places-Contribution-100-Used-ID = 200 |

The ID 203 is for the People Association, the other ID 100 is for the Project Association, and the ID 200 is for the Things Association. Normally one would find the Places Association (containing the facility) being used; however this portion was not collected in relation to the project (in conjunction) so we did not use it here.

As shown in FIG. 9b, to convert the data into the Credit Bytes 164, the data is collected as Credit Data 302. The Credit Bits 102 (Elements, Associative Values, and Point In Time) are extracted from this Credit Data 102, and input into the Database 100. When it comes time to produce a report, the procedure is followed for extracting the data (see query matrix rules) which comes out as the Credit Bytes 164.

The full life cycle of the data is:
1. Credit Data 302 (collect)
2. Credit Bits 102 (input)

Request what you're asking for and how you want to see it:
3. Credit Constructs 199/Credit Instances 200 (virtual done by the programming)
4. Credit Bytes 164 (output done by the programming)
5. Conjunctive Project Sentences of Credit Construct 600 (report done by the programming).

FIG. 5: Excerpt from New Patent Drawings FIG. 9b

Regarding how the project requestor (inquiry) works, an inquiry may locate a band member or the band by their associations of People, Projects, Places, and/or Things using the Find People Query Screen 504. There are also Query Screens 504 for Find Places, Find Projects, and Find Things.

The Press Kit Report 550 may also be located by navigation through the associative hyperlink in the Conjunctive Project Sentences of Credit Construct 600 on those associated Places, Projects, and/or Things Press Kits 552, 578, 590, 610. For example, the Facility that the band worked at has a Press Kit. There is a link on the band's Press Kit to the Facility, and a link from the Facility to the Band. This helps network the band as they have more hyperlinks with other Press Kits.

Regarding Press Kit Links, for Supporting Community Features, the Press Kit Reports may also link to add-on services provided by the other community web sites:

The SHOWiRE Press Release features the press releases controlled by the Press Kit Owner The Showchat Research Poll features a research poll conducted by the Press Kit Owner The Showtrade E-storefront features items related to the Press Kit being sold by the Press Kit Owner The Mediawalk InfoConsole plays all multimedia, including separately produced Infomercials for new entertainment releases related to the Press Kit.

For Conjunctive Project Sentences of Credit Construct Hyperlinks, Press Kits through Conjunctive Project Sentences of Credit Construct 600 are linked therebetween:

How the system makes credits for People, Places, Projects, and Things

To enable the system making credits for the People 202, Places 204, Projects 216, and Things 218, as the band has input their credits, they have input a People Association, and at least one of the following:
- a Places Association
- a Projects Association
- a Things Association These Associations are then tied together by the Credit Association. The band's press kit displays the information from those associations. Additionally, the Places, Projects, and Things Press Kits 552, 578, 590, 610 (when active) will also display the new information, from their own respective Point of View POV.

Therefore the system is not actually creating credits, but it displaying the inputted credits in the other reports that are associated according to their own POV format.

To enable the system making credits from data not inputted by a band member, by the same method that the band that inputs their credits may uplift the credits of another, some other elements may uplift the band's credits. For example, credits input by the facility where the band worked at will uplift the band members' press kits. Also note that the band may not be able to provide all the information to complete a Conjunctive Project Sentence of Credit Construct 610. Any missing information may potentially be completed by the other elements.

According to the preferred embodiment, it does not require the use of an Automated Data Collection and Entry system. Without such a system, however, one would have to input each step individually (i.e. Step 1, Step 2, Step 3, etc). With an automated system, one would only have to input the information from Step 1, and the necessary transactions for Steps 2 and 3 would be completed automatically (i.e. one only has to input the Credit Bits 102 and doesn't have to input the Credit Constructs 199 because they are created automatically according to the structure of the data collection and input form). A data input for dummies requires no knowledge of what the input needs to be to obtain the desired output.

Additionally, the use of an Automated Data Collection and Entry system would contain a built in method for validating all associations, which may include displaying expanded information for each element of an association for proper identification. In addition, an automatic E-mail notification feature would notify the authorities (see rings of authority) which will help validate and verify the associative information in an information system.

Whether or not an Automated Data Collection and Entry system is used, a Credit Certification Service may also be available which will perform the validate associations process. This service will charge an additional fee to perform an independent research to validate and verify credits that are desired by the customer to be certified. Once certified, an icon or notation will appear on the press kit report next to that credit to show that it has been certified.

According to the present invention, the element searches allow users to locate industry resources by People, Places, Projects, and Things. A Robocruiter, which is a search agent, is designed to be tied to these element searches. Robocruiter links, as well as a Robocruiter icon, have been placed into the simple search designs demonstrated in our uplifted drawings. The Robocruiter can save a user's element search criteria implemented while the user is logged off. It will also provide quick access to the saved search criteria while the user is logged on. Users will receive search returns via email, or the next time they log in.

In view of above, the human resource networking system and method thereof of the present invention can achieve the following distinctive features:

(1) The human resource networking method is a novel method establishing a business system for locating, identifying, promoting and assisting in the employing of career project workers in the non-career workforce.

(2) The present invention allows accessibility by any employer and any person of talent anywhere which also includes their business subsidiaries and or managers located throughout the world.

(3) It is a single industry system for industries of entertainment the least of which is: music, theater, motion picture, radio, television, multimedia, the web, and other.

(4) It is a system addressing all industry employment types which include; free lance, independent, contract and employee.

(5) It is a system useful in the entertainment industry for establishing specific skills practiced by people which can be matched with project developing requirements in the production of music, theater, motion picture, radio, television, multimedia, the web, and other.

(6) It is a system for all human resource industries with a secure mode of transmission, the least of which is a private e-mail and channel for networking negotiations.

(7) It is a system open to those having union and non-union relationships. The present invention is a tool for all the industry's personnel including those in front of and behind the camera, microphone, stage, cage, phone or desk, in entertainment. With our invention everyone is related and everyone is located and identified by their industry credits.

(8) It is a system possessing the ability to be operated by professionals with little or no experience. However for those HR specialists in the head hunting business, this system offers a search system for the advanced, and an ultimate search screen for talent that are computer geeks asking that most complicated of compound questions. This makes it possible to search for industry personnel possessing the most remote of talents from the most remote places.

(9) It is a system open to those having management and to those not having representation. The present invention addresses the industry need for a one-source talent point of contact consisting of addresses, phone numbers with a listing of managers and agents. A listing that can be accessed by the talent enabling said talent to uplift their points of contact when needed.

(10) The present invention provides the industry a Pressume web kit system, a novel multimedia report which combines the purpose of press kits with the function of a resume. This is automatically linked with other Pressume web kits as well as the press kits for Places, Projects and Things, as used in the development of other industry projects of entertainment.

(11) It is to the industry with automatically generated conjunctive credits of industry sentences. These sentences may be automatically uplifted with the implementation of associated credits when inputted by another member's credits. The automatically generated web kit contains conjunctive sentences of industry credits extracted from the methods aforementioned elements, which in general report "Who (People type) did What (People function) for Whom (Company owning or producing product project), Where (places, When (Point In Time), Why (Projects) and How (Things used)."

(12) The human resource networking system locates, promotes and assists professionals obtain project developing world wide work with promotional costs competitively averaging a few dollars a month. This coverage is 24 hours day, 7 days a week and 52 weeks a year. This price also includes the automatically uplifting of industry credits, which contain the conjunctive sentence of industry credits.

(13) It is a system of flexibility that allows future growth for those career minded project developing personnel that use the methods core system of People, Places, Projects and Things core to be expanded for future project workforce managing like when an employer desires to automatically monitor the projects work cycle productivity of an employee in another state or country connected only by the technologies of the internet.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A human resource networking system, comprising:
   a storage device storing a Relational Database comprising an Inductive Credit Matrix containing People Elements, Places Elements, Projects Elements, and Things Elements derived from People Information, Places Information, Project Information, and Things Information respectively, wherein said People Information, said Places Information, said Projects Information, and said Things Information are relational information input as associations of People, Places, Projects, Things, including People to Places, People to Projects, People to Things, Places to Places, Places to Projects, Places to Things, Projects to Projects, Projects to Things, People to People, and Things to Things Associations;
   generator modules producing a plurality of Credit Constructs each of which is formed by associating two or more of said People Elements, said Places Elements, said Projects Elements, and said Things Elements and stored in said Inductive Credit Matrix of said Relational Database;
   means for outputting Credit Bytes generated by combining said Credit Constructs upon query, wherein said Credit Bytes are in form of who did what for whom, where, why and how, and is association of People to Places, People to Projects, and People to Things extracted for a People Report that is a list of People that meet a Query Matrix criteria, and is outputted from said Inductive Credit Matrix of said Relational Database and used in a Conjunctive Project Sentences of Credit Construct; and
   a plurality of Credit Instances each of which is an association of said Credit Construct with a Point In Time.

2. The system, as recited in claim 1, further comprising a People Credit Query Module for accepting a People Query and passing said People Query to a People Search Engine which queries said Relational Database and returns said Credit Byte.

3. The system, as recited in claim 2, further comprising a Places Credit Query Module for accepting a Places Query and passing said Places Query to a Places Search Engine which queries said Relational Database and returns said Credit Byte.

4. The system, as recited in claim 2, further comprising a Projects Credit Query Module for accepting a Projects Query and passing said Projects Query to a Projects Search Engine which queries said Relational Database and returns said Credit Byte.

5. The system, as recited in claim 1, further comprising a Places Credit Query Module for accepting a Places Query and passing said Places Query to a Places Search Engine which queries said Relational Database and returns said Credit Byte.

6. The system, as recited in claim 5, further comprising a Projects Credit Query Module for accepting a Projects Query and passing said Projects Query to a Projects Search Engine which queries said Relational Database and returns said Credit Byte.

7. The system, as recited in claim 6, further comprising a Things Credit Query Module for accepting a Things Query and passing said Things Query to a Things Search Engine which queries said Relational Database and returns said Credit Byte.

8. The system, as recited in claim 5, further comprising a Things Credit Query Module for accepting a Things Query and passing said Things Query to a Things Search Engine which queries said Relational Database and returns said Credit Byte.

9. The system, as recited in claim 1, further comprising a Projects Credit Query Module for accepting a Projects Query and passing said Projects Query to a Projects Search Engine which queries said Relational Database and returns said Credit Byte.

10. The system, as recited in claim 1, further comprising a Things Credit Query Module for accepting a Things Query and passing said Things Query to a Things Search Engine which queries said Relational Database and returns said Credit Byte.

* * * * *